(12) United States Patent
Yamanaka et al.

(10) Patent No.: US 8,611,614 B2
(45) Date of Patent: Dec. 17, 2013

(54) PERSONAL AUTHENTICATION DEVICE AND ELECTRONIC DEVICE

(75) Inventors: Yuji Yamanaka, Kanagawa (JP); Nobuhiro Morita, Kanagawa (JP); Shigeru Oouchida, Tokyo (JP); Jun Watanabe, Kanagawa (JP); Shin Aoki, Kanagawa (JP); Tetsuya Sasaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 582 days.

(21) Appl. No.: 12/735,927

(22) PCT Filed: Mar. 3, 2009

(86) PCT No.: PCT/JP2009/054368
§ 371 (c)(1),
(2), (4) Date: Aug. 26, 2010

(87) PCT Pub. No.: WO2009/110626
PCT Pub. Date: Sep. 11, 2009

(65) Prior Publication Data
US 2011/0001814 A1    Jan. 6, 2011

(30) Foreign Application Priority Data
Mar. 4, 2008  (JP) ................................ 2008-053711
Dec. 17, 2008  (JP) ................................ 2008-321400

(51) Int. Cl.
*G06K 9/00*  (2006.01)
(52) U.S. Cl.
USPC .......................................... 382/115; 348/78
(58) Field of Classification Search
None
See application file for complete search history.

(56) References Cited

U.S. PATENT DOCUMENTS

| 6,829,375 B1 | 12/2004 | Higuchi |
| 7,009,652 B1 | 3/2006 | Tanida et al. |
| 2005/0270386 A1* | 12/2005 | Saitoh et al. .................. 348/239 |
| 2006/0204050 A1 | 9/2006 | Takizawa |

(Continued)

FOREIGN PATENT DOCUMENTS

| EP | 1780657 | 5/2007 |
| JP | 02-171867 | 7/1990 |

(Continued)

OTHER PUBLICATIONS

International Search Report.

(Continued)

*Primary Examiner* — Sath V Perungavoor
*Assistant Examiner* — Dakshesh Parikh
(74) *Attorney, Agent, or Firm* — Harness, Dickey & Pierce, P.L.C.

(57) ABSTRACT

An image taking unit including a lens array, a light shielding member, and an image taking unit that acquires a compound eye image of a vein pattern of a living body held at a lens array. A shift estimation unit estimates an image shift amount between ommatidium images of the compound eye image. An image restructuring unit restructures a single image from the compound eye image by using the image shift amount. In at least one embodiment, a size correction unit corrects the size of the restructured single image with a magnification ratio determined by the estimated image shift amount and an image shift amount stored in a registration pattern storage unit so as to correspond to a registration pattern. As a result, it is possible to perform personal authentication while compensating influences due to fluctuations in a subject distance.

16 Claims, 41 Drawing Sheets

(56) References Cited

U.S. PATENT DOCUMENTS

| | | | |
|---|---|---|---|
| 2006/0228004 A1* | 10/2006 | Sato | 382/115 |
| 2007/0160310 A1* | 7/2007 | Tanida et al. | 382/276 |
| 2007/0263113 A1* | 11/2007 | Baek et al. | 348/340 |
| 2007/0285553 A1* | 12/2007 | Morita et al. | 348/335 |
| 2008/0031497 A1* | 2/2008 | Kishigami et al. | 382/115 |
| 2008/0048288 A1 | 2/2008 | Han | |
| 2008/0088731 A1 | 4/2008 | Tanaka et al. | |
| 2008/0095358 A1 | 4/2008 | Eguchi et al. | |

FOREIGN PATENT DOCUMENTS

| | | |
|---|---|---|
| JP | 10-134188 | 5/1998 |
| JP | 2000-217803 | 8/2000 |
| JP | 2001-61109 | 3/2001 |
| JP | 2006-107401 | 4/2006 |
| JP | 2006-135823 | 5/2006 |
| JP | 2006-236244 | 9/2006 |
| JP | 2007-000219 | 1/2007 |
| JP | 2007-074079 | 3/2007 |
| JP | 2007-158825 | 6/2007 |
| JP | 2008-036058 | 2/2008 |
| JP | 2008-053711 | 3/2008 |
| JP | 2008-097327 | 4/2008 |
| WO | WO 2006/041126 | 4/2006 |
| WO | WO 2006/077718 | 7/2006 |

OTHER PUBLICATIONS

Extended European Search Reported dated May 7, 2013 in corresponding European patent application No. EP 09716270.
Japanese Office Action for Japanese Application No. 2008-321400 mailed Jan. 16, 2013.

* cited by examiner

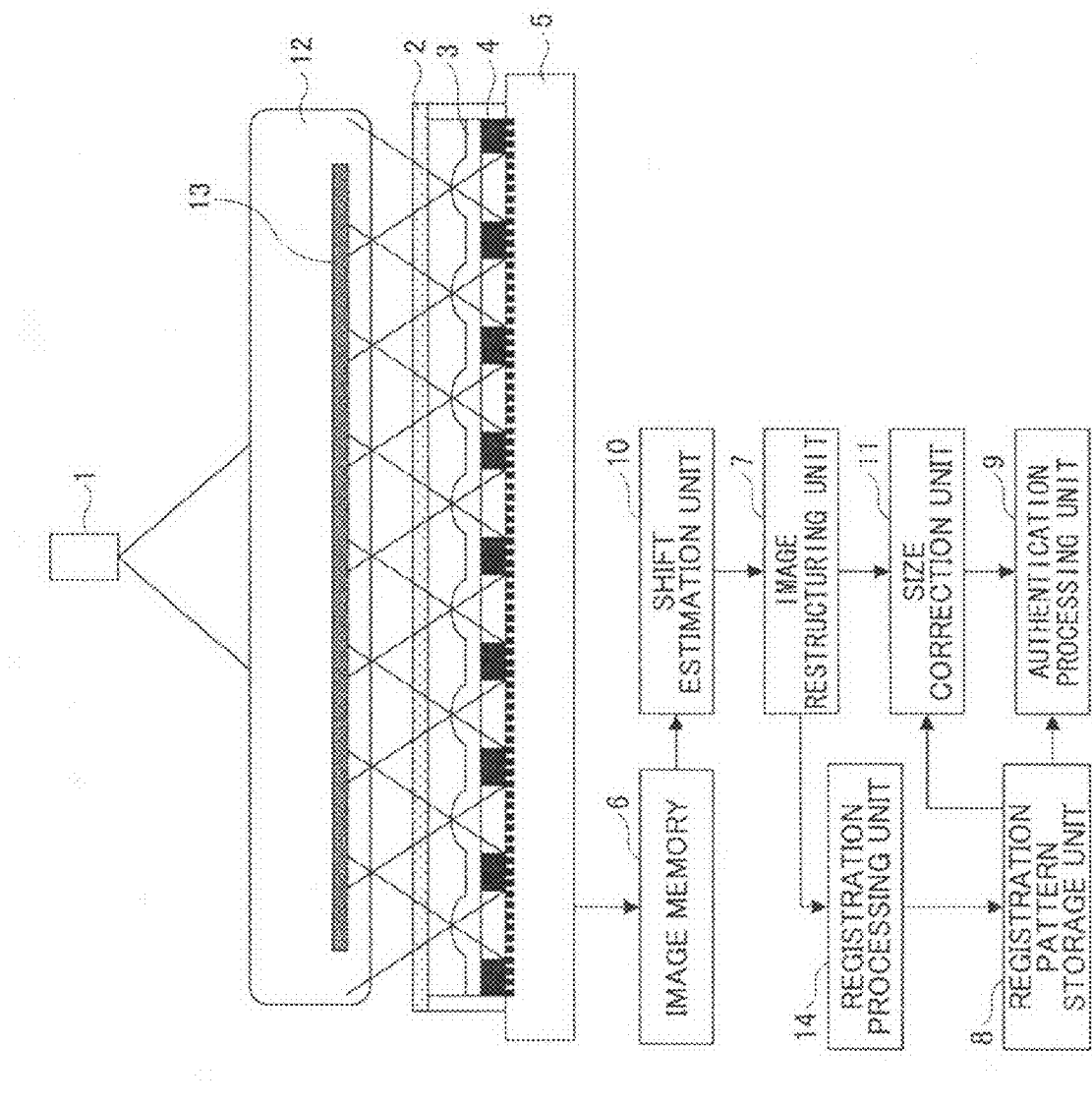

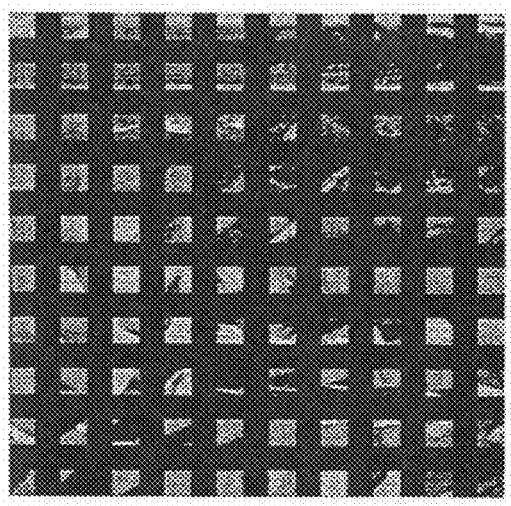
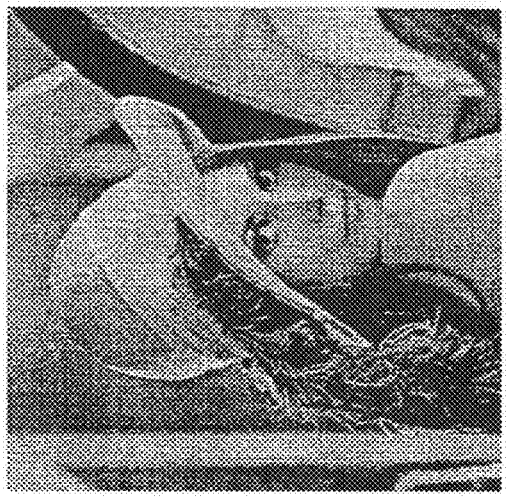
FIG. 2B
FIG. 2A

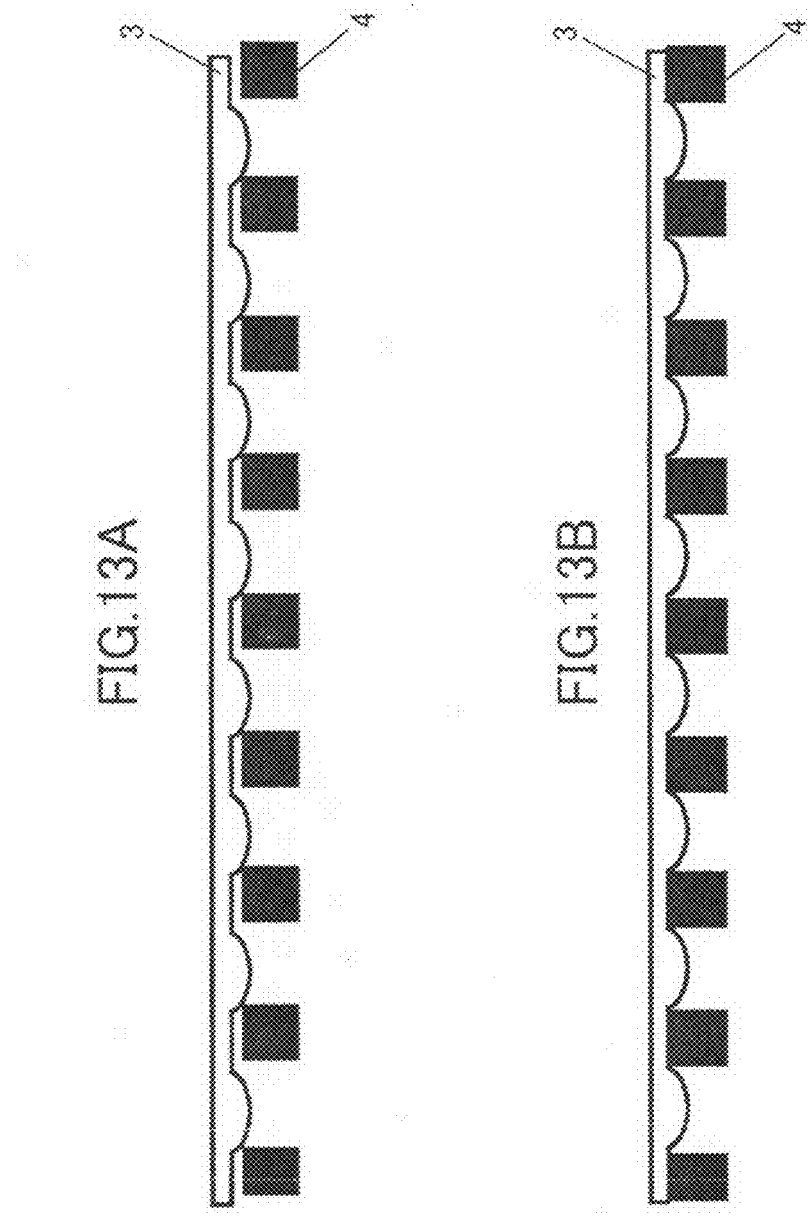

PERSONAL AUTHENTICATION DEVICE AND ELECTRONIC DEVICE

TECHNICAL FIELD

The present invention generally relates to personal authentication devices using biometric information inherent in individuals and, in particular, to a personal authentication device using the vein pattern of a finger or a palm.

BACKGROUND ART

In recent years and continuing to the present, attention is now focusing on security when a user accesses confidential information to use information terminals such as computers and mobile phones or enters buildings. As means for authenticating whether the user is authorized to access information, the user uses a magnetic stripe and an IC chip embedded in a card, a password that the user memorizes, biometric authentication using the physical characteristics of the user, or the like. However, the user may lose a card and forget a password. Moreover, the password may be leaked to others. On the other hand, when the user uses biometric authentication, he/she is free from the risks of losing the card or forgetting the password. In addition, it is hard for the user to imitate the information of others with the biometric authentication.

Nevertheless, in the personal authentication device using the vein pattern of a finger or palm as biometric information, the image of the vein pattern is taken with the finger or palm set in position by a guide unit (see, e.g., Patent Document 2). The living body is thus set in a predetermined position, because accuracy in authentication processing is degraded or errors are caused if the taken image of the vein pattern is not almost the same in size as that of a registration pattern. In this case, however, the living body must contact the guide unit and a device becomes large as a whole with the installation of the guide unit. Therefore, when the personal authentication device is used by an indefinite number of users, a device that the users are not required to touch is desired from the viewpoint of hygiene. Recently, information terminals such as mobile phones and notebook computers have been downsized and made thinner. Therefore, if the personal authentication device is large, it is hard to be installed in the information terminals.

Furthermore, Patent Document 1 discloses a personal authentication device capable of performing authentication without causing the finger of a test subject to be set in a predetermined position. This personal authentication device includes a registration unit and an authentication unit. The registration unit acquires three-dimensional biometric information including ones related to veins, skin contour, and joint positions of the finger of a registerant, and sends it to the authentication unit. The authentication unit measures the positions of parts of the finger of a person to be authenticated and shows them as coordinates and corrects the three-dimensional biometric information received from the registration unit so as to correspond to the states of the position, inclination, and joint curvature, etc., of the finger of the person to be authenticated. In this manner, the personal authentication using the three-dimensional biometric information after being corrected and the biometric information received by the authentication unit is performed. However, the authentication unit is required to have a position measuring unit that transmits light or ultrasonic waves to the finger and measures its reflection time, a unit that performs complicated correction processing for the three-dimensional biometric information, or the like. In addition, the registration unit is required to have a unit that uses X-ray measurement, magnetic resonance measurement, light measurement, ultrasonic wave measurement, or the like, to acquire the three-dimensional biometric information. Therefore, it is hard to reduce the size and costs of the device.

Patent Document 1: JP-A-2007-219
Patent Document 2: JP-A-2006-107401

When the image of a vein pattern of a finger is taken without causing the finger to be set in a predetermined position by the guide unit or the like in the personal authentication device that takes the image of the vein pattern of the finger so as to be used for authentication processing, the most important problem is that a distance between a test subject, the device and the position of the finger are likely to fluctuate at the time of taking the image.

DISCLOSURE OF INVENTION

Accordingly, the present invention may provide a personal authentication device that is capable of performing personal authentication with high accuracy regardless of fluctuations in a distance between the device and a test subject, not required to have a guide unit or the like for restricting the position of a finger, and facilitates the downsizing and thinning of the device and the cost reduction thereof.

According to a first aspect of the present invention, there is provided a personal authentication device having an image acquisition unit including a lens array composed of two or more lenses and an image taking unit that takes as a compound eye image a set of images of a living body held at the lens array, the images being formed through the lenses of the lens array and using the image of the living body included in an ommatidium image of the compound eye image acquired by the image acquisition unit or the image of the living body restructured from two or more of the ommatidium images for personal authentication. The personal authentication device includes a shift estimation unit that estimates an image shift amount between the ommatidium images of the compound eye image acquired by the image acquisition unit; and an image correction unit that performs image correction processing for compensating an influence due to a fluctuation in a position or an inclination of the living body in a light-axis direction of the lenses of the lens array on the living body used for the personal authentication or a registration pattern verified against the living body for the personal authentication based on the image shift amount estimated by the shift estimation unit.

According to a second aspect of the present invention, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates an image shift amount between ommatidium images of the compound eye image acquired by the image acquisition unit; an image restructuring unit that restructures a single image from the plural ommatidium images of the compound eye image acquired by the image acquisition unit using the image shift amount of the compound eye image estimated by the shift estimation unit; a registration pattern storage unit that correspondingly stores a registration pattern and the image shift amount or a subject distance; a size correction unit that corrects a size of the single image restructured by the image restructuring unit with a magnification ratio determined by the image shift amount or the subject distance read from the registration pattern storage unit, the image shift amount estimated by the shift estimation unit or the subject distance calculated using the image shift amount; and an authentication processing unit that verifies the single image of which the size is corrected by the size correction unit or a characteristic-amount vector extracted from the single image against the registration pattern read from the registration pattern storage unit.

According to a third aspect of the present invention, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates an image shift amount between ommatidium images of the compound eye image acquired by the image acquisition unit; an image restructuring unit that restructures a single image from the plural ommatidium images of the compound eye image acquired by the image acquisition unit using the image shift amount of the compound eye image estimated by the shift estimation unit; a registration pattern storage unit that correspondingly stores a registration pattern and the image shift amount or a subject distance; a size correction unit that corrects a size of the registration pattern read from the registration pattern storage unit with a magnification ratio determined by the image shift amount or the subject distance read from the registration pattern storage unit, the image shift amount estimated by the shift estimation unit or the subject distance calculated using the image shift amount; and an authentication processing unit that verifies the registration pattern of which the size is corrected by the size correction unit against the single image restructured by the image restructuring unit or a characteristic-amount vector extracted from the single image.

BRIEF DESCRIPTION OF DRAWINGS

FIG. 1 is a view for explaining the configuration of a personal authentication device according to a first embodiment of the present invention;

FIGS. 2A and 2B are views of a subject image and a compound eye image;

FIGS. 13A and 13B are schematic views for explaining the operation of assembling a lens array and a light shielding member;

BEST MODE FOR CARRYING OUT THE INVENTION

Figure 3:
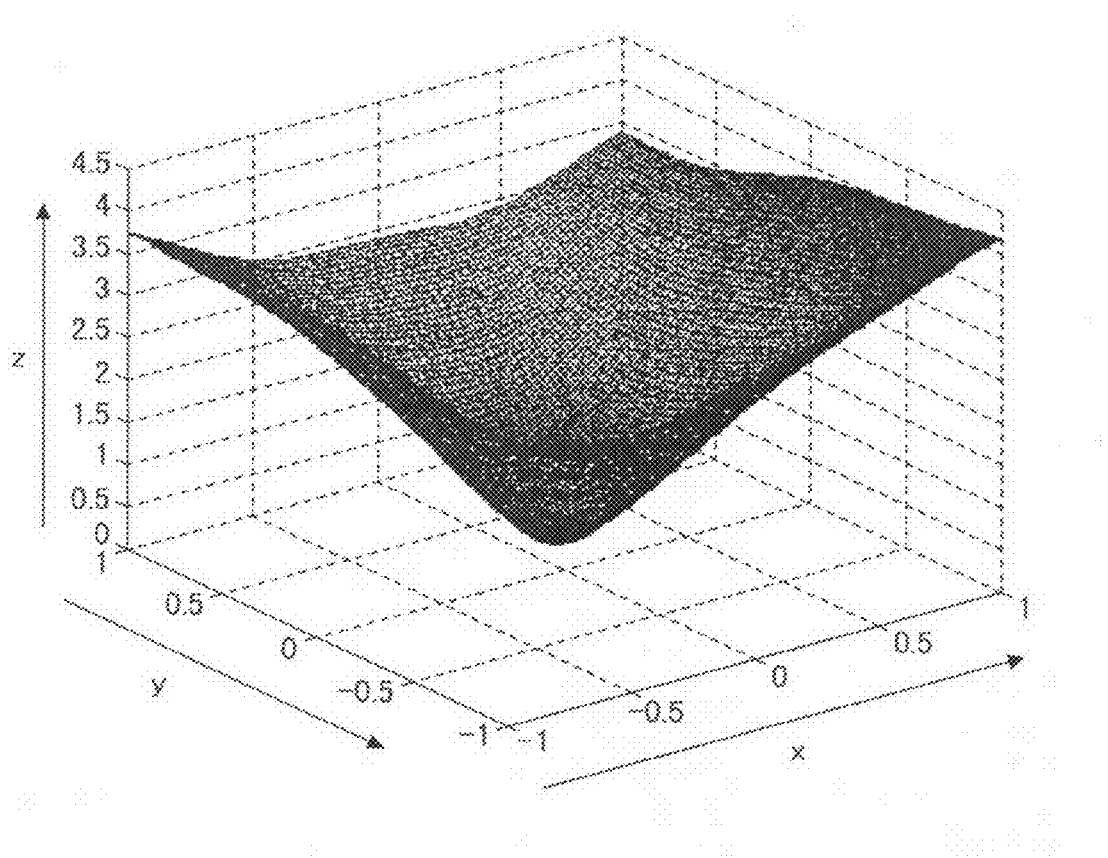
FIG. 3 is a view showing an example of a difference calculated by pattern matching used for estimating an image shift amount.

Next, embodiments of the present invention are described below.

First Embodiment

FIG. 1 is a view for explaining the configuration of a personal authentication device according to a first embodiment of the present invention. In FIG. 1, reference numerals 12 and 13 schematically denote the finger or palm of a person to be authenticated and the vein of the finger or palm thereof, respectively. The personal authentication device is composed of an image acquisition unit that takes the image of the vein 13 of the finger or palm 12 of the person to be authenticated as a subject and composed of a processing system that uses a vein pattern acquired by the image acquisition unit as biometric information inherent in the person to be authenticated to perform personal authentication.

First, the image acquisition unit is described. The image acquisition unit is composed of a light source 1 that irradiates the finger or palm 12 with light, a visible light cutting filter 2, a lens array 3 having two or more lenses arranged on a plane, a light shielding member 4 that prevents crosstalk of light beams between the respective lenses of the lens array 3, and an image taking unit 5 that takes an image formed through the lens array 3.

As the light source 1, a LED (Light Emitting Diode), a LD (Laser Diode), etc., can be used. The light radiated from the light source 1 is preferably near-infrared light, and particularly near-infrared light having a wavelength of about 760 nm. The near-infrared light having a wavelength of about 760 nm passes through body tissues while being absorbed in reduced hemoglobin contained in blood flowing in a vein. Therefore, compared with a case in which a light source having another wavelength is used, it is possible to take the image of a vein pattern more clearly.

In FIG. 1, the light from the light source 1 is radiated downward, i.e., in the direction to the lens array 3 and the image taking unit 5, but it is just an example. The body tissue such as the finger or palm 12 is a strong scattering body. Therefore, the light source 1 may be so arranged that the light is radiated on the side of the finger or palm 12 or on the side of the lens array 3. Furthermore, unlike FIG. 1, the number of the light sources 1 is not limited to one. Where the plural light sources 1 are arranged in a scattered manner, a light amount for taking an image increases and an image taking range is irradiated with light more uniformly. As a result, it is possible to take the image of a vein pattern with higher quality.

The near-infrared light radiated from the light source 1 passes through and scatters inside the finger or palm 12, but it is absorbed in the vein 13. Therefore, the vein 13 can be observed from the outside as a pattern darker than other parts. The vein pattern passes through the visible light cutting filter 2, is concentrated by the lens array 3 to form an image, and taken by the image taking unit 5 as a compound eye image. Even when strong light (e.g., sunlight during the day) including a wavelength other than near-infrared light from the light source 1 is radiated to the finger or palm 12, light other than the near-infrared light is eliminated by the visible light cutting filter 2. Therefore, it is possible to take the image of a vein pattern clearly.

Note that when the image of a vein pattern is taken in such an environment free from external light, e.g., in a dark location, it is also possible to exclude the visible light cutting filter 2 from the configuration. This modification is also included in the embodiment of the present invention.

Furthermore, instead of providing the visible light cutting filter 2 as a separate member, an optical thin film having the same function as the visible light cutting filter 2 may be deposited on the front surface of the lens array 3. This modification is also included in the embodiment of the present invention, which is advantageous for downsizing and thinning of the device.

The light shielding member 4 provided between the lens array 3 and the image taking unit 5 prevents crosstalk of light beams passing through the respective lenses of the lens array 3 and contributes to clearly taking the image of a vein pattern.

The lens array 3 has an array arrangement in which the lenses are placed on the plane. As the lenses, spherical lenses or non-spherical lenses can be used. In the case of using the non-spherical lenses, optical characteristics can be improved. As a specific method for manufacturing the lens array 3, processing methods such as a reflow method, an area tone mask method, and a polishing method or a molding processing method using a mold manufactured by these methods can be used. As a material for manufacturing the lens array 3, a transparent resin, glass, etc., can be used. From the viewpoint of reducing the cost of the lens array 3, the molding processing method using a resin material is preferable.

As the image taking unit 5, a general CMOS image sensor or a CCD image sensor can be used.

Next, the processing system is described. The processing system according to this embodiment is composed of an image memory 6, a shift estimation unit 10, an image restructuring unit 7, a size correction unit 11, an authentication processing unit 9, a registration pattern storage unit 8, and a registration processing unit 14. Note that the registration processing unit 14 is not mandatory as described below.

The image memory 6 is a unit that reads and stores the compound eye image of a vein pattern taken by the image taking unit 5. For example, when a subject image is an image shown in FIG. 2A, a compound eye image shown in FIG. 2B is taken. In FIG. 2B, black lattice parts are equivalent to the shaded parts of the light shielding member 4. Square regions separated by the shaded parts represent ommatidium images formed through the respective lenses of the lens array 3. Actually, the compound eye image of a vein pattern as a subject image is taken.

The shift estimation unit 10 is a unit that estimates an image shift amount between the ommatidium images of the compound eye image stored in the image memory 6. The image restructuring unit 7 is a unit that uses the image shift amount estimated by the shift estimation unit 10 to restructure a single image from the compound eye image. The restructured single image represents a vein pattern as biometric information inherent in a person to be authenticated. Note that in the following description, the image shift amount is simply called a shift amount or a shift as occasion demands.

The registration processing unit 14 is a unit that performs the registration processing of storing a vein pattern as biometric information of a registrant in the registration pattern storage unit 8 as a registration pattern. At the registration, the registrant is caused to hold his/her finger or palm at the image acquisition unit to take the compound eye image of a vein pattern and store the taken image in the image memory 6. The shift estimation unit 10 estimates an image shift amount from the compound eye image, and the image restructuring unit 7 uses the image shift amount to restructure the single image of the vein pattern from the compound eye image. The registration processing unit 14 stores (registers) the single image of the restructured vein pattern in the registration pattern storage unit 8 as a registration pattern. In this case, however, the registration processing unit 14 stores the image shift amount between the adjacent ommatidium images estimated by the shift estimation unit 10 or a subject distance (described below) obtained by performing calculation using the image shift amount in the registration pattern storage unit so as to correspond to the registration pattern.

Note that although not shown in FIG. 1, a unit that selects either the authentication processing or the registration processing is provided. When the unit selects the authentication processing, the authentication processing unit 9 and the size correction unit 11 are activated. When the unit selects the registration processing, the registration processing unit 14 is activated. The same applies to embodiments described below.

If a subject distance at the authentication is different from that at the registration, there is a difference in the size of a vein pattern restructured as a single image by the image restructuring unit 7. The size correction unit 11 is a unit that performs the size correction (change) processing of matching the size of a vein pattern at the authentication to that of a vein pattern (registration pattern) at the registration. The authentication processing unit 9 is a unit that verifies the vein pattern of which the size is corrected by the size correction unit 11 against the registration pattern stored in the registration pattern storage unit 8 to determine the authentication of a person to be authenticated.

Next, the shift estimation unit 10 is described. In a compound eye image, similar ommatidium images seem to be arranged, but they are obtained when the image of a subject is formed through the lenses different in position. Therefore, there is actually an image shift (parallax) between the ommatidium images. The shift estimation unit 10 performs calculation to obtain an image shift amount between the ommatidium images. Note that the regions of the ommatidium images can be recognized by simple binarization processing. In other words, as described in FIGS. 2A and 2B, the ommatidium images in the compound eye image are represented by the regions surrounded by the shaded parts of the light shielding member 4, and the shaded parts are much darker than the remaining parts. Accordingly, the compound eye image is binarized by the use of an appropriate threshold, thereby making it possible to distinguish the shaded parts from the remaining parts and easily extract the regions surrounded by the shaded parts as the regions of the ommatidium images. Alternatively, in order to specify the regions of the ommatidium images in advance, it is also possible to illuminate an image without a subject and store bright regions in the image as the regions of the ommatidium images after manufacturing an image acquisition unit.

For calculating an image shift amount, pattern matching, for example, can be used. An ommatidium image (reference ommatidium image) as a reference for calculating the image shift amount is arbitrarily selected from a compound eye image, and part of the ommatidium image is used as a template. The image shift amount in the horizontal and vertical directions of the reference ommatidium image is set as an amount (0, 0). An ommatidium image (ommatidium image based on which the image shift amount is detected) as an object based on which the image shift amount is estimated is selected. Then, the image shift amount is estimated based on a similarity and a difference between the reference ommatidium image and the ommatidium image based on which the image shift amount is detected. It is well known that a mutual correlation function can be used for determining the similarity and SSD (sum of squares of a difference between pixel values) and SAD (sum of absolute values of a difference between pixel values) can be used for determining the difference. FIG. 3 is a view showing an example of a difference calculated by the pattern matching using the SSD.

A difference using the SSD is represented by the following formula (1).

(Formula 1)

$$R(x, y) = \sum_i \sum_j (I(i+x, j+y) - T(i, j))^2 \quad (1)$$

Here, R represents a difference calculated based on the SSD, I represents part of an ommatidium image based on which an image shift amount is detected, and T represents part of a reference ommatidium image as a template. i and j represent the number of pixels in the horizontal and vertical directions of the template, respectively. x and y represent values that change over the search range of the image shift amount. The value (x, y) that minimizes R can be estimated as the image shift amount between two ommatidium images. In FIG. 3, an x-axis and a y-axis represent an image shift, and a z-axis represents an SSD difference. An image shift amount obtained by the formula (1) is estimated on a pixel-by-pixel basis. Alternatively, the image shift amount can be estimated on a subpixel-by-subpixel basis according to a method in which the similarity and the difference calculated on a pixel-by-pixel basis are subjected to function fitting, a method in which either the template or the ommatidium image based on which the image shift amount is detected is interpolated for the pattern matching, or the like.

Furthermore, in case that the arrangement of the lenses constituting the lens array 3 is known, it is not necessary to estimate the image shift amounts of all the ommatidium images. That is, the image shift amounts of the remaining ommatidium images can be obtained based on the image shift amount calculated between the reference ommatidium image and any ommatidium image based on which the image shift amount is detected. For example, in the case of a square-lattice-shaped compound eye image that has M ommatidium images in the horizontal direction and N ommatidium images in, the vertical direction, it is assumed that the ommatidium image at the upper left end is the reference ommatidium image and the ommatidium image at the lower right end is the ommatidium image based on which the image shift amount is detected. When the image shift amount of the ommatidium image based on which the image shift amount is detected relative to the reference ommatidium image is calculated to be a value (x, y) as a result of the pattern matching, the image shift amount in the horizontal and vertical directions between the adjacent ommatidium images can be calculated as x/(M−1) and y/(N−1). Therefore, the image shift amounts of all the ommatidium image can be easily obtained. As described above, only a set of the ommatidium images is used for calculating the image shift amount, and the image shift amounts of the remaining ommatidium images are obtained based on the calculated image shift amount. As a result, time for calculating the image shift amount can be reduced.

Figure 4:
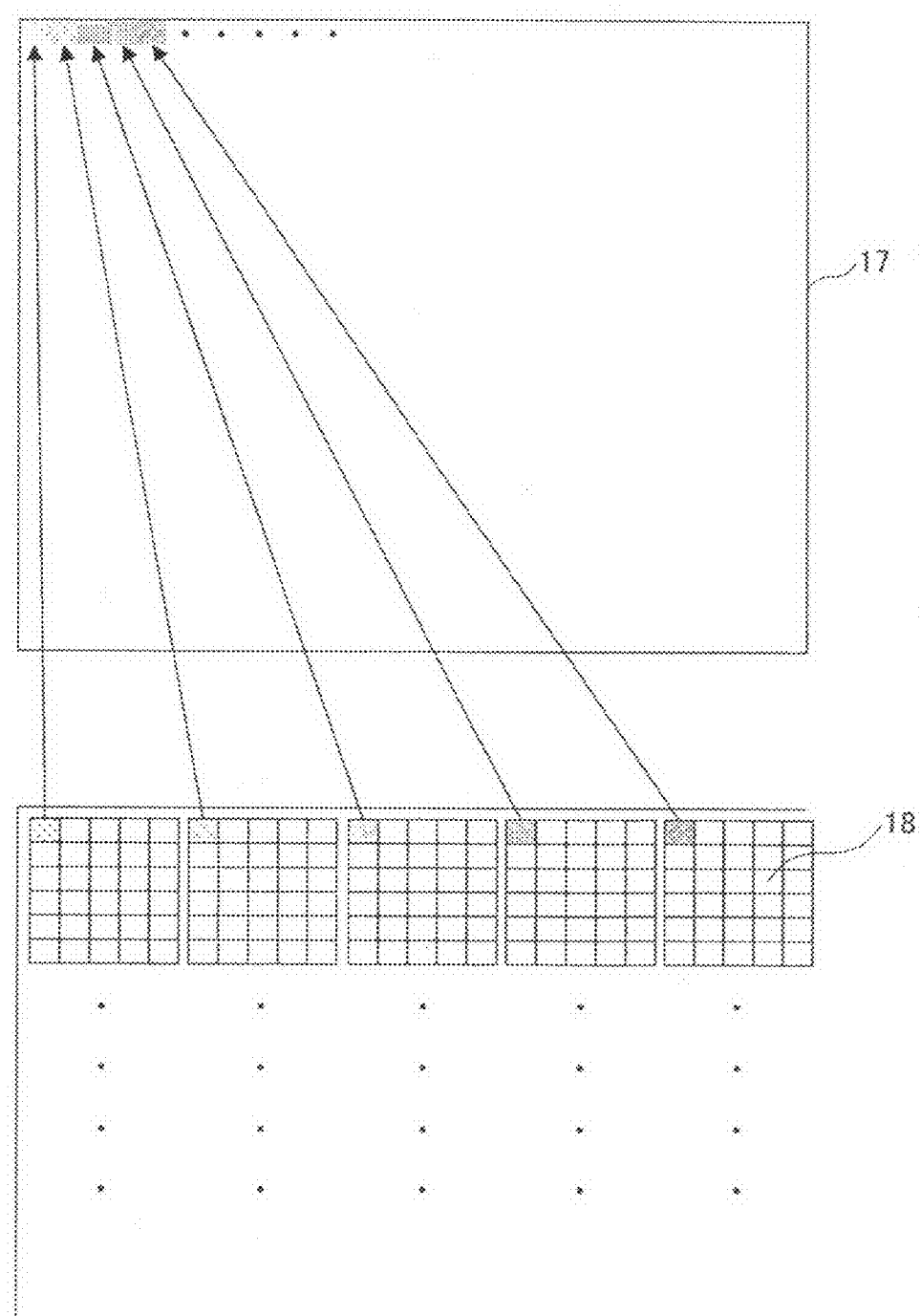
FIG. 4 is a view for explaining a method for restructuring a single image from a compound eye image.

Next, the image restructuring unit 7 is described. The image restructuring unit 7 performs the processing of restructuring a single image (vein pattern) from a compound eye image. This restructuring processing is performed in such a manner that the pixels of ommatidium images are rearranged based on an image shift amount estimated by the shift estimation unit 10. More specifically, as schematically shown in FIG. 4, a virtual digital image region 17 for restructuring the single image is assured in advance. Then, the respective pixels of the ommatidium images 18 are rearranged at the positions on the digital image region 17 determined based on the image shift amounts estimated with respect to the ommatidium images, thereby restructuring the single image of the vein pattern on the digital image region 17.

Next, the size correction unit 11 is described below. Since the embodiment of the present invention does not have a guide unit that defines a relative distance between the finger or palm 12 and the image acquisition unit, a subject distance is likely to fluctuate. Accordingly, the size of a vein pattern (single image restructured by the image restructuring unit 7) obtained by taking the image of the finger or palm 12 at the authentication is generally different from that of a vein pattern stored in advance in the registration pattern storage unit 8 as the registration pattern of a person to be authenticated. The size correction unit 7 performs the size correction (change) processing of matching the size of the vein pattern at the authentication to that of the registration pattern.

A magnification ratio in the size correction processing is determined based on the ratio of a subject distance at the registration to that of a subject distance at the authentication. The ratio of the subject distance is determined based on the ratio of an image shift amount between adjacent ommatidium images at the registration to that of an image shift amount between adjacent ommatidium images at the authentication. The details are described below based on FIG. 5.

Figure 5:
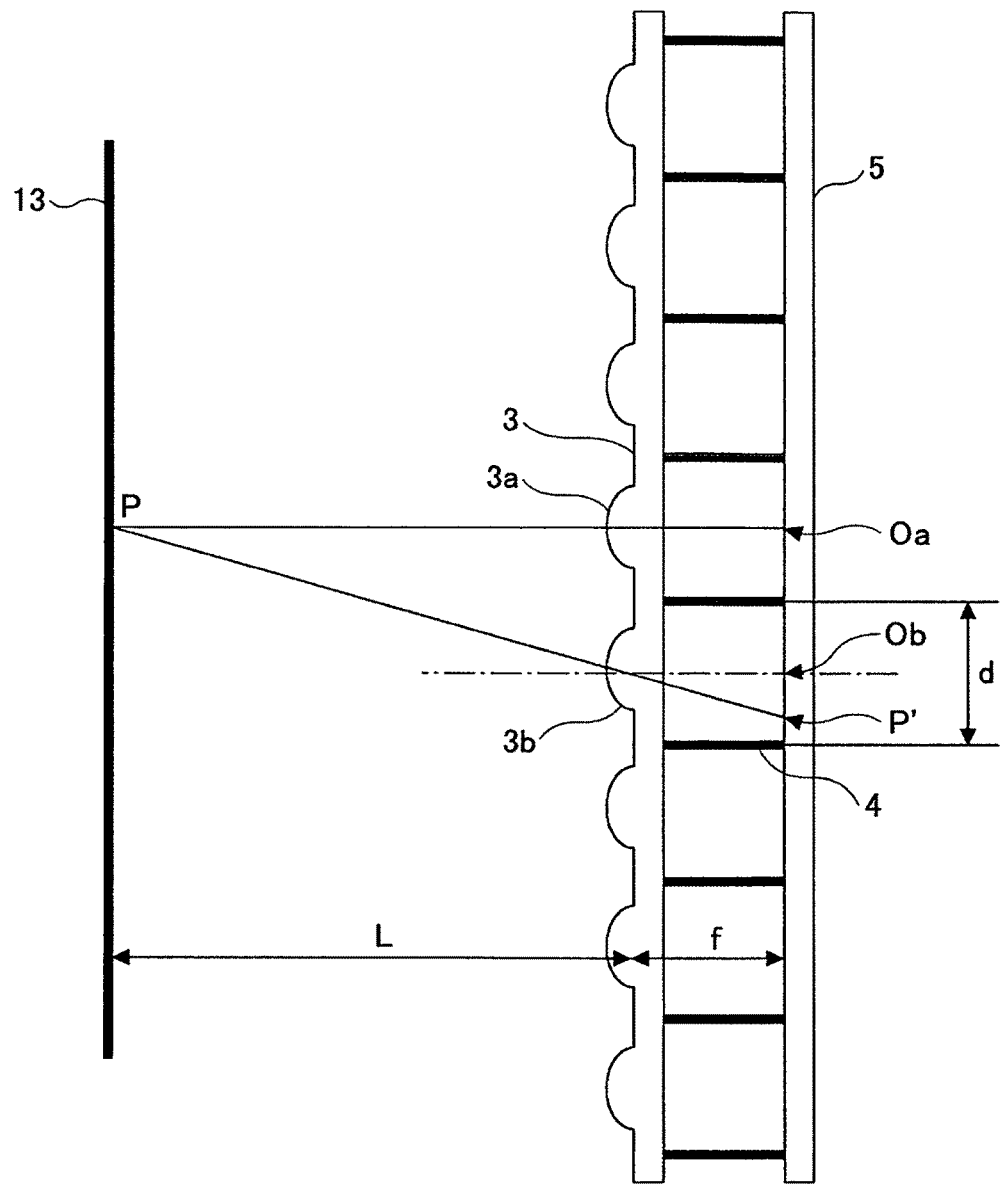
FIG. 5 is a schematic view for explaining a relationship between a subject distance and an image shift amount.

FIG. 5 is a schematic view for explaining a relationship between a subject distance and an image shift amount between adjacent ommatidium images. In FIG. 5, among light emitted from the point P where the light axis of a lens $3a$ of the lens array 3 crosses through the subject (vein) 13, light passing through the lens $3a$ is applied to the point Oa where the light axis of the lens $3a$ crosses through the image taking surface of the image taking unit 5 to form an image. On the other hand, light passing through a lens $3b$ next to the lens $3a$ is applied to a point P' on the image taking surface of the image taking unit 5 to form an image. Assuming that the point where the light axis of the lens $3b$ crosses through the image taking surface of the image taking unit 5 is Ob, P'Ob is an image shift amount between ommatidium images formed by the lenses $3a$ and $3b$. When a lens pitch d and a distance f between the lens array 3 and the image taking surface are used at the time of designing an optical system, the following relationship is established between the subject distance L and the image shift amount P'Ob between the adjacent ommatidium images.

(Formula 2)
$$L = \frac{f \cdot d}{[P'Ob]} \quad (2)$$

As described above, a subject distance Lo or an image shift amount so between adjacent ommatidium images at the registration is stored in the registration data storage unit 8 so as to correspond to the registration pattern.

Assuming that a subject distance is L' and an image shift amount between adjacent ommatidium images is s' at the authentication, a size correction magnification ratio can be determined as L'/Lo that is the ratio of a subject distance at the authentication to that at the registration. This ratio is equivalent to so/s' that is the ratio of a shift amount between adjacent ommatidium images at the registration to that between adjacent ommatidium images at the authentication. The same result is obtained even if either the ratio of a subject distance or the ratio of an image shift amount is used as a size correction magnification ratio. However, the use of the ratio of a subject distance increases calculation for obtaining the ratio. Therefore, it is preferable to use the ratio of an image shift amount from the viewpoint of a calculation amount.

At the authentication, the size correction unit 11 reads the image shift amount so corresponding to one registration pattern from the registration pattern storage unit 8, calculates the ratio so/s' of the read image shift amount so to the image shift amount s' estimated by the shift estimation unit 10, uses the calculated ratio as a size correction magnification ratio, thereby performing the size correction processing for a single image vein pattern restructured by the image restructuring unit 7. When the size of a vein pattern is, for example, Px (pixel)×Py (pixel), it is changed (enlarge or reduced) to the size of Px·so/s' (pixel)×Py·so/S' (pixel).

As processing for correcting (changing) the size, a nearest neighbor algorithm, a bilinear algorithm, a bicubic algorithm, etc., can be used. Furthermore, the measurement of an image shift amount between ommatidium images is included in processing for restructuring a single image from a compound eye image. Therefore, extra installation of hardware and calculators is not required.

In case that the ratio of a subject distance is used as a size correction magnification ratio, the size correction unit 11 reads the subject distance Lo corresponding to one registration pattern from the registration pattern storage unit 8, calculates the subject distance L' at the authentication according to the formula (2) from the image shift amount s' estimated by the shift estimation unit 10, and uses the calculated ratio L'/Lo as a size correction magnification ratio, thereby performing the size correction processing for a single image vein pattern restructured by the image restructuring unit 7.

Next, the authentication processing unit 9 is described. The authentication processing unit 9 verifies the vein pattern of a person to be authenticated of which the size is corrected by the size correction unit 11 against a registration pattern (vein pattern of a single image) stored in the registration pattern storage unit 8, and then determines whether the person to be authenticated is authenticated as a registered person based on a similarity or a difference between the vein pattern and the registration pattern. As an identification method, it is possible to use the pattern matching in which the vein pattern of the person to be authenticated and the registration pattern match each other or characteristic base matching in which the corresponding relationship of characteristic points between the vein pattern of the person to be authenticated and the registration pattern is examined.

Figure 6:
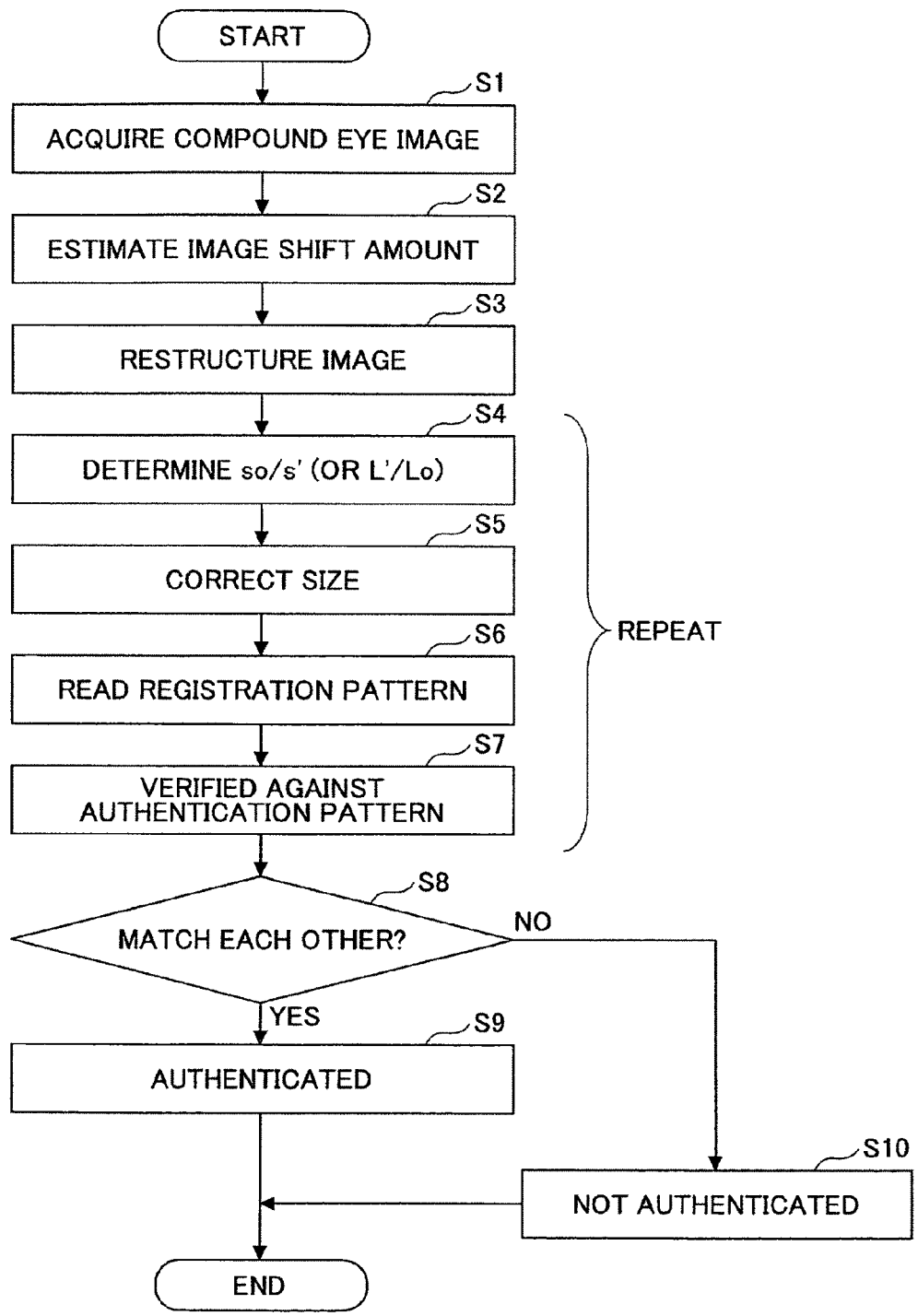
FIG. 6 is a flowchart showing a processing flow of authentication in the personal authentication device according to the first embodiment.

FIG. 6 is a flowchart showing entire processing of the authentication. When the person to be authenticated holds his/her finger or palm on the image acquisition unit, the compound eye image of the vein pattern of the person to be authenticated is stored in the image memory 6 (step S1). Next, the shift estimation unit 10 determines the image shift amount s' between ommatidium images from the compound eye image (step S2). Then, the image restructuring unit 7 restructures a single image of the vein pattern from the compound eye image by using the estimated image shift amount (step S3).

If plural registration patterns are stored in the registration pattern storage unit 8, processing steps from steps S4 through S7 are repeatedly performed. Therefore, the maximum number of repeating the processing steps is equivalent to the number of registration patterns stored in the registration pattern storage unit 8. First, the size correction unit 11 reads the image shift amount so corresponding to one registration pattern from the registration pattern storage unit 8 and uses the image shift amount s' estimated by the shift estimation unit 10, thereby calculating the size correction magnification ratio so/s' (step S4). Note that in the case of using the ratio of a subject distance, the size correction unit 11 reads the subject distance Lo corresponding to the registration pattern from the registration pattern storage unit 8 and calculates the subject distance L' according to the formula (2) from the image shift amount s' estimated by the shift estimation unit 10, thereby calculating the size correction magnification ratio Lo/L'. Next, the size correction unit 11 performs size correction processing using the size correction magnification ratio calculated in step S4 on the vein pattern restructured to be a single image by the image restructuring unit 7 (step S5). Then, the authentication processing unit 9 reads the registration pattern from the registration pattern storage unit 8 (step S6) and performs the pattern matching or the characteristic base matching between the registration pattern and the vein pattern of the person to be authenticated of which the size is corrected by the size correction unit 11 to determine whether the registration pattern and the vein pattern match each other (step S7). If they match each other, the processing steps from steps S4 through S7 are completed. If they do not match each other, the processing steps from steps S4 through S7 are performed on the next registration pattern. When the last registration pattern stored in the registration pattern storage unit 8 is processed, the processing steps from steps S4 through S7 are completed even if the registration pattern and the vein pattern do not match each other.

In the above processing, if it is determined that the registration pattern and the vein pattern match each other (YES in step S8), the authentication processing unit 9 outputs a message indicating that the person to be authenticated is authenticated as the registered person (step S9). If it is determined that they do not match each other, the authentication processing unit 9 outputs a message that the person to be authenticated is not authenticated as the registered person (step S10). Thus, a series of the personal authentication processing steps is completed.

Note that the personal authentication device according to this embodiment has the registration processing unit 14, but it may be configured not to have the registration processing unit 14. This modification is also included in the embodiment of the present invention. According to this modification, it is necessary to acquire the compound eye image of the vein pattern of a registrant with an image acquisition unit having the same configuration as the personal authentication device of this embodiment and correspondingly store the vein pattern (registration pattern) of a single image obtained by restructuring the compound eye image and a subject distance at the time of acquiring the compound eye image or an image shift amount between adjacent ommatidium images in the registration pattern storage unit 8 of the personal authentication device.

Modification of First Embodiment

Figure 7:
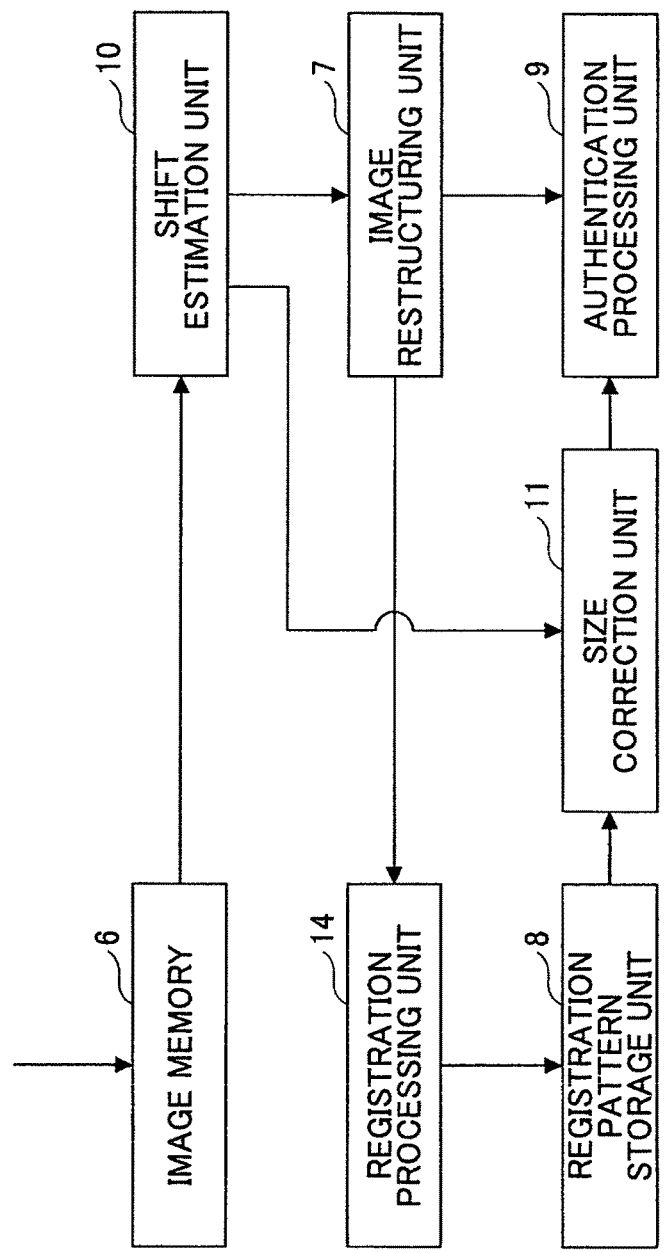
FIG. 7 is a block diagram showing a modification of the first embodiment.

In the first embodiment, the size correction processing is performed on the vein pattern of the person to be authenticated. Alternatively, as shown in FIG. 7, it is also possible to provide the size correction unit 11 between the registration pattern storage unit 8 and the authentication processing unit 9, perform the size correction processing on a registration pattern read from the registration pattern storage unit 8, and perform personal authentication using the pattern matching or the characteristic base matching between the registration pattern of which the size is corrected and the vein pattern of the person to be authenticated of which the size is not corrected. A size correction magnification ratio for the registration pattern is s'/so or Lo/L'.

Second Embodiment

Figure 8:
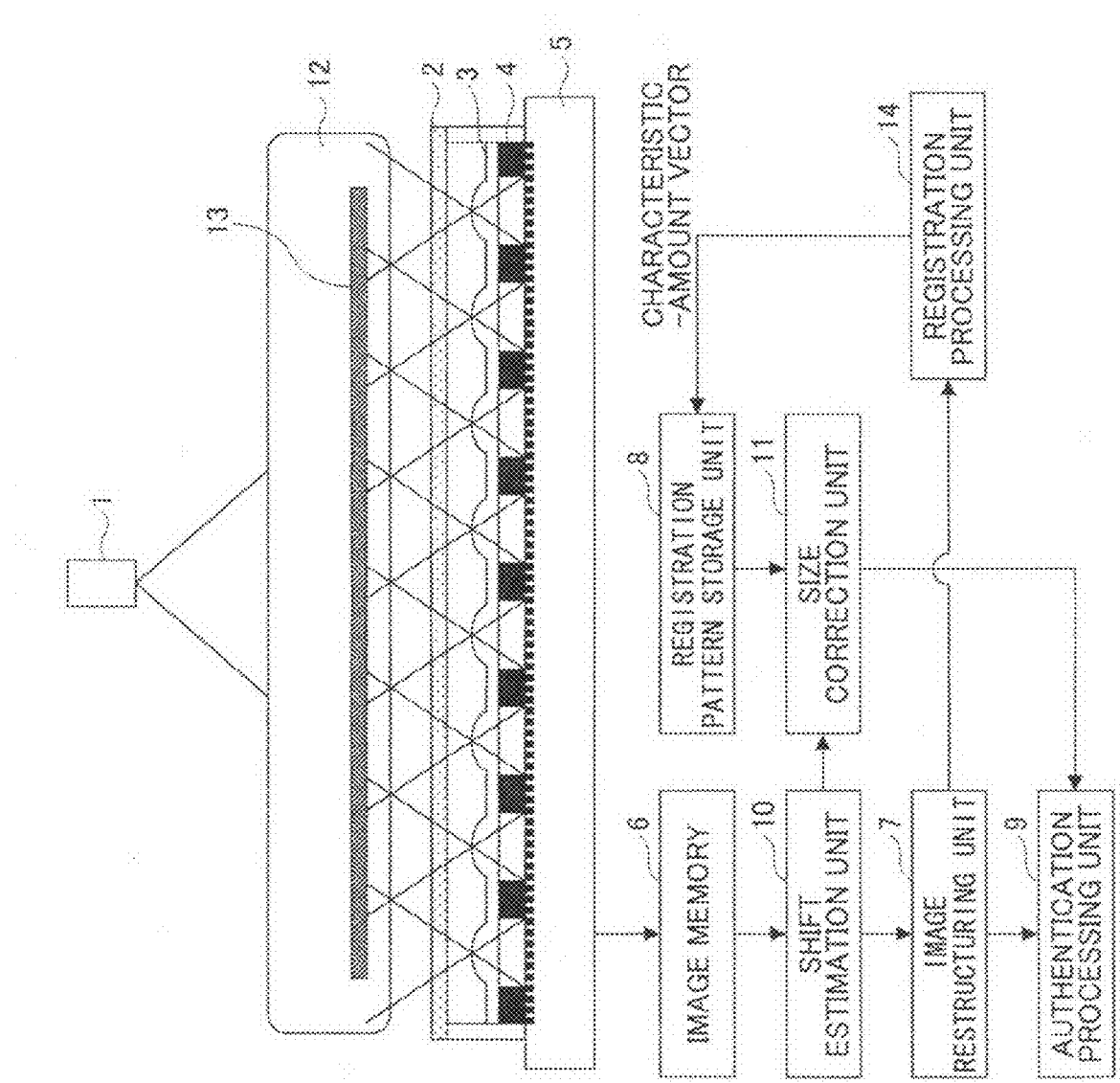
FIG. 8 is a view for explaining the configuration of the personal authentication device according to a second embodiment of the present invention.

FIG. 8 is a view for explaining the configuration of the personal authentication device according to a second embodiment of the present invention. In this embodiment, constituents the same as or corresponding to those of the first embodiment are denoted by the same reference numerals.

The configuration of the image acquisition unit of this embodiment is the same as that of the image acquisition unit of the first embodiment. The configuration of the processing system of this embodiment is partially different from that of the processing system of the first embodiment. Next, the difference is described.

At the registration, the registration processing unit 14 extracts a characteristic-amount vector from a vein pattern (image) obtained when the image restructuring unit 7 restructures a compound eye image acquired from the finger or palm of a registrant by the image acquisition unit, and then stores the characteristic-amount vector in the registration pattern storage unit 8 as a registration pattern. Here, the characteristic-amount vector is the vector representation of the characteristic points such as branch points of a vein pattern and a relative positional relationship between the characteristic points. Furthermore, the registration processing unit 14 stores an image shift amount (or a subject distance calculated from the image shift amount) estimated by the shift estimation unit 10 in the registration pattern storage unit 8 so as to correspond to the registration pattern.

At the authentication, the size correction unit 11 reads the registration pattern from the registration pattern storage unit 8 and performs size correction (change) processing on the length component of the characteristic-amount vector. A magnification ratio in the size correction processing is the ratio s'/so of the image shift amount s' at the authentication to the image shift amount so corresponding to the registration pattern, or is the ratio Lo/L' of the subject distance L' calculated from the image shift amount so to the subject distance Lo corresponding to the registration pattern.

The authentication processing unit 9 extracts the characteristic-amount vector from the vein pattern of the person to be authenticated as a single image restructured by the image restructuring unit 7, and performs personal authentication by verifying the characteristic-amount vector against the characteristic-amount vector of which the size is corrected by the size correction unit 11.

Figure 9:
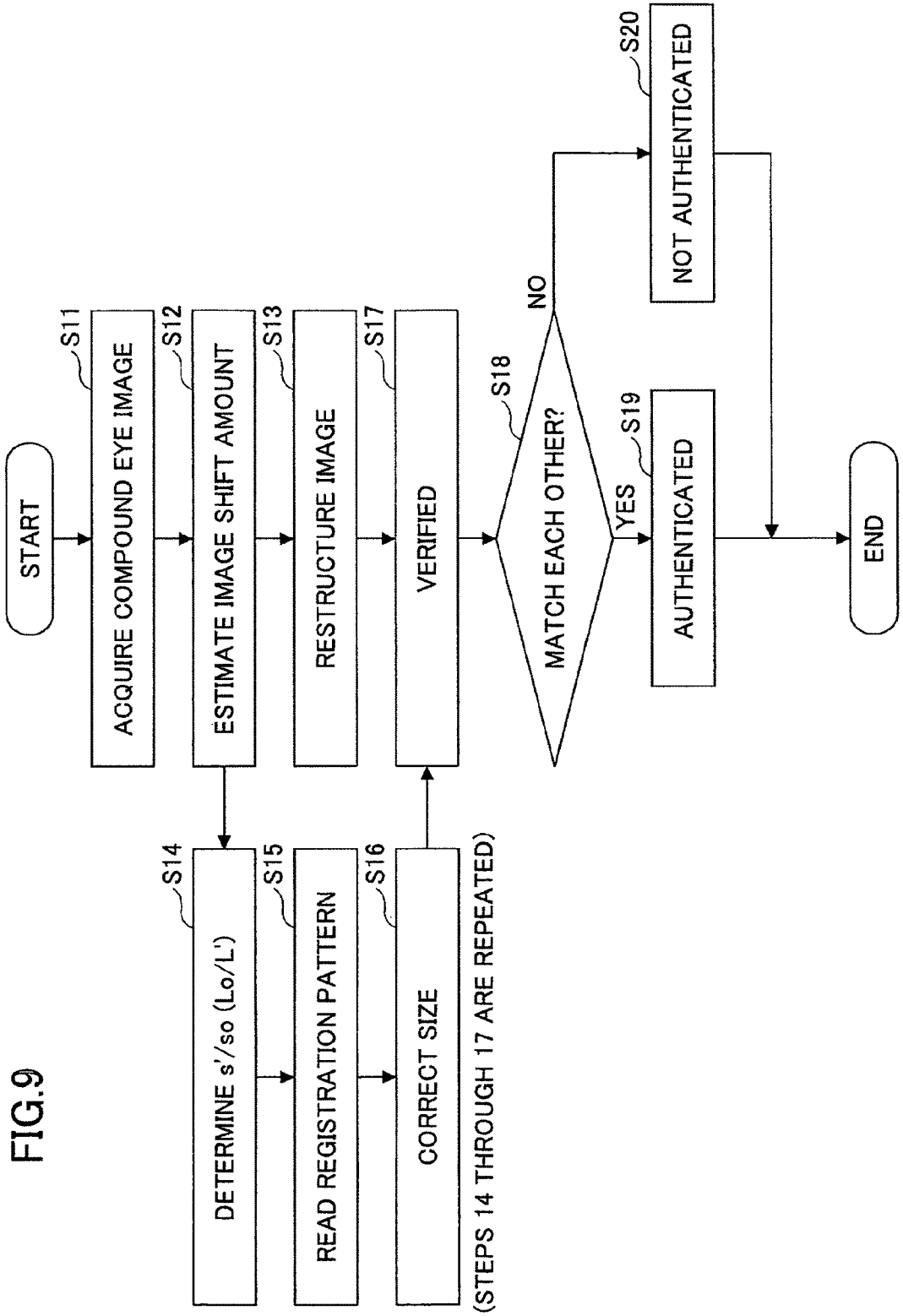
FIG. 9 is a flowchart showing a processing flow of the authentication in the personal authentication device according to the second embodiment of the present invention.

FIG. 9 is a flowchart showing entire processing of the authentication. When the person to be authenticated holds hi s/her finger or palm on the image acquisition unit, the compound eye image of the vein pattern of the person to be authenticated is stored in the image memory 6 (step S11). Next, the shift estimation unit 10 determines the image shift amount s' between ommatidium images from the compound eye image (step S12). Then, the image restructuring unit 7 restructures the single image of the vein pattern of the person to be authenticated from the compound eye image by using the estimated image (step S13).

If plural registration patterns are stored in the registration pattern storage unit 8, processing steps from steps S14 through S17 are repeatedly performed. Therefore, the maximum number of repeating the processing steps is equivalent to the number of registration patterns stored in the registration pattern storage unit 8. First, the size correction unit 11 reads the image shift amount so corresponding to one registration pattern from the registration pattern storage unit 8 and uses the image shift amount s' estimated by the shift estimation unit 10, thereby calculating the size correction magnification ratio s'/so (step S14). Note that in the case of using the ratio of a subject distance, the size correction unit 11 reads the subject distance Lo corresponding to the registration pattern from the registration pattern storage unit 8 and calculates the subject distance L' according to the formula (2) from the image shift amount s' estimated by the shift estimation unit 10, thereby calculating the size correction magnification ratio L'/Lo. Next, the size correction unit 11 reads the registration pattern from the registration pattern storage unit 8 (step S15) and performs size correction processing by multiplying the length component of the characteristic-amount vector of the registration pattern by a size magnification ratio (step S16). The authentication processing unit 9 extracts a characteristic-amount vector from the vein pattern of the person to be authenticated restructured to be a single image by the image restructuring unit 7, and verifies the characteristic-amount vector against a characteristic-amount vector of which the size is corrected, thereby determining whether they match each other (step S17). If they match each other, the processing steps from steps S14 through S17 are completed. If they do not match each other, the processing steps from steps S14 through S17 are performed on the next registration pattern. When the last registration pattern stored in the registration pattern storage unit 8 is processed, the processing steps from steps S14 through S17 are completed even if they do not match each other.

In the above processing, if it is determined that they match each other (YES in step S18), the authentication processing unit 9 outputs a message indicating that the person to be authenticated is authenticated as the registered person (step S9). If it is determined that they do not match each other, the authentication processing unit 9 outputs a message that the person to be authenticated is not authenticated as the registered person (step S10). Thus, a series of the personal authentication processing steps is completed.

Modification of Second Embodiment

In the above second embodiment, the size correction processing is performed on the registration pattern (characteristic-amount vector). Alternatively, it is also possible to provide the size correction unit between the restructuring unit 7 and the authentication processing unit 9 to perform the size correction processing on the vein pattern of the person to be authenticated. In this case, a size correction magnification ratio is s'/so or Lo/L'.

Moreover, it is also possible to provide a unit corresponding to the size correction unit in the authentication processing unit 9 and perform the size correction processing on the characteristic-amount vector extracted from the vein pattern of the person to be authenticated restructured by the image restructuring unit 7. In this case, a size correction magnification ratio is s'/so or Lo/L'.

Third Embodiment

Figure 10:
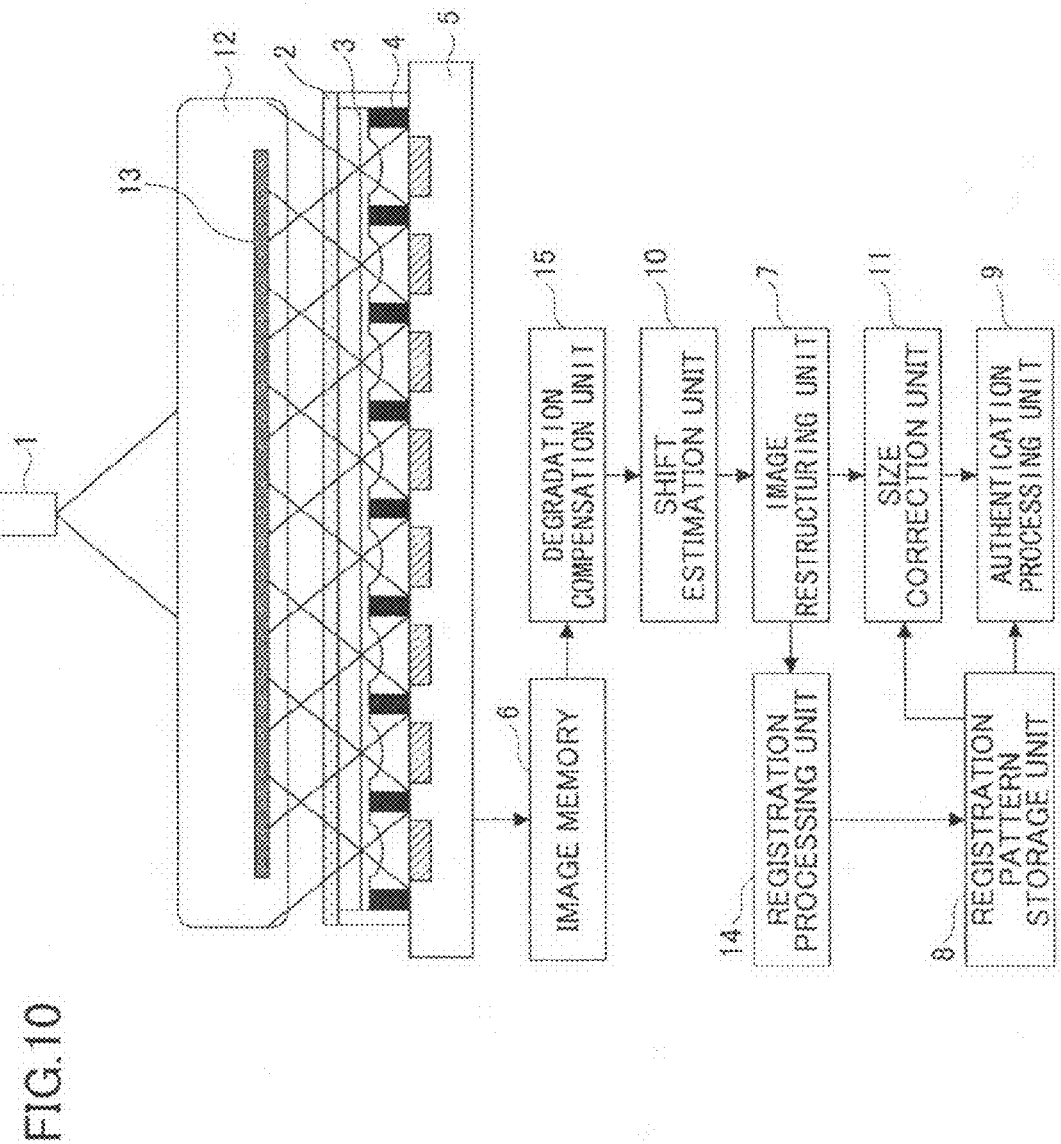
FIG. 10 is a view for explaining the configuration of the personal authentication device according to a third embodiment of the present invention.

FIG. 10 is a view for explaining the configuration of the personal authentication device according to a third embodiment of the present invention. In this embodiment, the lenses constituting the lens array 3 of the image acquisition unit are plane-convex lenses having a convex surface on its image side, and a processing step performed by a degradation compensation unit 15 for compensating image degradation due to an optical system is added before a processing step performed by the shift estimation unit 10. Other configurations of this embodiment are the same as those of the first embodiment.

As the shapes of lenses having a light condensing effect or an image forming effect, a plane-convex shape and a double-sided convex shape are known. From the viewpoint of manufacturing costs, a spherical lens having the plane-convex surface is effective for reducing the costs. In the case of the double-sided convex shape, it is necessary to process many surfaces and align the light axes of both sides to each other. Therefore, in processing methods such as etching and polishing processing or molding processing methods using a mold manufactured by the processing methods, it is also necessary to include a step of aligning the light axes to each other, which may result in the reduction of yields.

Figure 11A:
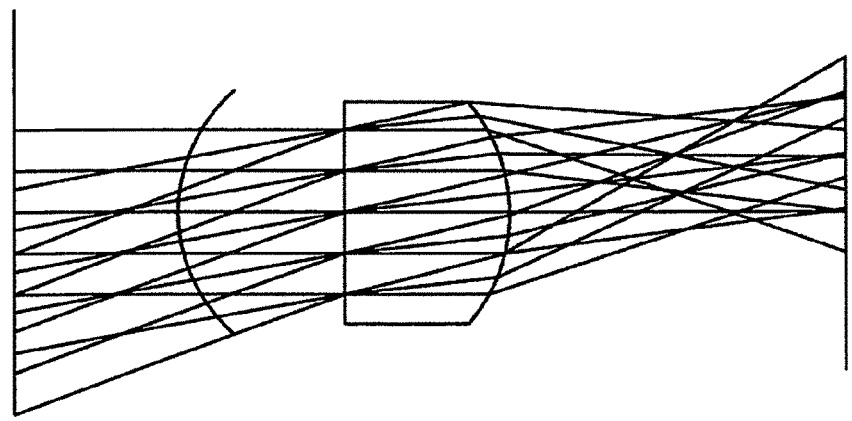
FIGS. 11A and 11B show the optical layout and the MTF characteristic of a plane-convex lens having a convex surface on the side of an image.
Figure 11B:
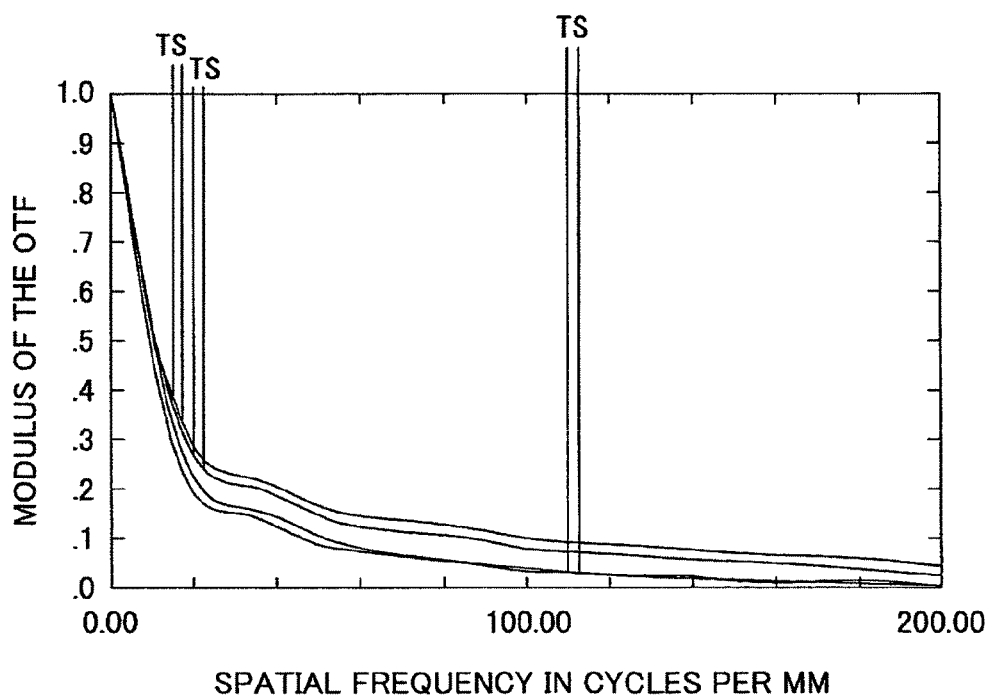
Figure 12A:
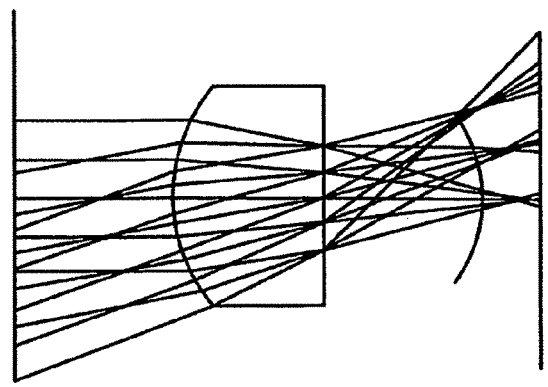
FIGS. 12A and 12B show the optical layout and the MTF characteristic of a plane-convex lens having a convex surface on the side of an object.
Figure 12B:
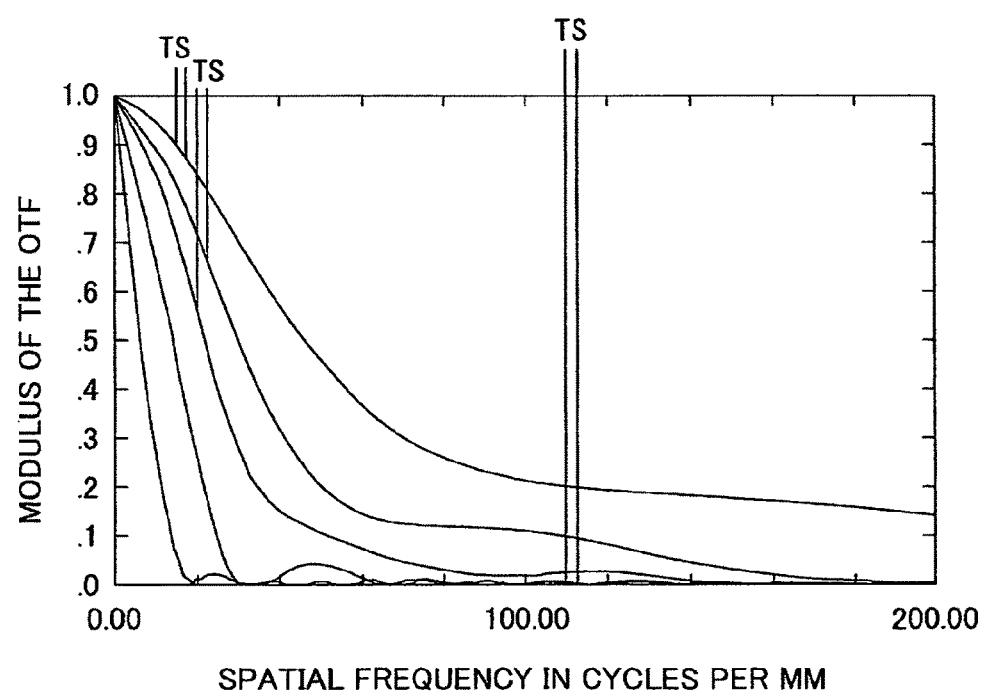

FIGS. 11A and 11B show the optical layout and the MTF characteristic of a plane-convex lens having a convex surface on the side of an image. FIGS. 12A and 12B show the optical layout and the MTF characteristic of a plane-convex lens having a convex surface on the side of an object. FIGS. 11B and 12B show MTF curves at plural different view angles.

As shown in FIG. 12B, in the case of the plane-convex lens having the convex surface on the object side, the MTF curves greatly fluctuate due to fluctuations in view angles, and image forming performance for light beams generated from positions having a high view angle is dramatically reduced. On the other hand, as shown in FIG. 11B, in the case of the plane-convex lens having the convex surface on the image side, the MTF curves hardly fluctuate regardless of the fluctuations in the view angles, and a certain level or higher image forming performance is maintained over the wide view angles.

The degradation compensation unit 15 performs the degradation compensation processing for a compound eye image taken by the use of the MTF curves (FIG. 11B) known at the time of designing an optical system. As shown in FIG. 11B, the MTF curves do not become zero even at high spatial frequencies. Therefore, with the use of an appropriate filter, it is possible to improve contrast and obtain a sharp image. For example, a Wiener filter can be used as this filter. In addition, since the MTF curves are almost constant regardless of the image views, it is possible to perform the degradation compensation processing with simple digital filter processing using one kind of the Wiener filter. Therefore, the degradation compensation unit 15 can be realized at low cost.

Using the compound eye image after being subjected to the degradation compensation processing by the degradation compensation unit 15, the shift estimation unit 10 estimates an image shift amount. In addition, the image restructuring unit 7 performs the processing of restructuring a single image from the compound eye image. Therefore it is possible to acquire a sharp vein pattern. Other configurations and operations of this embodiment are the same as those of the first embodiment.

In this embodiment, it is preferable to match the diameters of the opening parts of the light shielding member 4 to those of the lenses of the lens array 3 because the lens array 3 and the light shielding member 4 can be accurately aligned to each other easily and at low cost at the time of assembling the device. This alignment operation is described below with reference to FIGS. 13A and 13B.

If the lens array 3 and the light shielding member 4 are assembled together by assembling equipment having only an inaccurate positioning function or by hand, a state shown in FIG. 13A is caused. In this state, regions through which light originally passes are shielded by the light shielding member 4. Therefore, an accurate image cannot be obtained.

Assuming that the diameters of the lenses and those of the opening parts of the light shielding member 4 match each other, when slight vibrations are just applied to the lens array 3 and the light shielding member 4 in the state shown in FIG. 3A, the light shielding member 4 fits in the flat parts between the respective lenses of the lens array 3. As a result, a desirable positional relationship shown in FIG. 13B is established. Accordingly, the alignment accuracy of the assembling equipment may be about half of that of the lens diameters.

After the alignment operation, the light shielding member 4 is fixed to the lens array 3. As a fixing method, it is possible to perform fixation using an adhesive or a light curing resin. Particularly, if an ultraviolet curing resin is used, a fixing operation becomes easier and can be performed at low cost.

Note that even when the lenses of the lens array 3 are formed to have double-sided convex surfaces, it can undergo the above alignment operation as a matter of course.

Modification of Third Embodiment

In the above first and second embodiments or the modifications of these embodiments, it is also possible to use the lens array of this embodiment and add the degradation compensation unit before the shift estimation unit.

In other words, it is also possible to provide the size correction unit between the registration pattern storage unit 8 and the authentication processing unit 9, perform the size correction processing on a registration pattern read from the registration pattern storage unit 8, and perform personal authentication using the pattern matching or the characteristic base matching between the registration pattern of which the size is corrected and the vein pattern of a person to be authenticated of which the size is not corrected.

Moreover, as in the second embodiment, it is also possible to store a characteristic-amount vector extracted from the vein pattern of a registrant in the registration pattern storage unit 8 as a registration pattern, provide the size correction unit between the registration pattern storage unit 8 and the authentication processing unit 9, and perform the size correction processing on a characteristic-amount vector read from the registration pattern storage unit 8. Alternatively, it is also possible to provide a unit that performs size correction in the authentication processing unit 9 and perform the size correction processing on a characteristic-amount vector extracted from the vein pattern of a person to be authenticated.

Figure 15:
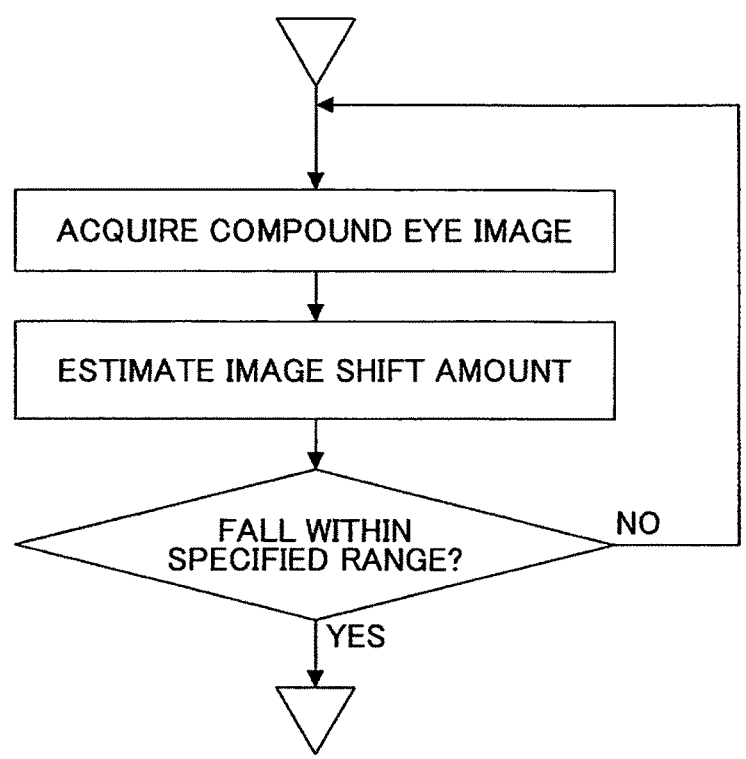
FIG. 15 is a flowchart for explaining processing for restricting the range of a subject distance to acquire a compound eye image.

Note that if a subject comes too close to the image acquisition unit, the region of the subject for taking an image is narrow and adequate information on a vein pattern cannot be obtained. On the other hand, if the subject is separated too far away from the image acquisition unit, the resolution of an image to be taken is greatly reduced, which in turn causes degradation in shift estimation accuracy and authentication accuracy. Therefore, it is preferable to set a subject distance within an appropriate range at the registration and authentication. To this end, in the above embodiments and the modifications of these embodiments, determination is made as to whether an image shift amount estimated from an acquired compound eye image falls within a specified range as shown in FIG. 15 at the registration and authentication. Then, until the estimated image shift amount falls within the specified range, the acquisition of a compound eye image and the estimation of an image shift amount are repeatedly performed. In this manner, the compound eye image taken within an appropriate subject distance is used as a valid compound eye image.

Fourth Embodiment

Figure 16:
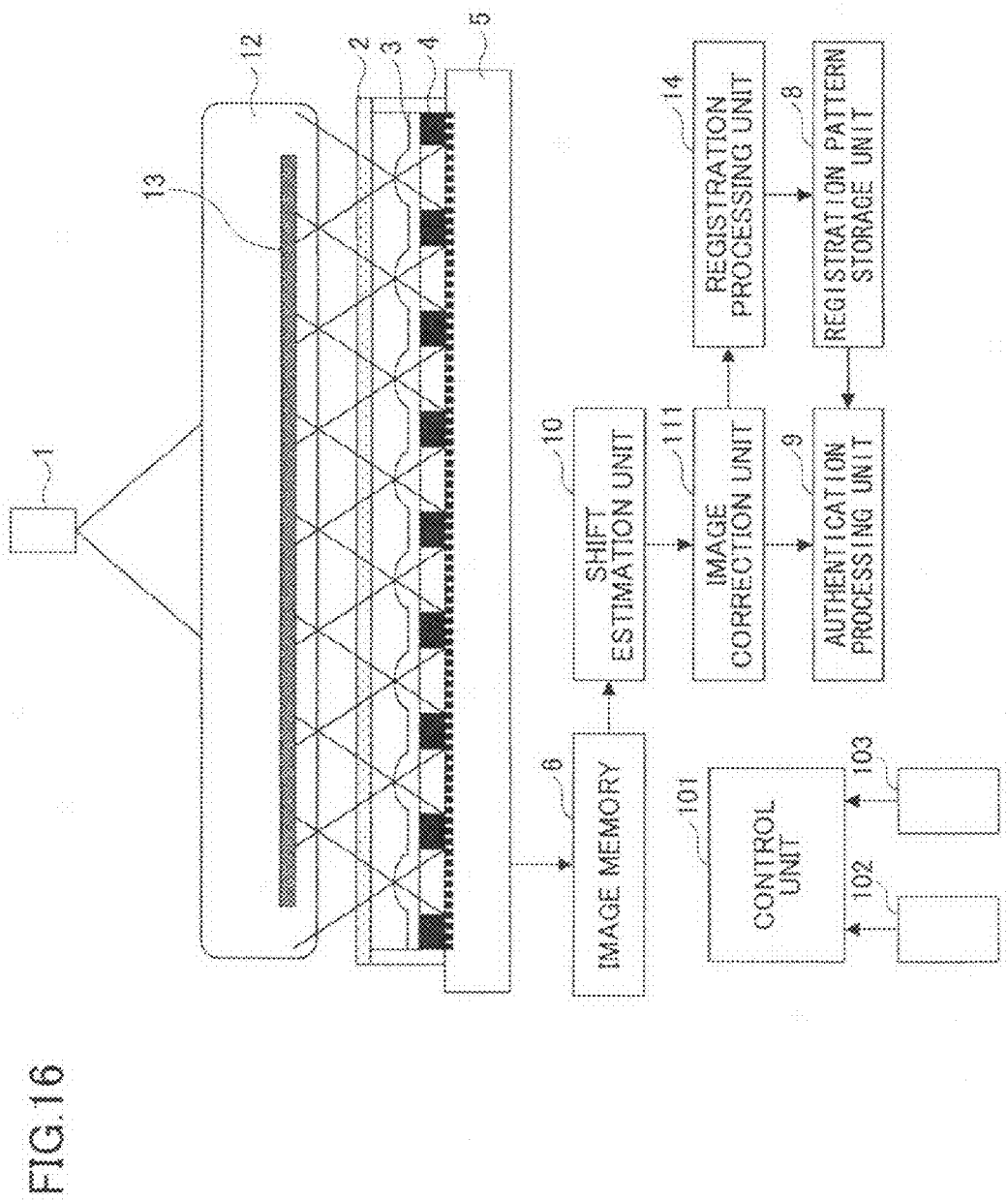
FIG. 16 is a view showing the configuration of the personal authentication device according to fourth and fifth embodiments of the present invention.

FIG. 16 is a view showing the configuration of the personal authentication device according to a fourth embodiment of the present invention. The configuration of the image acquisition unit of this embodiment is the same as that of the image acquisition unit of the first embodiment. In this embodiment, one ommatidium image of a compound eye image acquired by the image acquisition unit is used for authentication processing. An image correction unit 111 regards the one ommatidium image of the compound eye image as a processing object and performs correction processing on it. The image correction unit 111 can perform not only processing for compensating (enlarging and reducing) fluctuations in a subject distance but also processing for correcting the inclination of a living body in the light-axis direction of the lenses.

Reference numeral 101 denotes a control unit that controls the operations of respective components of a processing system and the image taking unit 5 and the light source 1 of the image acquisition unit. Reference numeral 102 denotes an operations selection switch for instructing the control unit 101 to select either a registration operation or an authentication operation. Reference numeral 103 denotes a start switch for instructing the control unit 101 to start operations. Units corresponding to the switches 102 and 103 and the control unit 101 are of course provided in the first, second, and third embodiments, but they are not shown in FIGS. 1, 7, 8, and 10.

Figure 17:
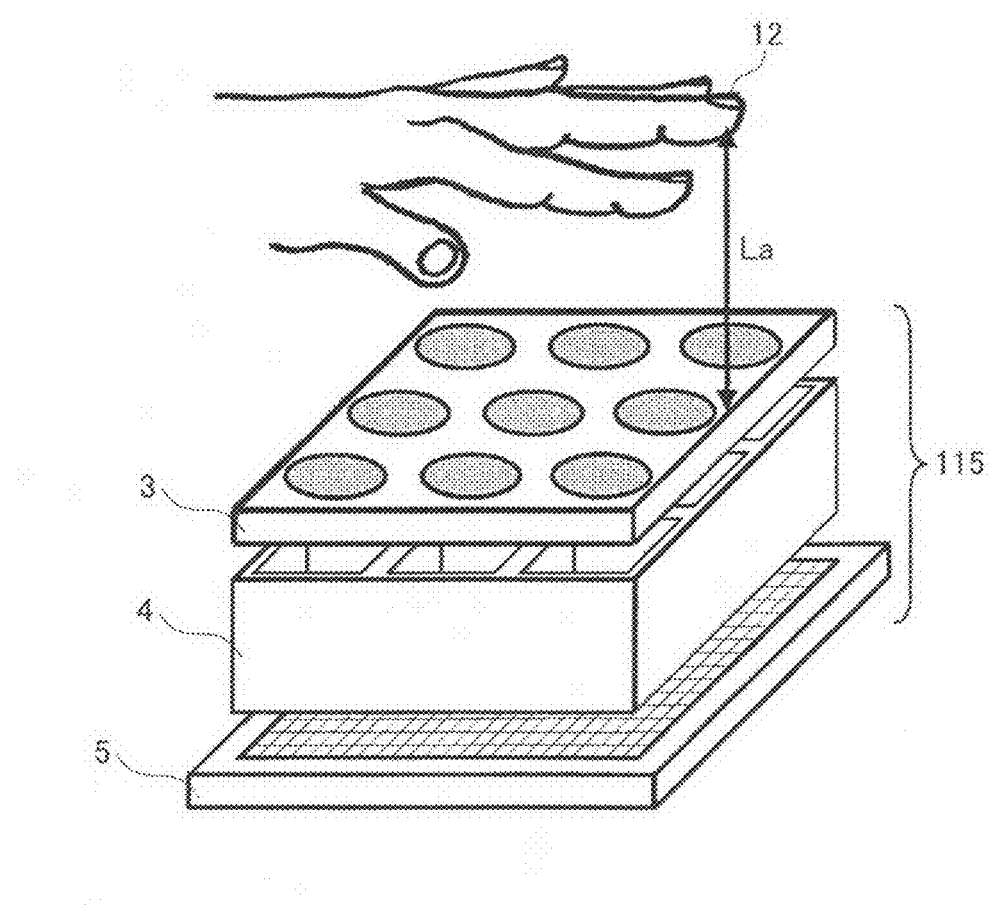
FIG. 17 is a schematic view showing a state in which an image is taken at a registration operation.
Figure 18:
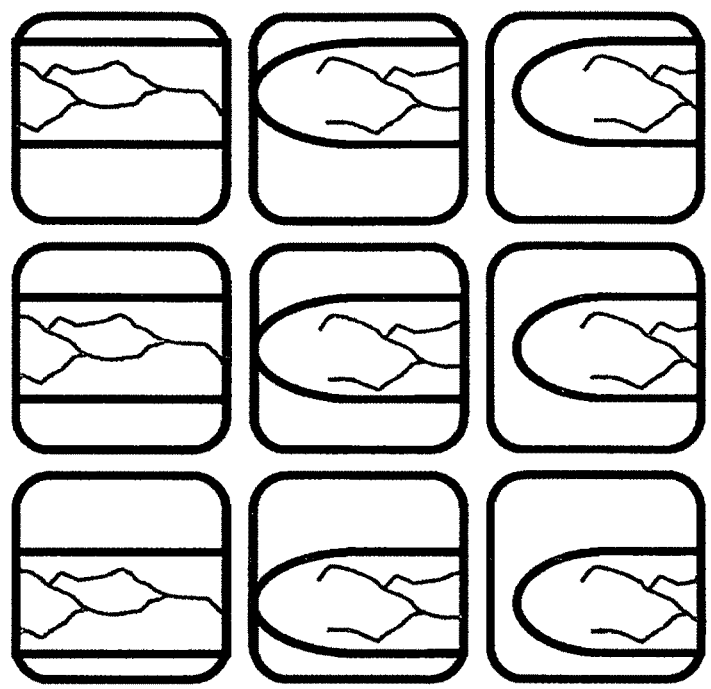
FIG. 18 is a schematic view of a compound eye image acquired at the registration operation.
Figure 20:
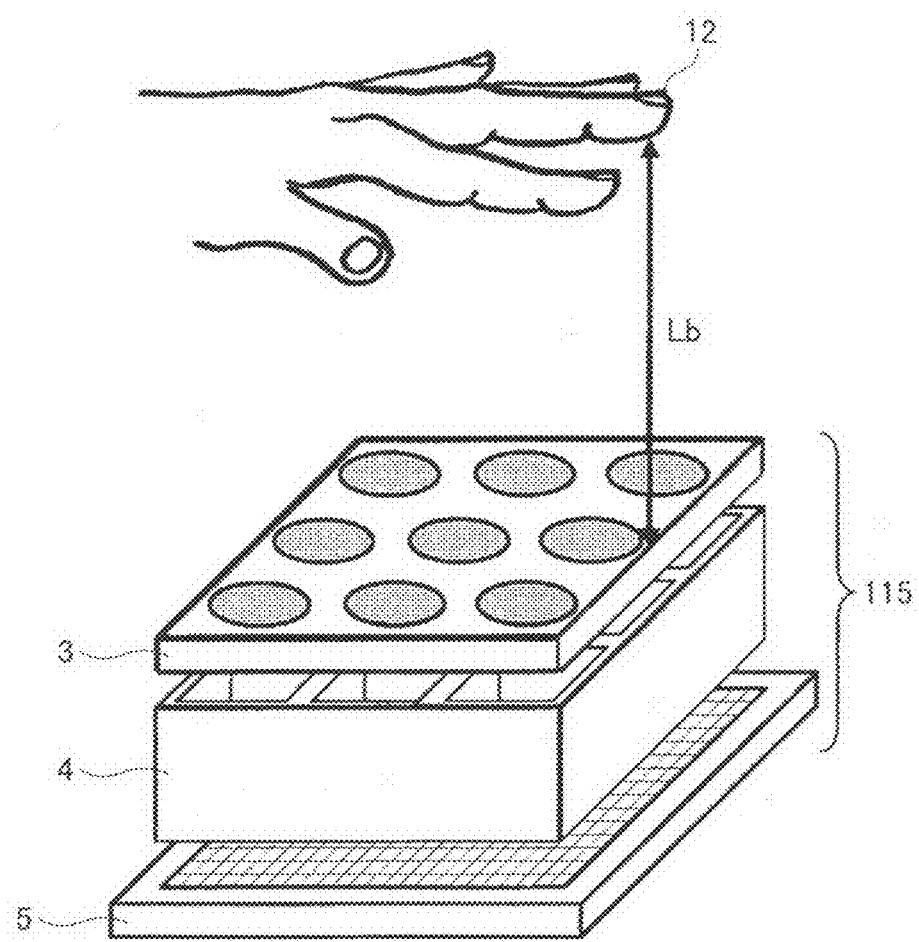
FIG. 20 is a schematic view showing a state in which the image of a subject is taken at an authentication operation.
Figure 21:
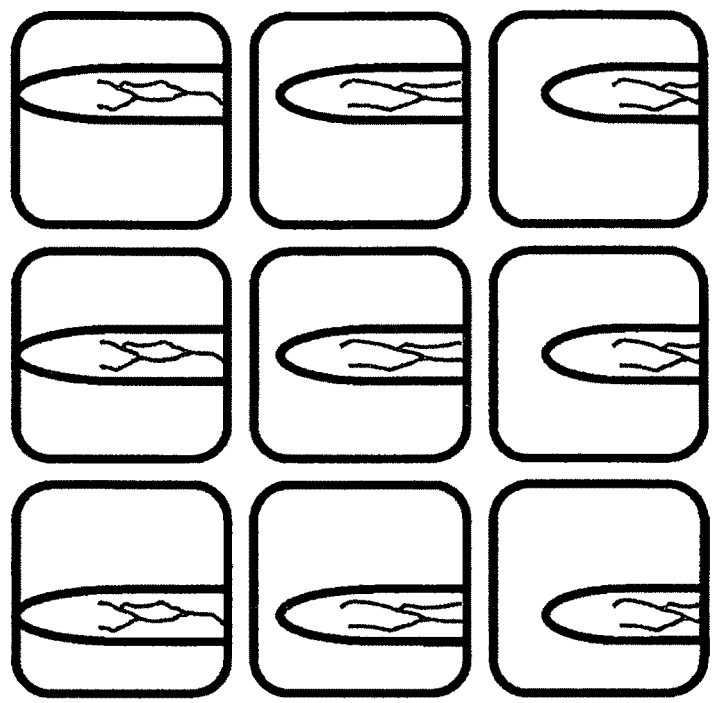
FIG. 21 is a schematic view of a compound eye image acquired at the authentication operation.

For example, let it is be assumed that an image is taken at a subject distance La as schematically shown in FIG. 17 to acquire a compound eye image as schematically shown in FIG. 18 at the registration operation and then an image is taken at a subject distance Lb (>La) as schematically shown in FIG. 20 to acquire a compound eye image as schematically shown in FIG. 21 at the authentication operation. Note that in FIGS. 17 and 20, the lens array 3, the light shielding member 4, and the image taking unit 5 constituting the image acquisition unit 115 are separated from one another, but this is done so as to facilitate the understanding of the configuration. Actually, these components are fixed by, for example, a housing in a positional relationship shown in FIG. 16. The number of lenses constituting the lens array 3 is not limited to nine. Furthermore, a relative size between a subject and the image acquisition unit 115 is illustrated for the sake of convenience.

As shown in FIGS. 18 and 21, the acquired compound eye image is composed of a set of ommatidium images formed through the lenses constituting the lens array 3, and the ommatidium images are images obtained by inverting the left, right, top, and bottom of a subject image. In the respective ommatidium images of the compound eye image shown in FIGS. 18 and 21, the contour of a finger is illustrated by a thick black line for the sake of convenience, and lines inside the contour of the finger represent a vein pattern.

The ommatidium images shown in FIGS. 18 and 21 are different in the size of the subject image because the subject distance at the time of taking the subject image is different. In this embodiment, at the registration and authentication, the image correction unit 111 performs image correction processing for compensating influences due to fluctuations in a subject distance or fluctuations in a subject position in the light-axis direction of the lenses. Next, operations at the registration and authentication are described.

Figure 19:
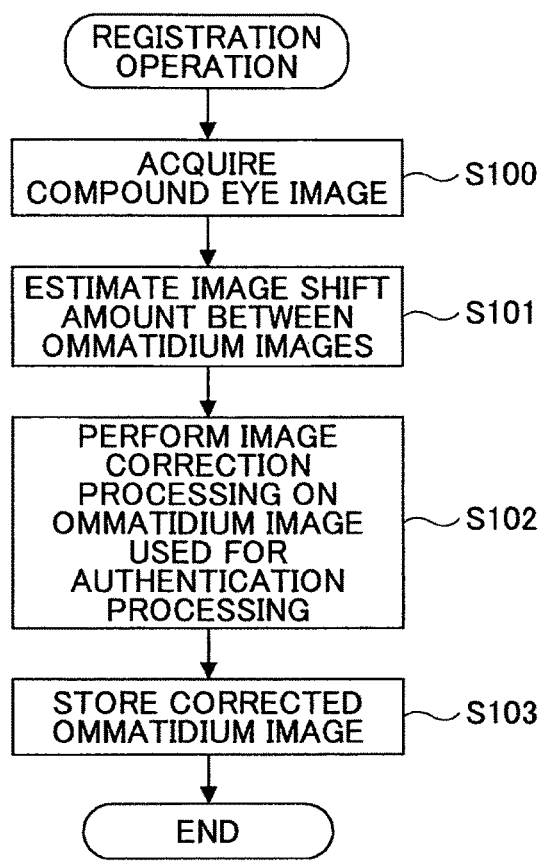
FIG. 19 is a flowchart showing a processing flow of the registration operation in the fourth embodiment.

First, the registration operation is described. When the registration operation is instructed by the operations selection switch 102 and starting of the registration operation is instructed by the start switch 103, the registration operation is executed by the control of the control unit 101. FIG. 19 shows a processing flow of the registration operation.

The control unit 101 first causes the light source 1 to emit light and the image taking unit 5 to take an image to export a compound eye image to the image memory 6 (step S100). Next, the control unit 101 causes the shift estimation unit 10 to estimate an image shift amount between two ommatidium images of the compound eye image imported to the image memory 6 (step S101). Although not shown in FIG. 19, it may be preferred to repeatedly perform the operations of determining whether the estimated image shift amount falls within a specified range and acquiring a compound eye image again to estimate another image shift amount if it does not fall within the specified range as shown in FIG. 15 until an image shift amount within the specified range is obtained (the same applies to the authentication operation described below). When an image shift amount is estimated by the pattern matching using the SSD, the specified range of the image shift amount may be determined so as to set a subject distance within a range in which the contour of a finger is included in the respective ommatidium images. The contour of the finger has high contrast and is used as effective information for estimating the image shift amount. Therefore, the contour of the finger is expected to improve accuracy in the image shift amount. As described above, the two ommatidium images used for estimating the image shift amount can be arbitrarily selected. In this embodiment, however, it is only necessary to estimate the image shift amount in either an x-direction or a y-direction. Therefore, it is preferable to select the ommatidium images in either the x-direction or the y-direction not in an oblique direction because a calculation amount for estimating the image shift amount can be reduced. Furthermore, as described above, when the subject distance is set within the range in which the contour of the finger is included in the respective ommatidium images, it is preferable to estimate the image shift amount between the ommatidium images adjacent to each other in the vertical direction in FIG. 18.

Note that a known phase limitation correlation method can be used for estimating the image shift amount, but it may have an adverse affect on accuracy in estimating the image shift amount. Therefore, it is also possible to set the range of the subject distance so as not to include the contour of the finger in the ommatidium images. In the phase limitation correlation method, the two ommatidium images are each subjected to Fourier transform. Then, after the determination of the product of their phase data, the two ommatidium images are subjected to inverse Fourier transform. A shift from the center of the peak position in an obtained image corresponds to an image shift amount between the ommatidium images.

Next, the control unit 101 causes the image correction unit 111 to perform image correction processing on one ommatidium image (for example, the ommatidium image at the center of the compound eye image in FIG. 18) of the acquired compound eye image used for authentication processing (step S102). Here, the image correction processing represents processing for enlarging or reducing the ommatidium image so as to obtain a predetermined image shift amount S. This image correction processing corresponds to standardizing the subject distance in a pseudo manner. The relationship between the image shift amount and the subject distance is described before with reference to FIG. 5. In addition, as described above, the relationship between the image shift amount and the subject distance is represented by the formula (2). In the formula (2), f and d are constant in the same device.

Therefore, when the image is enlarged or reduced so as to set the image shift amount between ommatidium images in the corrected image to be S, the image is corrected in such a manner as to be taken at a constant subject distance $Ls = f \cdot d / (S \cdot p)$ (wherein p represents the size of one pixel). Assuming that the estimated image shift amount is Sa, a magnification ratio for enlarging or reducing the image may be S/Sa or Sa/S. However, it is necessary to fix the magnification ratio to one of them and use the same in common at the registration and authentication.

Then, the control unit 101 causes the registration processing unit 14 to store the corrected ommatidium image in the registration pattern storage unit 8 as a registration pattern (step S103). Note that the control unit 101 may cause the registration processing unit 14 to extract a characteristic-amount vector from the corrected ommatidium image and store the extracted characteristic-amount vector in the registration pattern storage unit 8 as the registration pattern. When the registration pattern is registered in this manner, the control unit 101 stops distributing power to the light source 1 and the image taking unit 5 to complete a series of registration operations.

Figure 22:
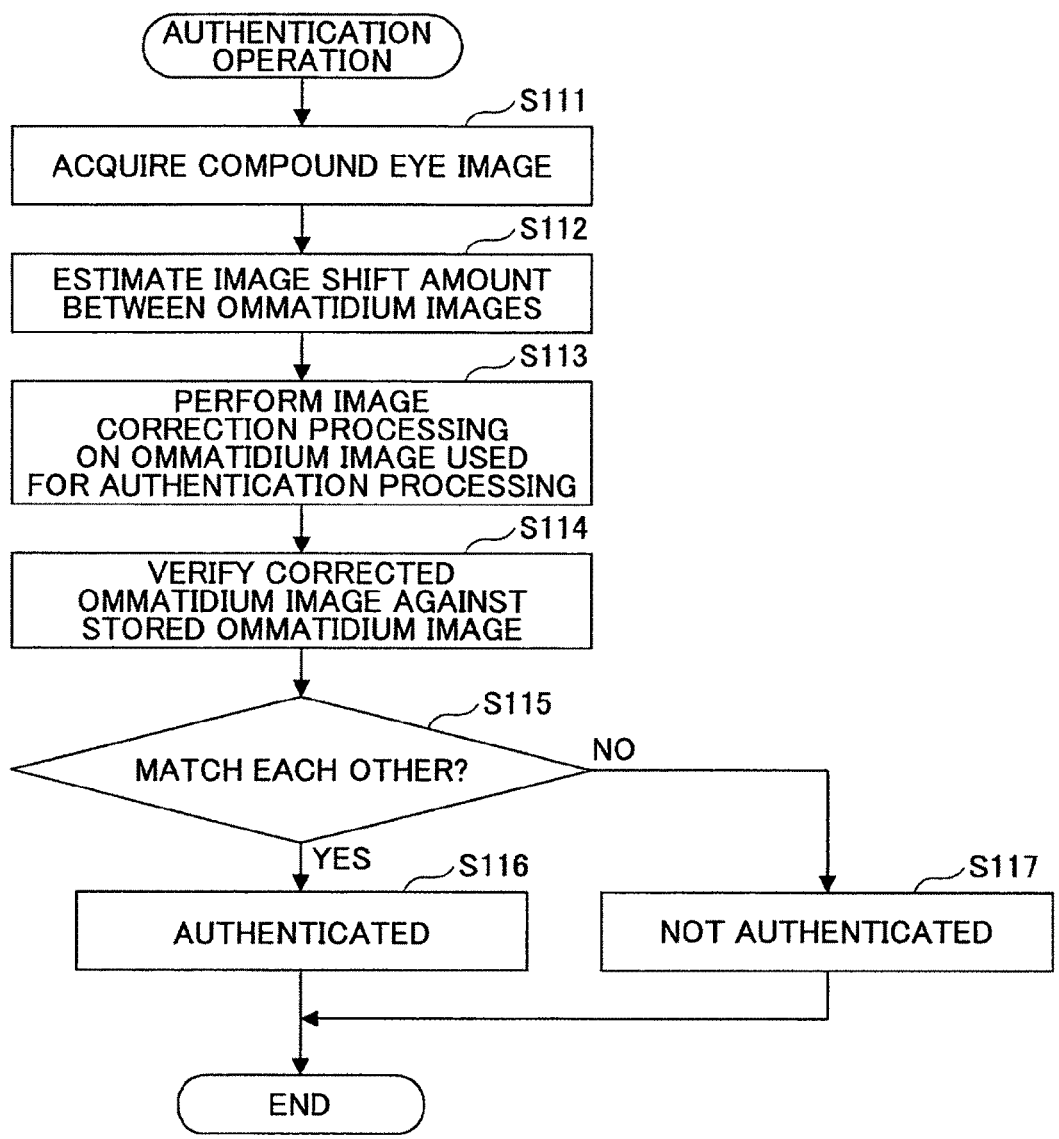
FIG. 22 is a flowchart showing a processing flow of the authentication operation in the fourth embodiment.

Next, the authentication operation is described. When the authentication operation is instructed by the operations selections switch 102 and starting of the authentication operation is instructed by the start switch 103, the authentication operation is executed by the control of the control unit 101. FIG. 22 shows a processing flow of the authentication operation.

The control unit 101 first causes the light source 1 to emit light and the image taking unit 5 to take an image to export a compound eye image to the image memory 6 (step S111). Next, the control unit 101 causes the shift estimation unit 10 to estimate an image shift amount between two ommatidium images of the compound eye image imported to the image memory 6 (step S112). Although not shown in FIG. 22, it may be preferred to repeatedly perform the operations of determining whether the estimated image shift amount falls within a specified range and acquiring a compound eye image again to estimate another image shift amount if it does not fall within the specified range in the same manner as the registration operation until an image shift amount within the specified range is obtained. A method for estimating the image shift amount at the authentication operation is the same as that for estimating the image shift amount at the registration operation.

Next, the control unit 101 causes the image correction unit 111 to perform image correction processing (enlarging or reducing processing) on one ommatidium image of the acquired compound eye image used for authentication processing (step S113). Assuming that an estimated image shift amount is Sb and a predetermined image shift amount is S similarly to the case of the registration operation, a magnification ratio for enlarging or reducing the image is S/Sa or Sa/S (same as the magnification ratio at the registration operation).

Then, the control unit 101 causes the authentication processing unit 9 to verify the corrected ommatidium image against the ommatidium image stored in the registration pattern storage unit as the registration pattern (step S114). This verification processing may be performed by the pattern matching or the characteristic base matching in which a relative positional relationship between the characteristic points of the images is determined. Note that when the characteristic-amount vector of the ommatidium image is stored in the registration pattern storage unit 8 as the registration pattern, the authentication processing unit 9 extracts the characteristic-amount vector of the corrected ommatidium image and verifies the extracted characteristic-amount vector against the characteristic-amount vector stored in the registration pattern storage unit 8 as the registration pattern. In either case, at the registration operation and the authentication operation, the image correction processing is performed on the ommatidium image in a pseudo manner as if the image is taken at the same subject distance. Therefore, as shown in FIGS. 17 and 20, even if the subject distances are different when the images are actually taken, authentication can be implemented with high accuracy.

If the corrected ommatidium image matches the ommatidium image stored in the registration pattern storage unit 18 (YES in step S115), the authentication processing unit 9 outputs a message indicating that the person to be authenticated is authenticated as a registered person (step S116). If the corrected ommatidium image is not identified with the ommatidium image stored in the registration pattern storage unit 18 (NO in step S115), the authentication processing unit 9 outputs a message that the person to be authenticated is not authenticated as the registered person (step S117). When an authentication result is output, the control unit 101 stops distributing power to the light source 1 and the image taking unit 5 to complete a series of authentication operations.

Unlike the foregoing embodiments, this embodiment, which uses only one ommatidium image of the compound eye image for the authentication, is not required to restructure a single image. In addition, a processing amount for performing the image correction processing is small.

(Correcting Inclination in Light-Axis Direction of Lens)

Figure 23:
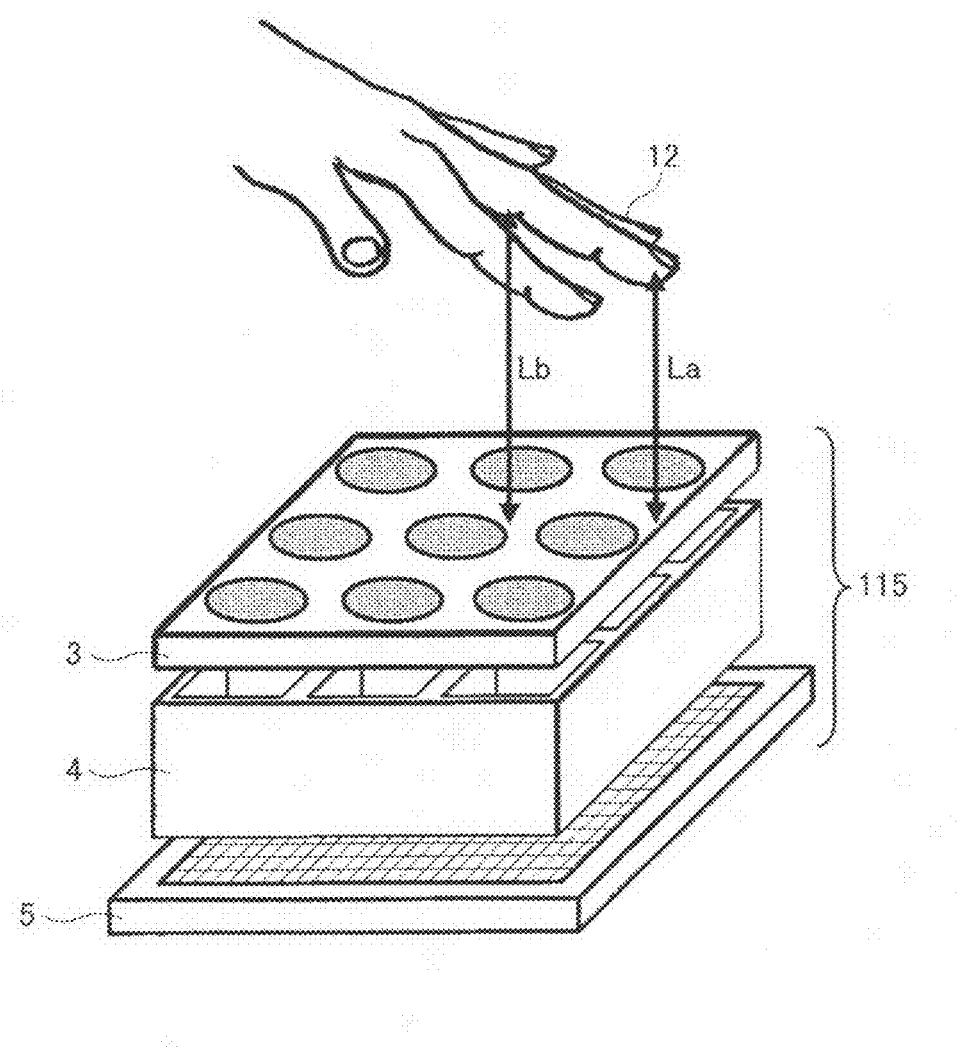
FIG. 23 is a schematic view showing a state in which the image of an inclined finger is taken at the authentication operation.
Figure 24:
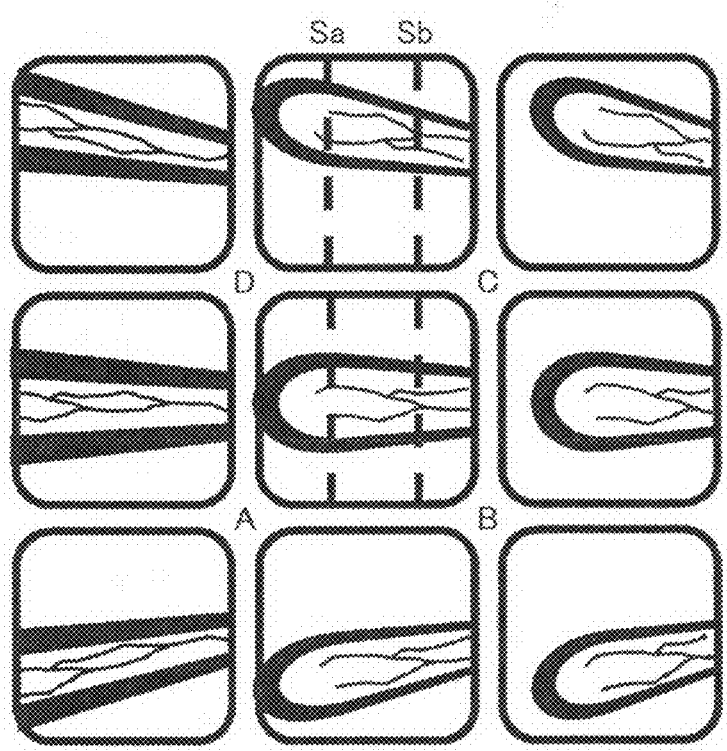
FIG. 24 is a schematic view of a compound eye image of the inclined finger.

The above image correction processing is directed to a case in which the subject distance is simply changed, but it can also be directed to a case in which fluctuations in the inclination of a finger are corrected. FIG. 23 shows a state in which the finger is inclined at the authentication. Here, the subject distance of the tip of the finger is La as in the case of the registration, and the subject distance of the base of the finger is Lb. FIG. 24 is an example of the compound eye image taken at this time. In FIG. 24, the image of the base of the finger is thinner than that of the tip of the finger. Furthermore, the image shift amount of the base of the finger is smaller than that of the tip of the finger. In order to correct this image so as to be the image of FIG. 18 in which the finger is not inclined, the following processing is performed.

First, an image shift amount is estimated both at the region of the tip of the finger and at the region of the base of the finger. Specifically, as shown in FIG. 24, the image shift amounts are estimated at two lines indicated by dotted lines. Here, the image shift amount estimated at the line of the tip of the finger is Sa, and the image shift amount estimated at the line of the base of the finger is Sb.

Figure 25B:
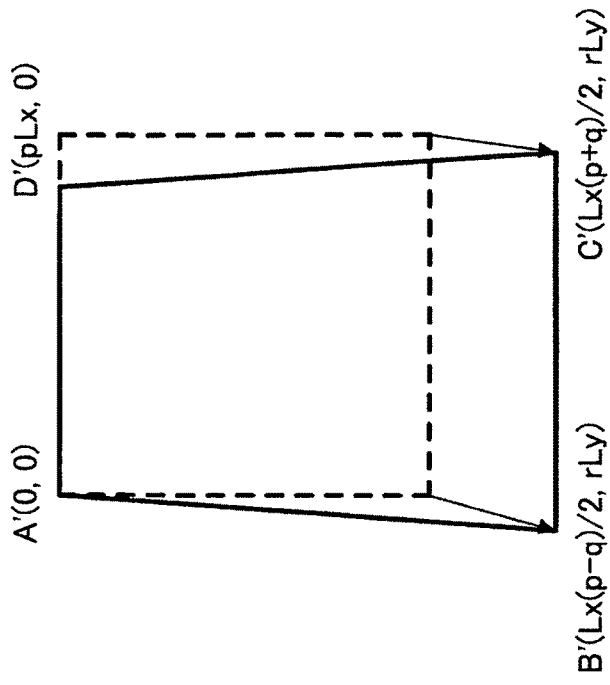
FIGS. 25A and 25B are views for explaining projective transformation processing on an ommatidium image.
Figure 25A:
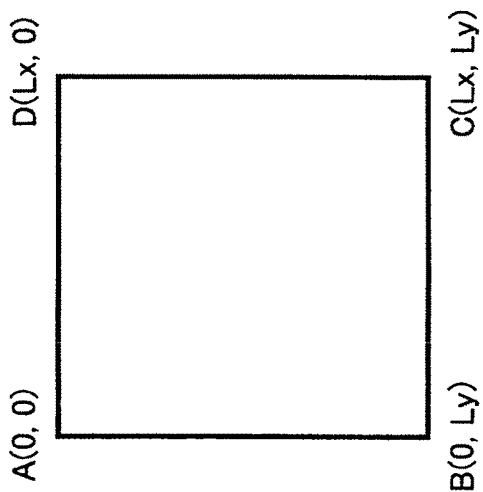

The inclination of the finger is corrected by projective transformation processing in which a rectangle or a square shown in FIG. 25A is transformed into a symmetrical trapezoid shown in FIG. 25B. Assuming that the magnification ratio of the top side of the trapezoid is p, the magnification ratio of the bottom side thereof is q, and the magnification ratio of the height thereof is r, its conversion can be represented by the following formula.

(Formula 3)

$$\begin{bmatrix} x' \\ y' \\ H \end{bmatrix} = \begin{bmatrix} p & \frac{(p-q)L_x}{2qL_y} & 0 \\ 0 & \frac{pr}{q} & 0 \\ 0 & \frac{p-q}{qL_y} & 1 \end{bmatrix} \begin{bmatrix} x \\ y \\ 1 \end{bmatrix} \quad (3)$$

Here, Lx is a length in the vertical direction of the ommatidium image in FIGS. 18 and 24, and Ly is a length between the two regions for estimating the image shift amount.

When the image shift amount at the tip of the finger is Sa (equivalent to the image shift amount in FIG. 18) and the image shift amount at the base of the finger is Sb, the formula (3) is applied to the central ommatidium image in FIG. 24 under conditions in which p=1, q=Sa/Sb, and r=R'/R so as to make the central ommatidium image in FIG. 24 nearly match the central ommatidium image in FIG. 18. Here, R and R' represent the length of the real space of a finger image between the region of the tip of the finger and the region of the base of the finger whose image shift amount is estimated. Assuming that the subject distance at the tip of the finger where the image shift amount is estimated is ya and the subject distance at the base of the finger where the image shift amount is estimated is yb, R and R' can be represented by the following formulae (4) and (5).

(Formula 4)

$$R = \frac{y_a}{f} L_y \quad (4)$$

(Formula 5)

$$R' = \sqrt{\left\{\frac{y_a + y_b}{2f} L_y\right\}^2 + (y_b - y_a)^2} \quad (5)$$

ya and yb can be determined based on f (distance between the lens array and an image-taken element) and d (lens pitch) known at a design time according to the above formula (2). Thus, r=R'/R can be calculated.

The projective transformation processing and the enlarging/reducing processing in which fluctuations in the subject distances are corrected are applied to the central ommatidium image. Note that the enlarging/reducing processing and the projective transformation processing may be performed in any order. A magnification ratio at the enlarging/reducing processing is either S/Sa or Sa/S. The enlarging/reducing processing and the projective transformation processing can be simultaneously performed in one processing in such a manner that the magnification ratio at the enlarging/reducing processing is multiplied by the conversion kernel of the formula (3).

Figure 26:
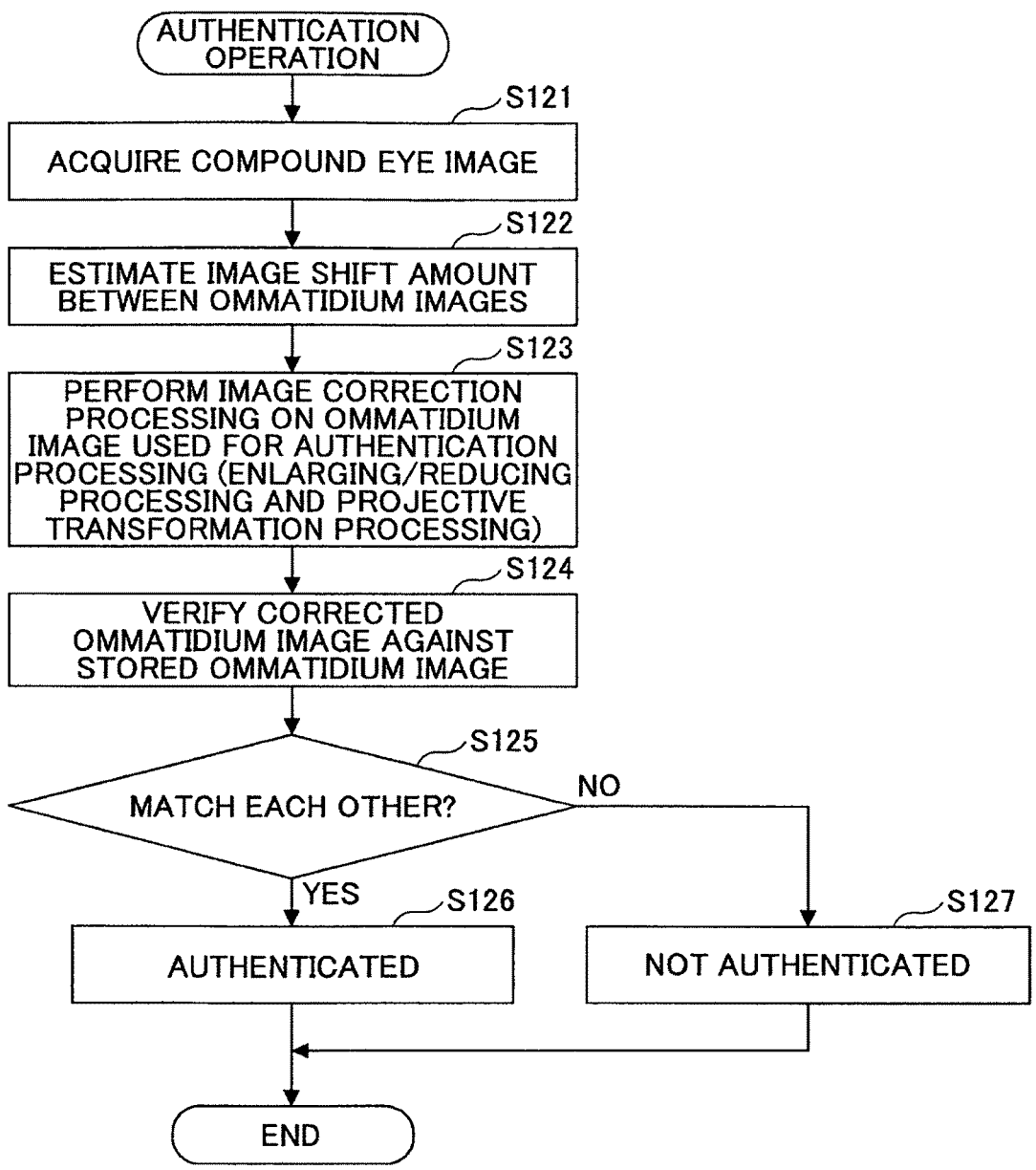
FIG. 26 is a flowchart showing a processing flow when the inclination of a finger is corrected at the authentication operation.

FIG. 26 is a processing flow of the authentication when the inclination of the finger is corrected as described above. The compound eye image taken by the image acquisition unit is imported to the image memory 6 (step S121). Then, the image shift amount Sa at the line of the tip of the finger and the image shift amount Sb at the line of the base of the finger indicated by dotted lines are estimated by the shift estimation unit 10 (step S122). Although not shown in FIG. 26, it may be preferred to repeatedly perform whether the estimated image shift amounts Sa and Sb fall within a specified range and the acquisition of a compound eye image and the estimation of image shift amounts until image shift amounts within the specified range are obtained. Next, using the estimated image shift amounts Sa and Sb, the image correction unit 111 separately or collectively performs the projective transformation processing under the formula (3) and the enlarging/reducing processing with the magnification ratio S/Sa or Sa/S (step S123). The authentication processing unit 9 verifies the ommatidium image corrected by the image correction unit 111 against the ommatidium image stored in the registration pattern storage unit 8 as the registration pattern (step S124). If the ommatidium image corrected by the image correction unit 111 matches the ommatidium image stored in the registration pattern storage unit 8 as the registration pattern (YES in step S125), the authentication processing unit 9 outputs a message indicating that the person to be authenticated is authenticated as the registered person (step S126). If it is determined that they do not match each other (NO in step S125), the authentication processing unit 9 outputs a message that the person to be authenticated is not authenticated as the registered person (step S127).

The above description is related to a case in which fluctuations in the position and the inclination (posture) of the finger in the light-axis direction are corrected. In addition, rotation using the longitudinal direction of the finger as an axis can also be corrected based on the contour or the vein pattern of the finger. Note that influences due to the in-plane rotation of the finger can be eliminated when the phase limitation correlation method is used for verifying the ommatidium image taken at the authentication against the registration pattern.

Fifth Embodiment

Figure 27:
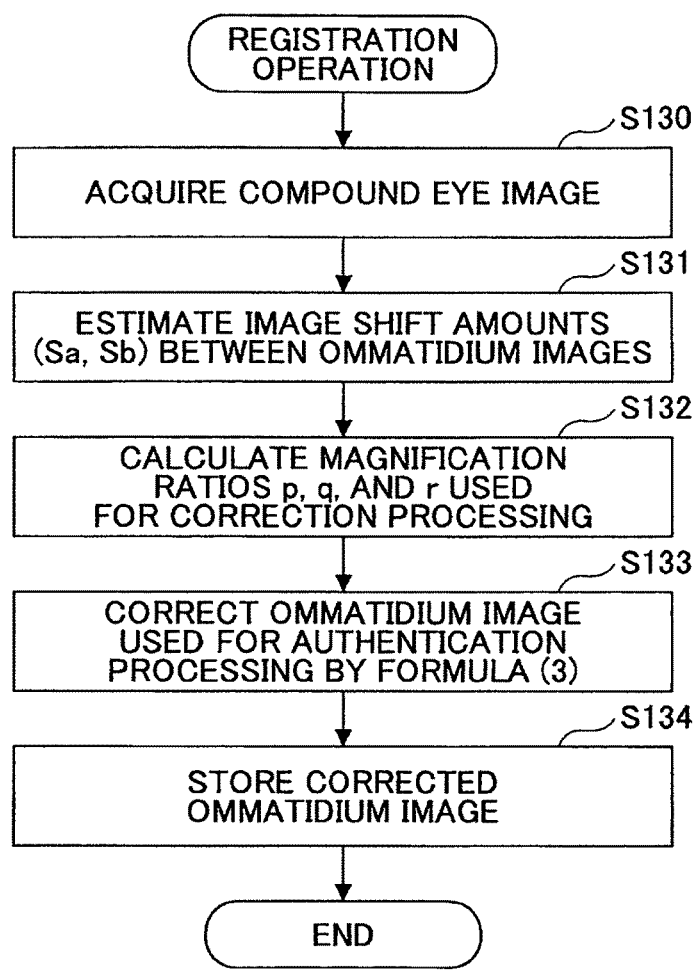
FIG. 27 is a flowchart showing a processing flow of the registration operation in a fifth embodiment.
Figure 28:
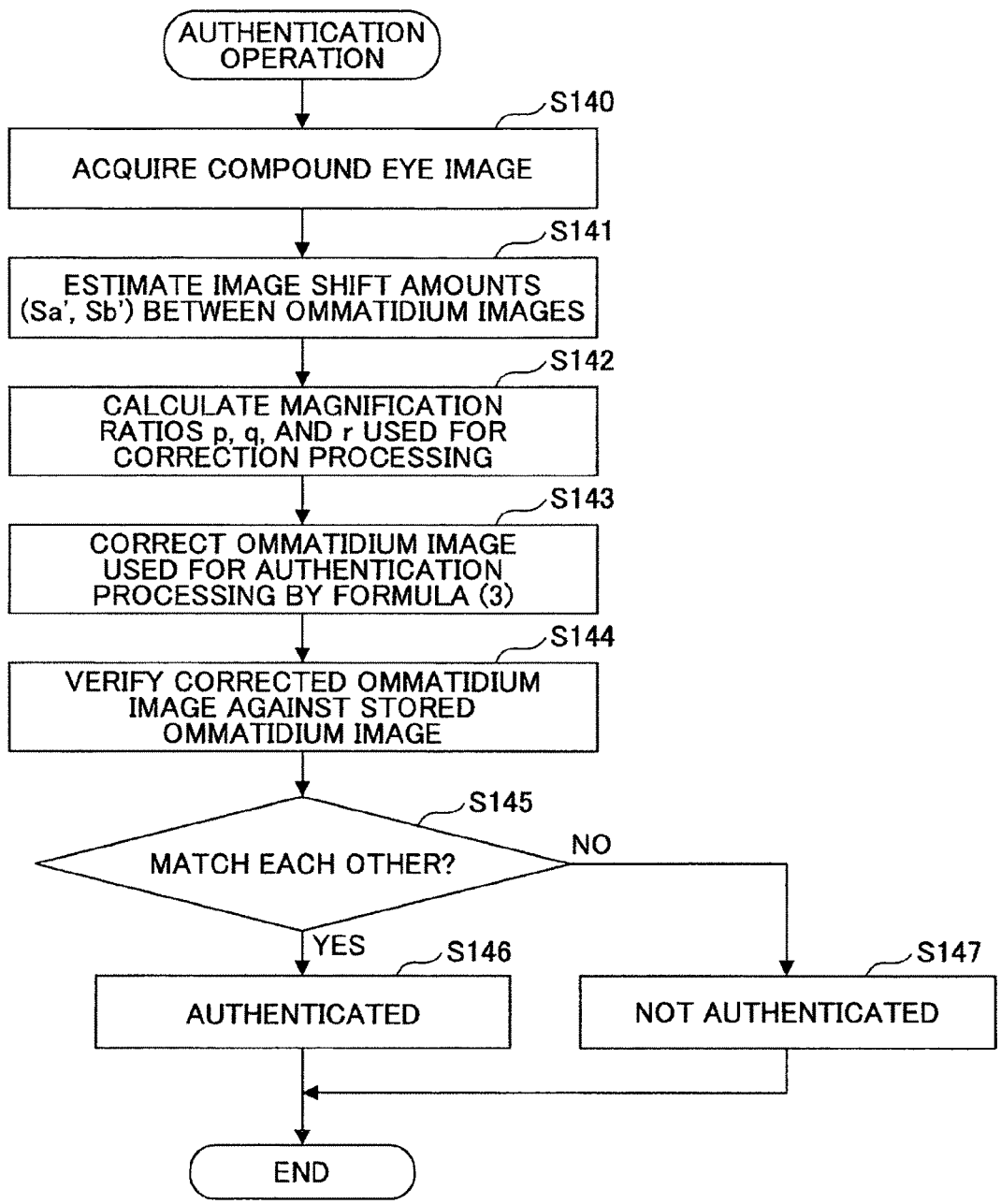
FIG. 28 is a flowchart showing a processing flow of the authentication operation in the fifth embodiment.

A fifth embodiment of the present invention is described below. In this embodiment, in a state in which a finger is inclined both at the registration and authentication, images taken at the registration and authentication are corrected into a virtual plane surface having a predetermined subject distance y0. The above formula (3) is used as a conversion formula for the correction processing. FIGS. 27 and 28 show a processing flow of the registration operation and a processing flow of the authentication operation, respectively. Note that since the block configuration of the personal authentication device according to this embodiment is the same as that of the personal authentication device according to the fourth embodiment, a reference is made to FIG. 16.

First, the registration operation is described. When the registration operation is instructed by the operations selection switch 102 and starting of the registration operation is instructed by the start switch 103, the control unit 101 distributes power to the light source 1 and the image taking unit 5 to execute the registration operation. A compound eye image taken by the image acquisition unit is imported to the image memory 6 (step S130), and then an image shift amount between two ommatidium images of the compound eye image is estimated by the shift estimation unit 10 (step S131). In this embodiment, the image shift amount is estimated at the line of the tip of the finger and the line of the base of the finger shown in FIG. 24. The image shift amount estimated at the line of the tip of the finger is Sa, and the image shift amount estimated at the line of the base of the finger is Sb. Note that as in the case of the fourth embodiment, it is also possible to determine whether the estimated image shift amounts Sa and Sb fall within a specified range and then repeatedly perform the acquisition of a compound eye image and the estimation of image shift amounts if the estimated shift amounts involved do not fall within the specified range. Accordingly, the position and inclination of a finger in the light-axis direction of the lenses when a valid compound eye image is taken can be restricted to a certain range.

Then, in the image correction unit 111, the magnification ratios p, q, and r used for the correction processing are calculated (step S132), and the central ommatidium image used for the authentication processing is corrected according to the formula (3) (step S133). Note that a method for determining the magnification ratio p of the top side of a trapezoid used for this correction processing, the magnification ratio q of the bottom side thereof, and the magnification ratio r of the height thereof are described below. The registration processing unit 14 stores the corrected ommatidium image in the registration pattern storage unit 8 as a registration pattern (step S134). Note that it is also possible to extract the characteristic-amount vector from the corrected ommatidium image and store the extracted characteristic-amount vector in the registration pattern storage unit 8 as the registration pattern. When the registration pattern is registered in this manner, the control unit 101 stops distributing power to the light source 1 and the image taking unit 5 to complete a series of registration operations.

Next, the authentication operation is described. When the authentication operation is instructed by the operations selection switch 102 and starting of the authentication operation is instructed by the start switch 103, the control unit 101 distributes power to the light source 1 and the image taking unit 5 to execute the authentication operation. A compound eye image taken by the image acquisition unit is imported to the image memory 6 (step S140), and then an image shift amount between two ommatidium images of the compound eye image is estimated by the shift estimation unit 10 (step S141). In this embodiment, the image shift amounts are estimated at the line of the tip of the finger and the line of the base of the finger shown in FIG. 24. The image shift amount estimated at the line of the tip of the finger is Sa', and the image shift amount estimated at the line of the base of the finger is Sb'. Note that as in the case of the registration operation, it is also possible to determine whether the estimated image shift amounts Sa' and Sb' fall within a specified range and then repeatedly perform the acquisition of a compound eye image and the estimation of image shift amounts if the estimated shift amounts involved do not fall within the specified range. Then, in the image correction unit 111, the magnification ratios p, q, and r used for the correction processing are calculated (step S142), and the central ommatidium image used for the authentication processing is corrected according to the formula (3) (step S143). Note that a method for determining the magnification ratio p of the top side of a trapezoid, the magnification ratio q of the bottom side thereof, and the magnification ratio r of the height thereof, which are used for this correction processing, are described below.

In the authentication processing unit 9, the corrected ommatidium image is verified against the ommatidium image stored in the registration pattern storage unit 8 as the registration pattern (step S144). Note that when the characteristic-amount vector of the ommatidium image is stored in the registration pattern storage unit 8 as the registration pattern, the authentication processing unit extracts the characteristic-amount vector of the corrected ommatidium image and verifies the extracted characteristic-amount vector against the characteristic-amount vector stored in the registration pattern storage unit 8 as the registration pattern. If the corrected ommatidium image used for authentication processing is identified with the ommatidium image stored in the registration pattern storage unit 18 (YES in step S145), the authentication processing unit 9 outputs a message indicating that the person to be authenticated is authenticated as a registered person (step S146). If the corrected ommatidium image is not identified with the ommatidium image stored in the registration pattern storage unit 18, the authentication processing unit 9 outputs a message that the person to be authenticated is not authenticated as the registered person (step S147). When the authentication processing is completed in this manner, the control unit 101 stops distributing power to the light source 1 and the image taking unit 5 to complete a series of authentication operations.

In this embodiment, even if there are fluctuations in the position and inclination (posture) of the finger at the registration and authentication, influences due to the fluctuations are compensated by the image correction processing. Therefore, personal authentication can be performed with high accuracy.

Here, a description is made of the method for determining the magnification ratio p of the top side of the trapezoid, the magnification ratio q of the bottom side thereof, and the magnification ratio r of the height thereof in the correction processing at the registration and authentication. The subject distances ya and yb at the positions of the finger corresponding to the image shift amounts Sa and Sb estimated at the registration are calculated according to the formula (2), and the subject distances ya' and yb' at the positions of the finger corresponding to the image shift amounts Sa' and Sb' estimated at the authentication are calculated according to the formula (2). The image shift amount S0 corresponding to the subject distance y0 can be calculated according to the formula (2). p, q, and r for the correction processing at the registration are based on formulae p=S0/Sa, q=S0/Sb, and r=R/R0, respectively. Here, R0 and R can be calculated by the following formulae (6) and (7).

(Formula 6)
$$R_0 = \frac{y_0}{f} L_y \quad (6)$$

(Formula 7)
$$R = \sqrt{\left\{\frac{y_a + y_b}{2} L_y\right\}^2 + (y_b - y_a)^2} \quad (7)$$

p, q, and r for the correction processing at the authentication are based on formulae p=S0/Sa', q=S0/Sb', and r=R'/R0, respectively. The value of R0 at the authentication is the same as that of R0 at the registration. R' can be calculated by the following formula (8).

(Formula 8)
$$R' = \sqrt{\left\{\frac{y_a' + y_b'}{2f} L_y\right\}^2 + (y_b' - y_a')^2} \quad (8)$$

Since ya, yb, ya', and yb' can be calculated according to the formula (2), r at the registration and authentication can be obtained.

Sixth Embodiment

Figure 29:
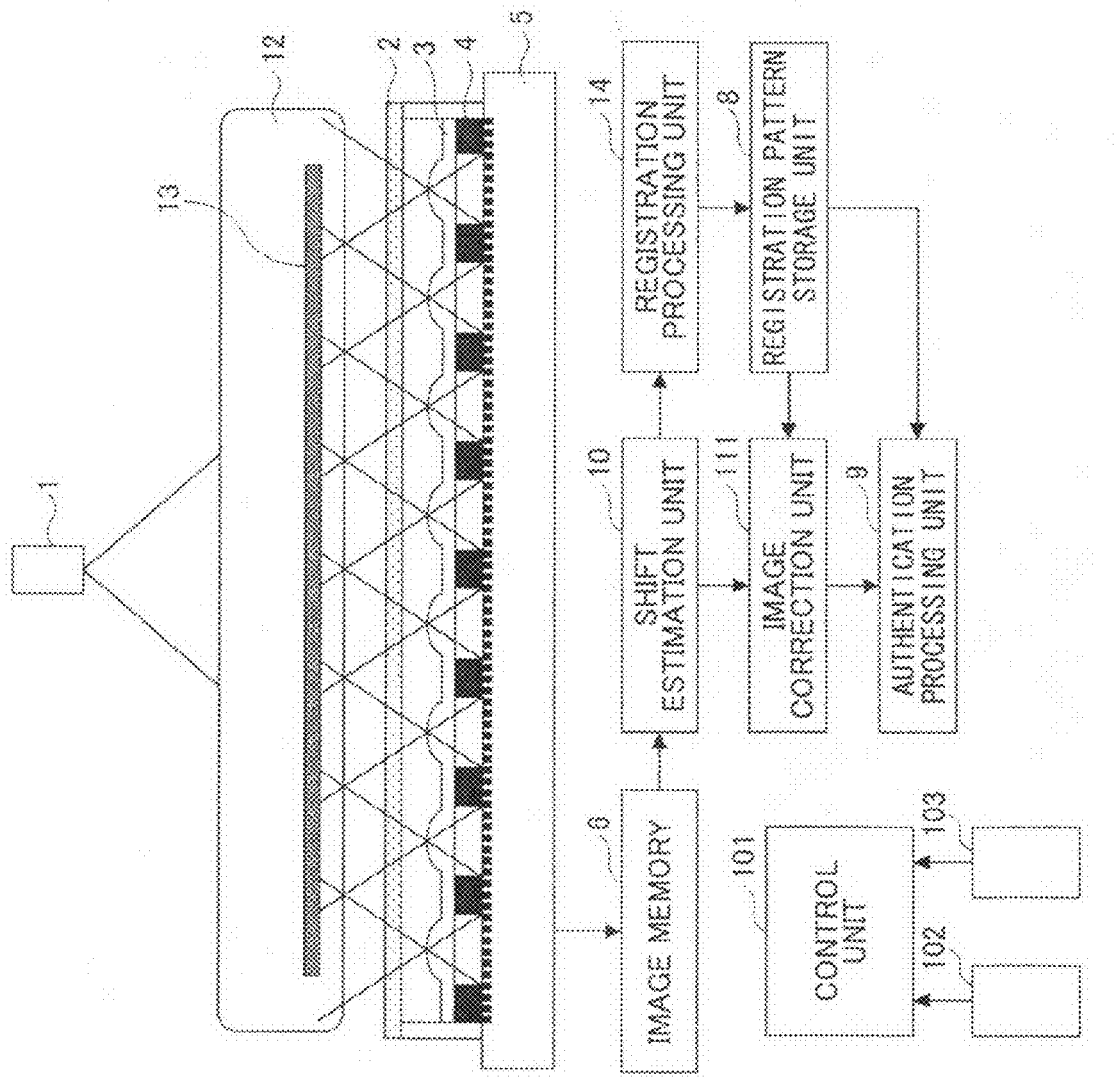
FIG. 29 is a view for explaining the configuration of the personal authentication device according to sixth and seventh embodiments of the present invention.
Figure 30:
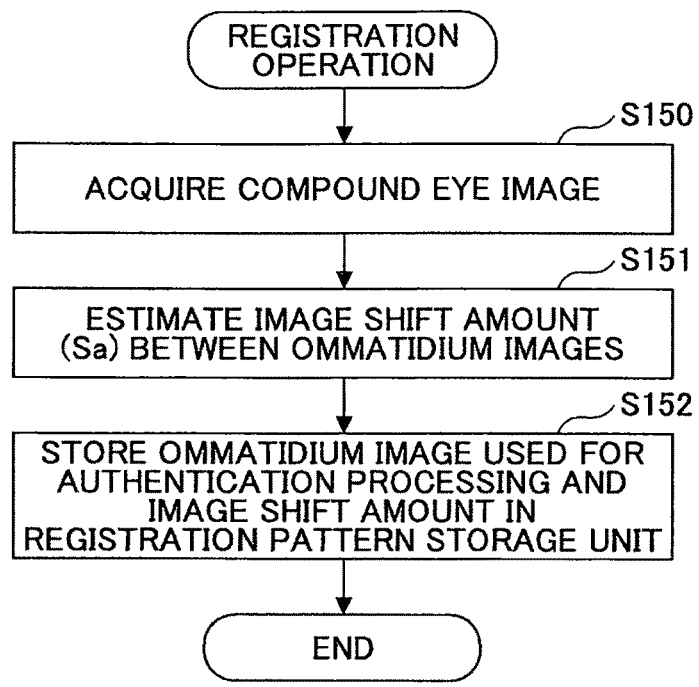
FIG. 30 is a flowchart showing a processing flow of the registration operation in the sixth embodiment.
Figure 31:
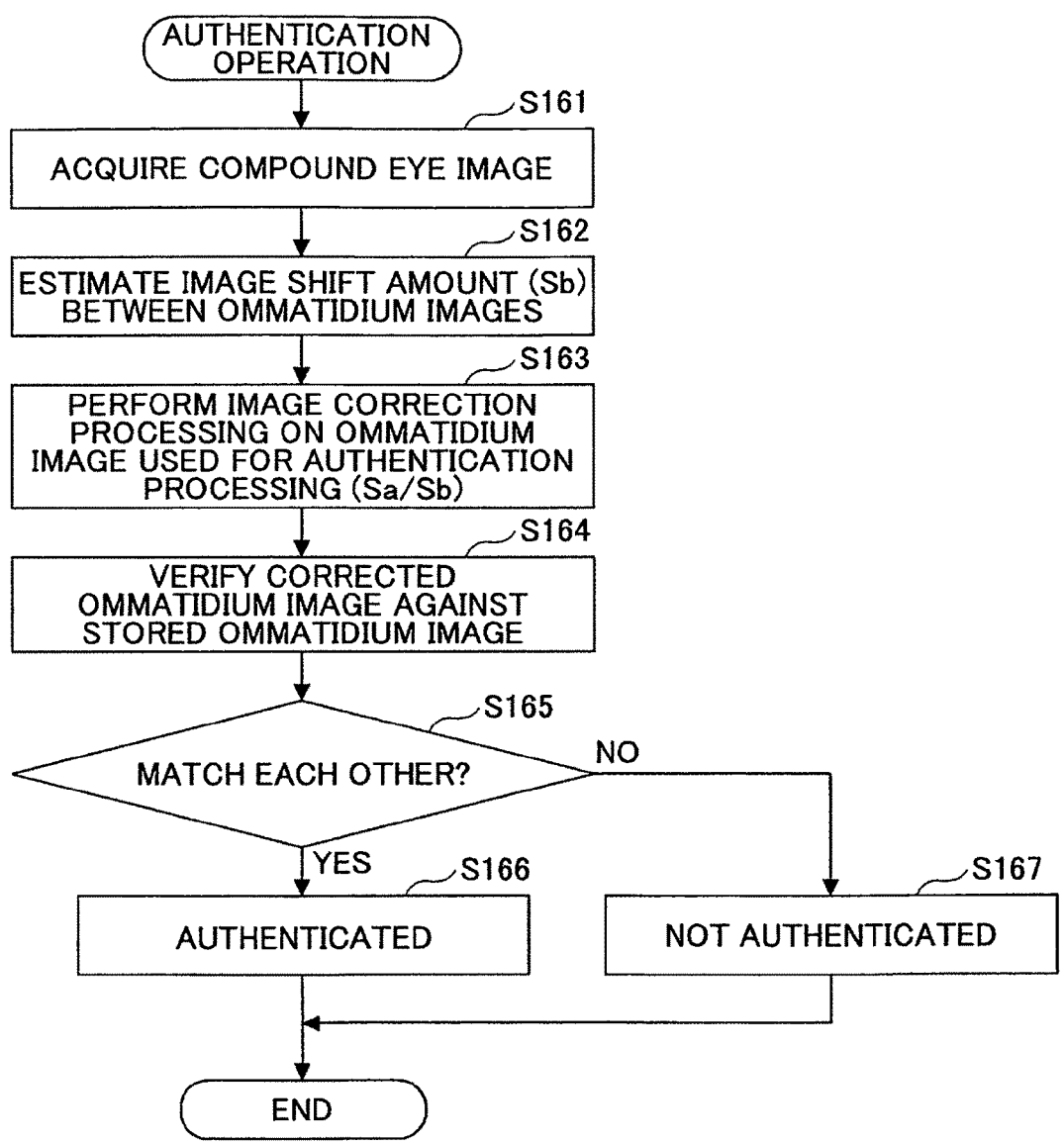
FIG. 31 is a flowchart showing a processing flow of the authentication operation in the sixth embodiment.

FIG. 29 is a view for explaining the configuration of the personal authentication device according to a sixth embodiment of the present invention. This personal authentication device has the characteristic of performing, at the authentication, image correction processing for compensating influences due to fluctuations in subject distances at the registration and authentication. Here, the image correction processing represents enlarging/reducing processing. FIGS. 30 and 31 show a processing flow of the registration operation and a processing flow of the authentication operation, respectively.

First, the registration operation is described. When the registration operation is instructed by the operations selection switch 102 and starting of the registration operation is instructed by the start switch 103, the control unit 101 distributes power to the light source 1 and the image taking unit 5 to execute the registration operation. A compound eye image taken by the image acquisition unit is imported to the image memory 6 (step S150), and then an image shift amount between two ommatidium images of the compound eye image is estimated by the shift estimation unit 10 (step S151). The estimated image shift amount is Sa. Note that it is also possible to determine whether the estimated image shift amount Sa falls within a specified range and then repeatedly perform the acquisition of a compound eye image and the estimation of an image shift amount if the estimated shift amount involved does not fall within the specified range. Then, the registration processing unit 14 stores one ommatidium image (for example, the central ommatidium image in FIG. 18) of the compound eye image used for the authentication processing in the registration pattern storage unit 8 as a registration pattern per se, and it also stores the image shift amount Sa in the registration pattern storage unit 8 so as to correspond to the registration pattern (step S152). As described above, the image correction processing is not performed on the ommatidium image at the registration. Note that it is also possible to extract the characteristic-amount vector of the ommatidium image and register it in the registration pattern storage unit 8 as the registration pattern. When the registration pattern and the image shift amount are registered in this manner, the control unit 101 stops distributing power to the light source 1 and the image taking unit 5 to complete a series of registration operations.

Next, the authentication operation is described. When the authentication operation is instructed by the operations selection switch 102 and starting of the authentication operation is instructed by the start switch 103, the control unit 101 distributes power to the light source 1 and the image taking unit 5 to execute the authentication operation. A compound eye image taken by the image acquisition unit is imported to the image memory 6 (step S161), and then an image shift amount between two ommatidium images of the compound eye image is estimated by the shift estimation unit 10 (step S162). The estimated image shift amount is Sb. Note that as in the case of the registration operation, it is also possible to determine whether the estimated image shift amount Sb falls within a specified range and then repeatedly perform the acquisition of a compound eye image and the estimation of an image shift amount if the estimated shift amount involved does not fall within the specified range. Then, the image correction unit 111 performs the enlarging/reducing processing on the central ommatidium image used for the authentication processing according to a magnification ratio Sb/Sa determined by the estimated shift amount Sb and the image shift amount Sa stored in the registration pattern storage unit 8 so as to correspond to the registration pattern (step S163). In this manner, fluctuations in the subject distances at the acquisition and authentication of the registration pattern are compensated.

In the authentication processing unit 9, the ommatidium image corrected by the image correction unit 9 is verified against the ommatidium image stored in the registration pattern storage unit 8 as the registration pattern (step S164). Note that when the characteristic-amount vector of the ommatidium image is stored in the registration pattern storage unit 8 as the registration pattern, the authentication processing unit 9 extracts the characteristic-amount vector of the corrected ommatidium image and verifies the extracted characteristic-amount vector against the characteristic-amount vector stored in the registration pattern storage unit 8 as the registration pattern. If the corrected ommatidium image used for authentication processing is identified with the ommatidium image stored in the registration pattern storage unit 18 (YES in step S165), the authentication processing unit 9 outputs a message indicating that the person to be authenticated is authenticated as a registered person (step S166). If the corrected ommatidium image is not identified with the ommatidium image stored in the registration pattern storage unit 18, the authentication processing unit 9 outputs a message that the person to be authenticated is not authenticated as the registered person (step S167). When the authentication processing is completed in this manner, the control unit 101 stops distributing power to the light source 1 and the image taking unit 5 to complete a series of authentication operations.

Seventh Embodiment

Figure 32:
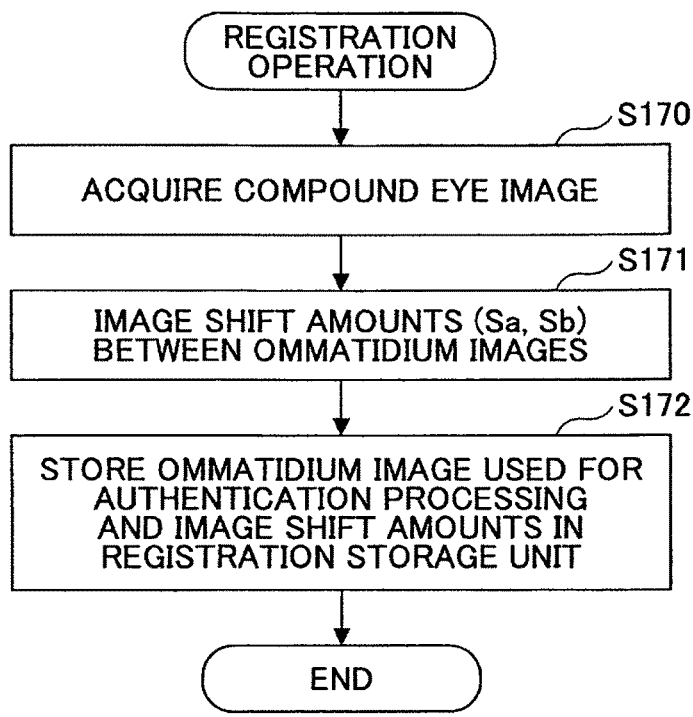
FIG. 32 is a flowchart showing a processing flow of the registration operation in the seventh embodiment.
Figure 33:
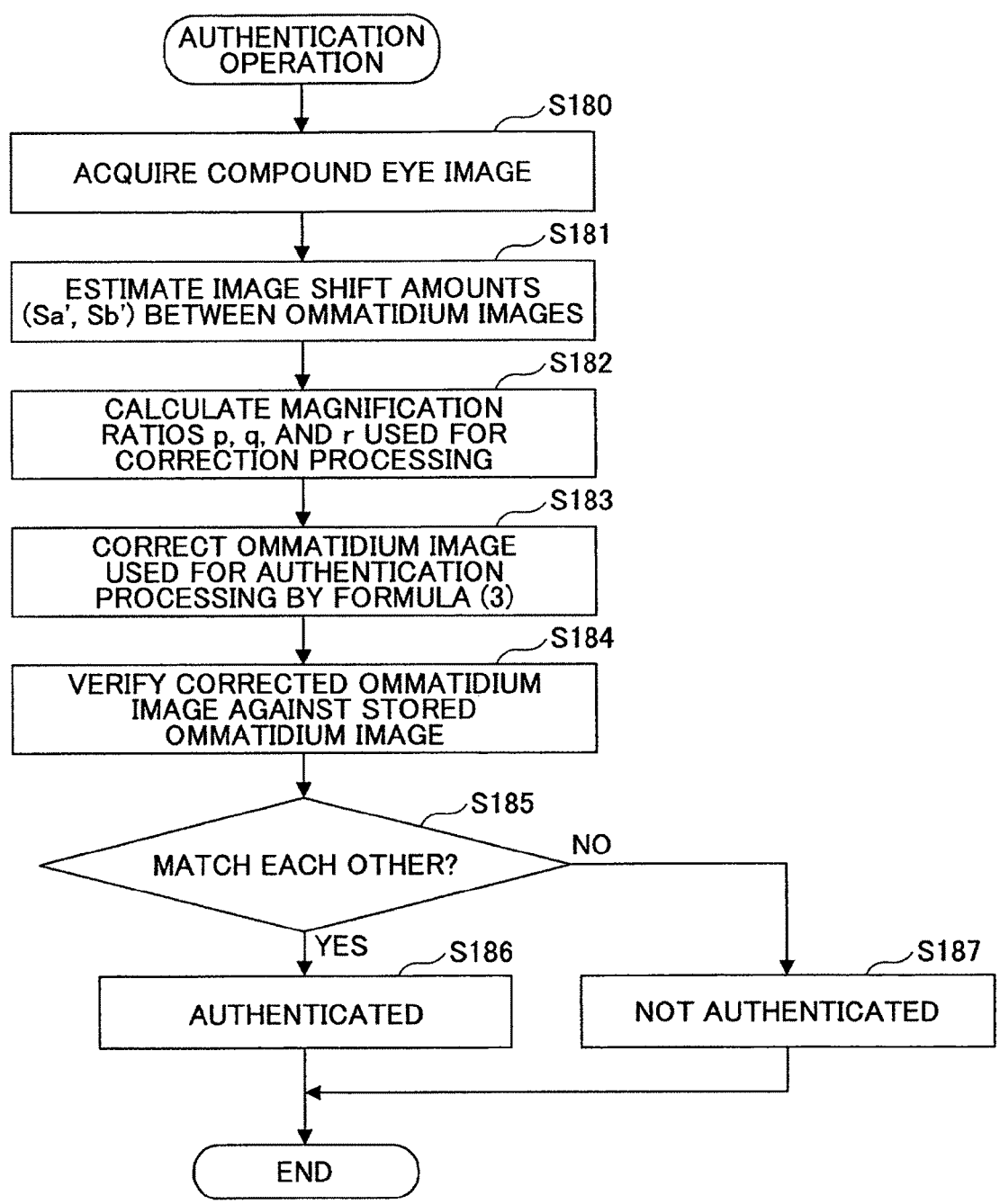
FIG. 33 is a flowchart showing a processing flow of the authentication operation in the seventh embodiment.

A seventh embodiment of the present invention is described below. In this embodiment, in a state in which a finger is inclined at both the registration and the authentication, image correction processing for compensating influences due to fluctuations in the inclination of the finger is performed at the authentication. The above formula (3) is used as a conversion formula for the correction processing. FIGS. 32 and 33 show a processing flow of the registration operation and a processing flow of the authentication operation, respectively. Note that since the block configuration of the personal authentication device according to this embodiment is the same as that of the personal authentication device according to the sixth embodiment, a reference is made to FIG. 29.

First, the registration operation is described. When the registration operation is instructed by the operations selection switch 102 and starting of the registration operation is instructed by the start switch 103, the control unit 101 distributes power to the light source 1 and the image taking unit 5 to execute the registration operation. A compound eye image taken by the image acquisition unit is imported to the image memory 6 (step S170), and then an image shift amount between two ommatidium images of the compound eye image is estimated by the shift estimation unit 10 (step S171) In this embodiment, the image shift amount is estimated at the line of the tip of the finger and the line of the base of the finger shown in FIG. 24. The image shift amount estimated at the line of the tip of the finger is Sa, and the image shift amount estimated at the line of the base of the finger is Sb. Note that it is also possible to determine whether the estimated image shift amounts Sa and Sb fall within a specified range and then repeatedly perform the acquisition of a compound eye image and the estimation of image shift amounts if the estimated shift amounts involved do not fall within the specified range. Then, the registration processing unit 14 stores the central ommatidium image used for the authentication processing in the registration pattern storage unit 8 as a registration pattern, and it also stores the image shift amounts Sa and Sb in the registration pattern storage unit so as to correspond to the registration pattern (step S172). Note that it is also possible to extract the characteristic-amount vector of the ommatidium image and register it in the registration pattern storage unit 8 as the registration pattern. When the registration pattern is registered in this manner, the control unit 101 stops distributing power to the light source 1 and the image taking unit 5 to complete a series of registration operations.

Next, the authentication operation is described. When the authentication operation is instructed by the operations selection switch 102 and starting of the authentication operation is instructed by the start switch 103, the control unit 101 distributes power to the light source 1 and the image taking unit 5 to execute the authentication operation. A compound eye image taken by the image acquisition unit is imported to the image memory 6 (step S180), and then an image shift amount between two ommatidium images of the compound eye image is estimated by the shift estimation unit 10 (step S181). In this embodiment, the image shift amount is estimated at the line of the tip of the finger and the line of the base of the finger shown in FIG. 24. The image shift amount estimated at the line of the tip of the finger is Sa', and the image shift amount estimated at the line of the base of the finger is Sb'. Note that as in the case of the registration operation, it is also possible to determine whether the estimated image shift amounts Sa' and Sb' fall within a specified range and then repeatedly perform the acquisition of a compound eye image and the estimation of image shift amounts if the estimated shift amounts involved do not fall within the specified range. Then, in the image correction unit 111, the magnification ratios p, q, and r used for the correction processing are calculated (step S182), and the central ommatidium image used for the authentication processing is corrected according to the formula (3) (step S183). Note that a method for determining the magnification ratio p of the top side of a trapezoid, the magnification ratio q of the bottom side thereof, and the magnification ratio r of the height thereof, which are used for this correction processing, are described below.

In the authentication processing unit 9, the corrected ommatidium image is verified against the ommatidium image stored in the registration pattern storage unit 8 as the registration pattern (step S184). Note that when the characteristic-amount vector of the ommatidium image is stored in the registration pattern storage unit 8 as the registration pattern, the authentication processing unit 9 extracts the characteristic-amount vector of the corrected ommatidium image and verifies the extracted characteristic-amount vector against the characteristic-amount vector stored in the registration pattern storage unit 8 as the registration pattern. If the corrected ommatidium image used for authentication processing is identified with the ommatidium image stored in the registration pattern storage unit 18 (YES in step S185), the authentication processing unit 9 outputs a message indicating that the person to be authenticated is authenticated as a registered person (step S186). If the corrected ommatidium image is not identified with the ommatidium image stored in the registration pattern storage unit 18, the authentication processing unit 9 outputs a message that the person to be authenticated is not authenticated as the registered person (step S187). When the authentication processing is thus completed, the control unit 101 stops distributing power to the light source 1 and the image taking unit 5 to complete a series of authentication operations.

In step S182, the magnification ratio p of the top side of the trapezoid, the magnification ratio q of the bottom side thereof, and the magnification ratio r of the height thereof used for the correction processing are calculated. Here, a description is made of the method for calculating them. Position coordinates (xa, ya) and (xb, yb) of the finger corresponding to the image shift amounts Sa and Sb at the tip and the base of the finger, respectively, at the registration and position coordinates (xa', ya') and (xb', yb') of the finger corresponding to the image shift amounts Sa' and Sb' at the tip and the base of the finger, respectively, at the authentication are calculated according to the above formula (2). Here, an xy-plane is a surface perpendicular to an image-taking surface including the longitudinal direction of the finger, and a y-axis corresponds to the light axis of the lens. Furthermore, assuming that when the position of the finger at the authentication is imaginarily moved so as to nearly correspond to the position of the finger at the registration, the coordinate (xb', yb') is set at (xb", yb"). When the coordinate system is set in this manner, p, q, and r for correcting an image at the authentication are based on formulae p=Sa/Sa', q=yb"/yb, and r=R'/R. Here, b" can be solved according to the following simultaneous equation.

(Formula 9)

$$\begin{cases} \frac{yb'' - ya}{xb'' - xa} = \frac{yb - ya}{xb - xa} \\ R' = \sqrt{(xb'' - xa)^2 + (yb'' - ya)^2} \end{cases} \quad (9)$$

R' and R can be represented by the following formulae (10) and (11).

(Formula 10)

$$R = \sqrt{\left\{\frac{y_a + y_b}{2f} L_y\right\}^2 + (y_b - y_a)^2} \quad (10)$$

(Formula 11)

$$R' = \sqrt{P\left\{\frac{y'_a + y'_b}{2f} L_y\right\}^2 + (y'_b - y'_a)^2} \quad (11)$$

The subject distance $y_a$ or the like in the formulae can be calculated based on the shift amount Sa or the like in accordance with the above formula (2), and xa or the like can be calculated based on the subject distance, the distance f between the lens array and the image taking surface, the length Ly between the two regions for estimating the image shift amount, or the like. For example, xa is represented by the following formula.

(Formula 12)

$$x_a = -\frac{y_a}{2f} L_y \quad (12)$$

Eighth Embodiment

Figure 34:
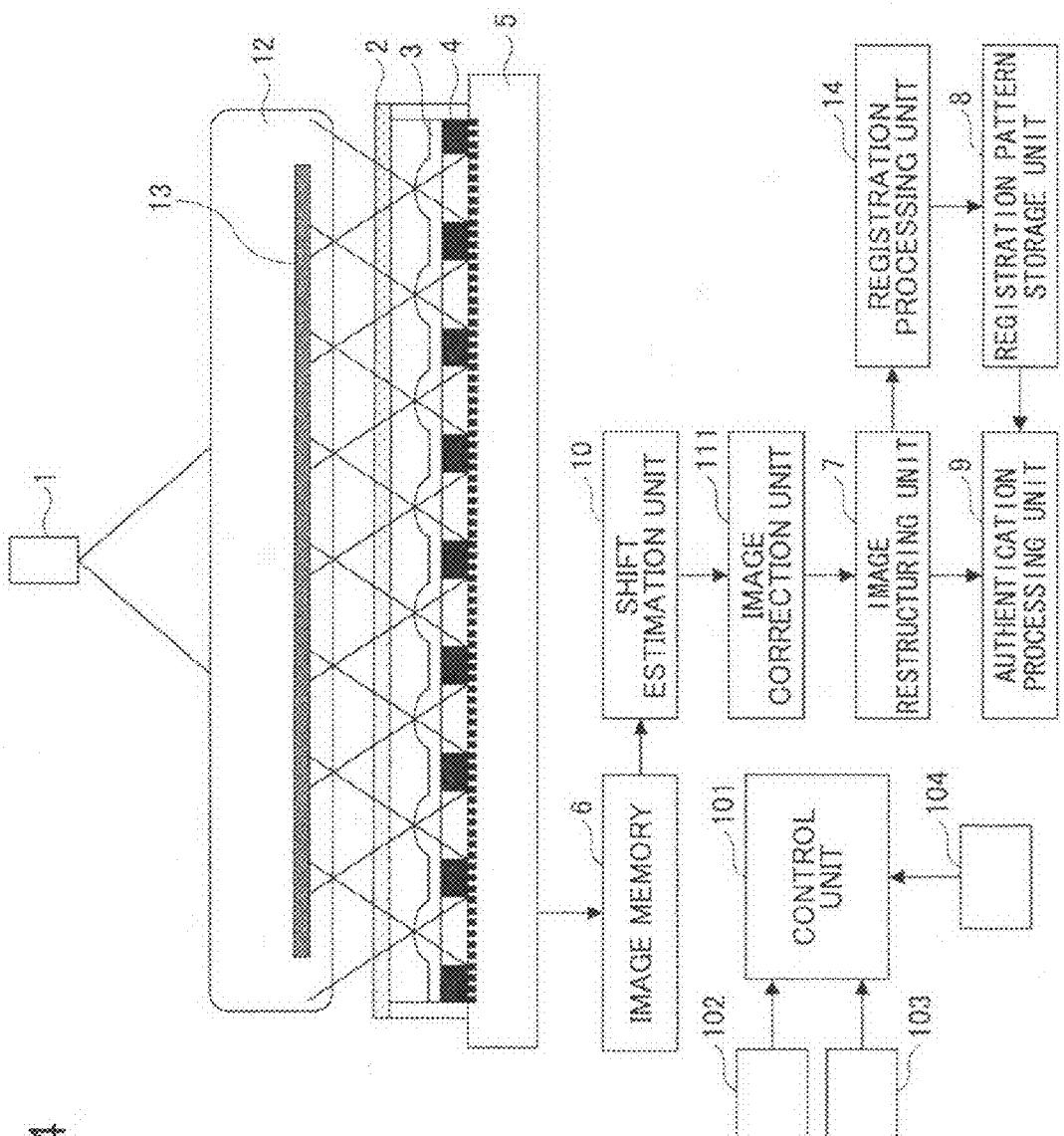
FIG. 34 is a view for explaining the configuration of the personal authentication device according to eighth and ninth embodiments of the present invention.

FIG. 34 is a view for explaining the configuration of the personal authentication device according to an eighth embodiment of the present invention. This personal authentication device has the image restructuring unit 7 that restructures a single image from plural ommatidium images. The number of ommatidium images used for restructuring a single image is configured to vary in accordance with necessary authentication accuracy. Reference numeral 104 denotes a unit such as a switch by which necessary authentication accuracy (authentication mode) is designated. The control unit 101 sets ommatidium images used for restructuring a single image both at the registration and authentication in accordance with the authentication accuracy designated by the unit 104. Note that the number of ommatidium images used for restructuring an image can also be varied in the above first, second, and third embodiments, and such a modification is included in this invention.

Figure 35:
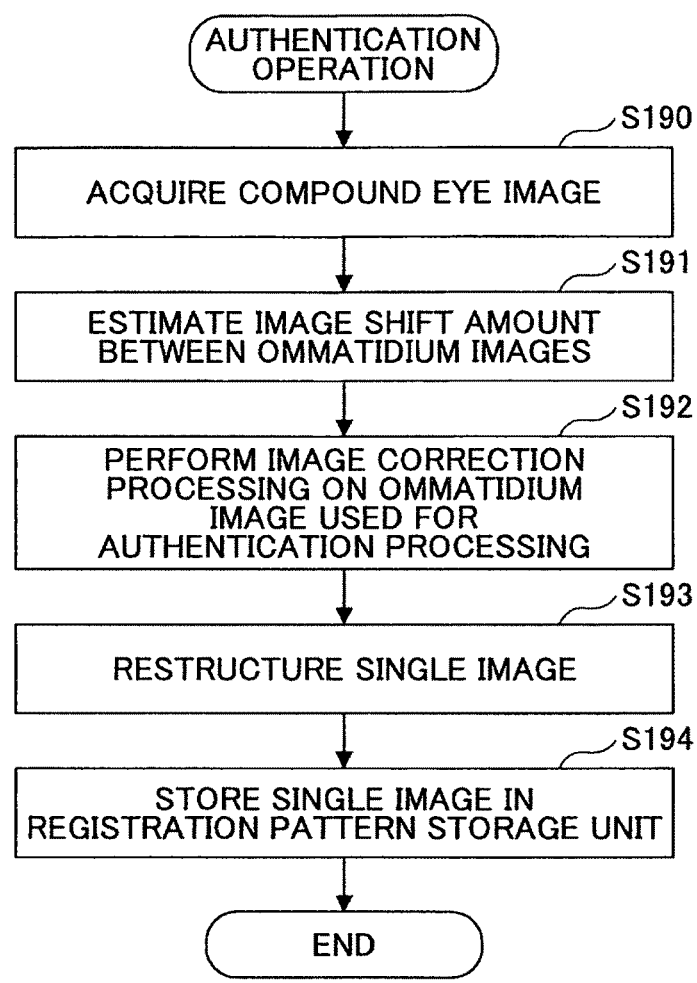
FIG. 35 is a flowchart showing a processing flow of the registration operation in the eighth embodiment.
Figure 36:
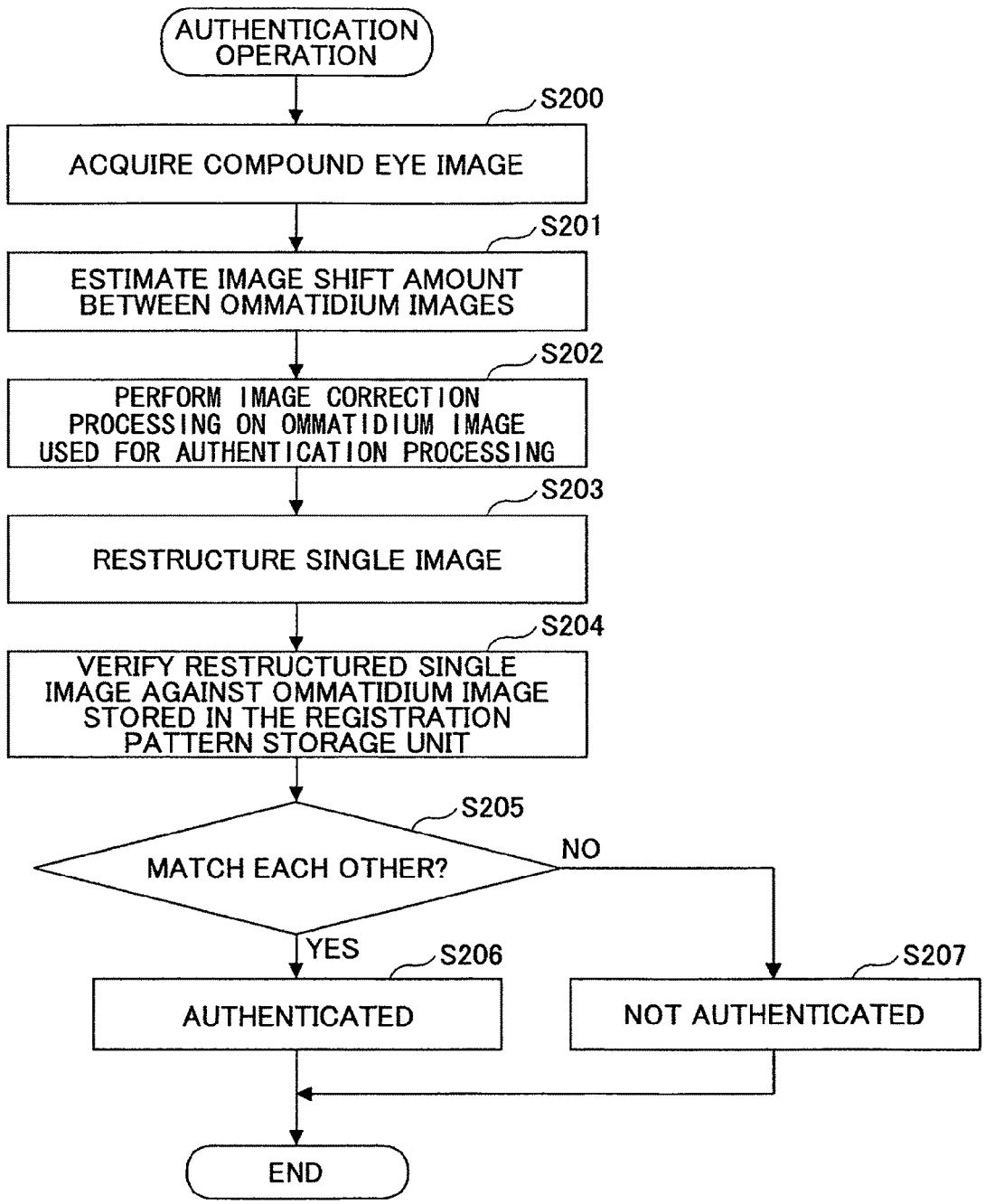
FIG. 36 is a flowchart showing a processing flow of the authentication operation in the eighth embodiment.

FIGS. 35 and 36 show a processing flow of the registration operation and a processing flow of the authentication operation, respectively. First, the registration operation is described. When the registration operation is instructed by the operations selection switch 102 and starting of the registration operation is instructed by the start switch 103, the registration operation is executed by the control of the control unit 101. The control unit 101 first causes the light source 1 to emit light and the image taking unit 5 to take an image to export a compound eye image to the image memory 6 (step S190). Then, an image shift amount, between two ommatidium images of the compound eye image exported to the image memory 6 is estimated by the shift estimation unit 10 (step S191). The estimated image shift amount is Sa. It may be preferred to repeatedly perform the operations of determining whether the estimated image shift amount Sa falls within a specified range and acquiring a compound eye image again to estimate another image shift amount if it does not fall within the specified range until an image shift amount within the specified range is obtained.

Next, the control unit 101 causes the image correction unit 111 to perform image correction processing on the ommatidium image (in other words, ommatidium image used for authentication processing) of the acquired compound eye image used for restructuring a single image (step S192). Here, the image correction processing represents processing for enlarging or reducing the ommatidium image so as to obtain a predetermined image shift amount S. This image correction processing corresponds to standardizing a subject distance in a pseudo manner. A magnification ratio for enlarging or reducing the image may be S/Sa or Sa/S. However, it is necessary to fix the magnification ratio to one of them and use the same in common at the registration and authentication.

Then, the control unit 101 causes the image restructuring unit 7 to restructure the single image from the corrected ommatidium image (step S193). In the single image restructured from the corrected ommatidium image so as to standardize the subject distance, influences due to fluctuations in the subject distance are compensated. Subsequently, the control unit 101 causes the registration processing unit 14 to store the restructured single image in the registration pattern storage unit 8 as a registration pattern (step S194). Note that it is also possible to cause the registration processing unit 14 to extract the characteristic-amount vector of the single image and store the extracted characteristic-amount vector in the registration pattern storage unit 8 as the registration pattern. When the registration pattern is registered in this manner, the control unit 101 stops distributing power to the light source 1 and the image taking unit 5 to complete a series of registration operations.

Next, the authentication operation is described. When the authentication operation is instructed by the operations selection switch 102 and starting of the authentication operation is instructed by the start switch 103, the authentication operation is executed by the control of the control unit 101.

The control unit 101 first causes the light source 1 to emit light and the image taking unit 5 to take an image to export a compound eye image to the image memory 6 (step S200). Then, an image shift amount between two ommatidium images of the compound eye image exported to the image memory 6 is estimated by the shift estimation unit 10 (step S201). The estimated image shift amount is Sb. As in the case of the registration operation, it is also possible to repeatedly perform the operations of determining whether the estimated image shift amount Sb falls within a specified range and acquiring a compound eye image again to estimate another image shift amount if it does not fall within the specified range until an image shift amount within the specified range is obtained.

Next, the control unit 101 causes the image correction unit 111 to perform image correction processing (enlarging or reducing processing) on the ommatidium image of the acquired compound eye image used for restructuring the single image (step S202). A magnification ratio for enlarging or reducing the image is S/Sa or Sa/S (same as the magnification ratio at the registration operation).

Then, the control unit 101 causes the image restructuring unit 7 to restructure the single image from the corrected ommatidium image (step S203). In the single image restructured from the corrected ommatidium image so as to standardize the subject distance, influences due to fluctuations in the subject distance are compensated.

Then, the control unit 101 causes the authentication processing unit 9 to verify the restructured single image against the ommatidium image stored in the registration pattern storage unit as the registration pattern (step S204). Note that when the characteristic-amount vector of the single image is stored in the registration pattern storage unit 8 as the registration pattern, the authentication processing unit 9 extracts the characteristic-amount vector of the single image and verifies the extracted characteristic-amount vector against the characteristic-amount vector stored in the registration pattern storage unit 8 as the registration pattern. In either case, at the registration operation and the authentication operation, the image correction processing for compensating the influences due to the fluctuations in the subject distance is performed on the ommatidium image used for restructuring the single image. Therefore, authentication can be implemented with high accuracy.

If the single image used for the authentication processing is identified with the ommatidium image stored in the registration pattern storage unit 18 (YES in step S205), the authentication processing unit 9 outputs a message indicating that the person to be authenticated is authenticated as a registered person (step S206). If the single image is not identified with the ommatidium image stored in the registration pattern storage unit 18 (NO in step S205), the authentication processing unit 9 outputs a message that the person to be authenticated is not authenticated as the registered person (step S207). When an authentication result is output, the control unit 101 stops distributing power to the light source 1 and the image taking unit 5 to complete a series of authentication operations.

Ninth Embodiment

Figure 37:
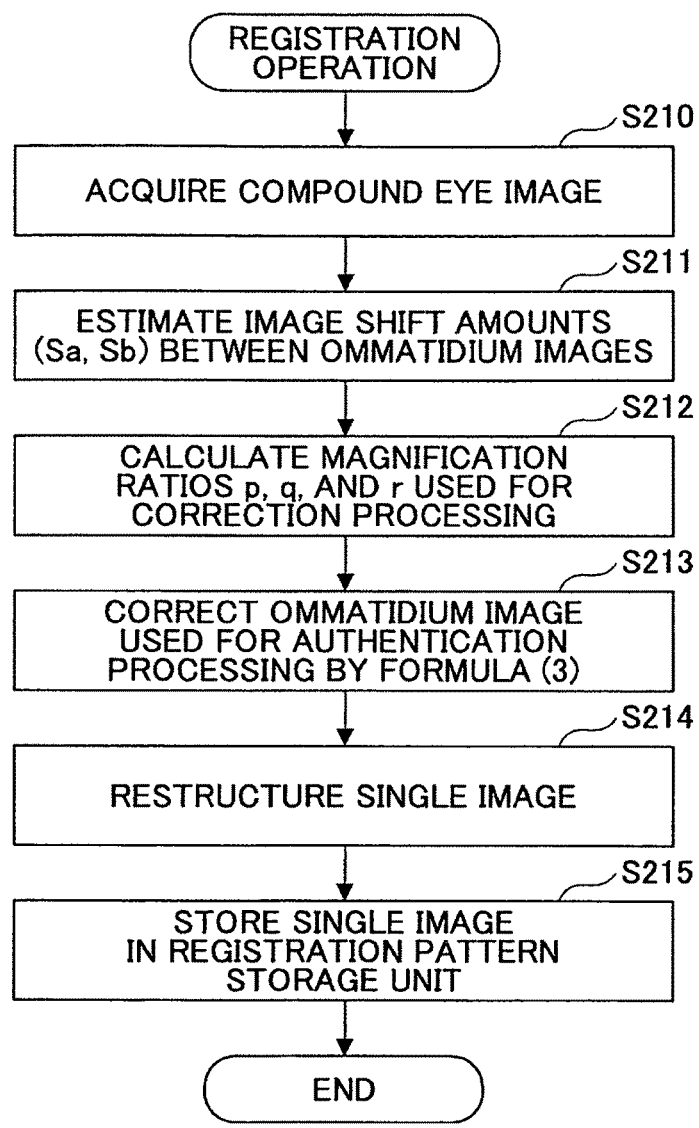
FIG. 37 is a flowchart showing a processing flaw of the registration operation in the ninth embodiment.
Figure 38:
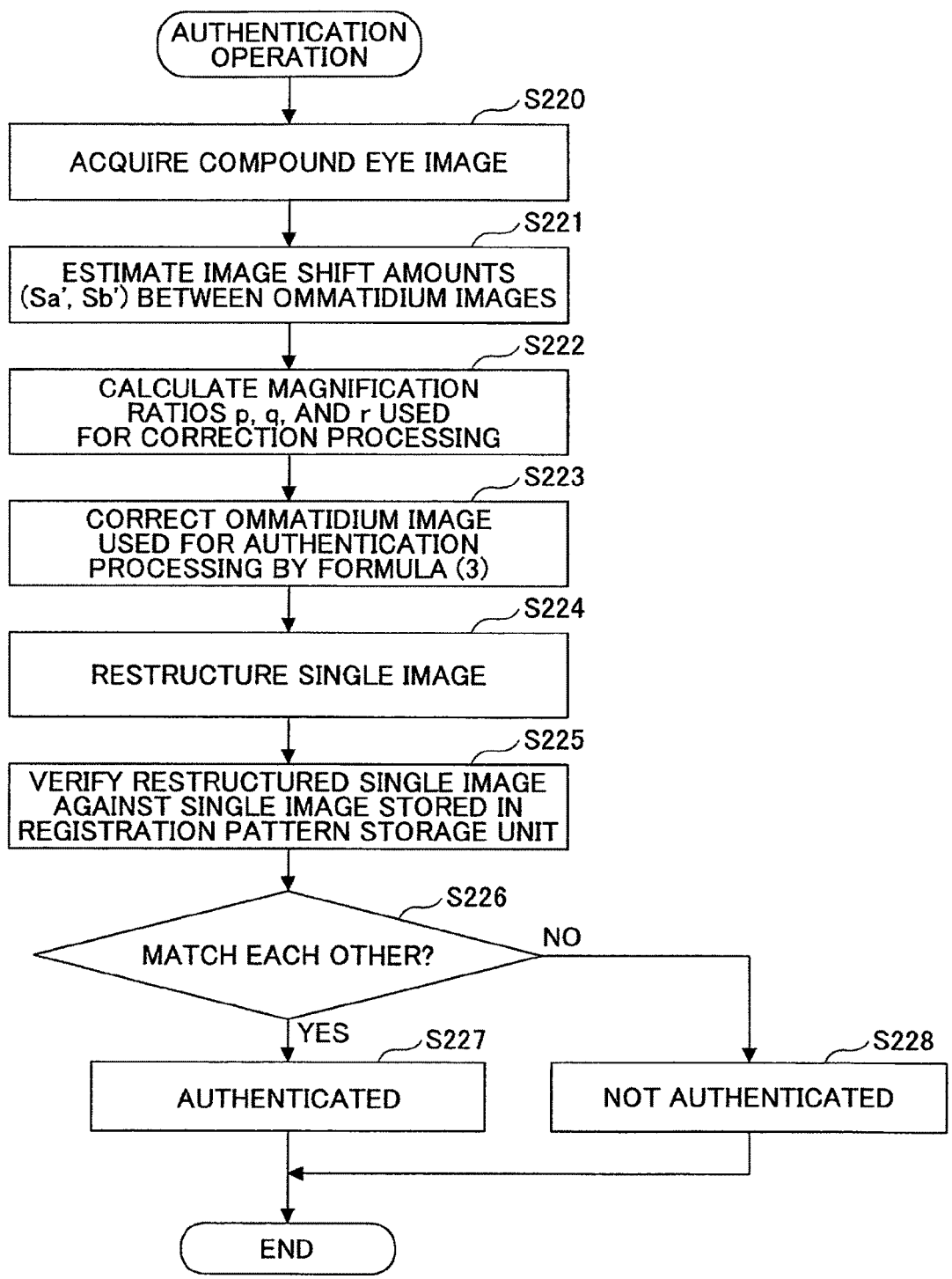
FIG. 38 is a flowchart showing a processing flow of the authentication operation in the ninth embodiment.

A ninth embodiment of the present invention is described below. In this embodiment, in a state in which a finger is inclined both at the registration and authentication, images taken at the registration and authentication are corrected into a virtual plane surface having a predetermined subject distance y0. The above formula (3) is used as a conversion formula for the correction processing. FIGS. 37 and 38 show a processing flow of the registration operation and a processing flow of the authentication operation, respectively. Note that since the block configuration of the personal authentication device according to this embodiment is the same as that of the personal authentication device according to the eighth embodiment, a reference is made to FIG. 34.

First, the registration operation is described. When the registration operation is instructed by the operations selection switch 102 and starting of the registration operation is instructed by the start switch 103, the control unit 101 distributes power to the light source 1 and the image taking unit 5 to execute the registration operation. A compound eye image taken by the image acquisition unit is imported to the image memory 6 (step S210), and then an image shift amount between two ommatidium images of the compound eye image is estimated by the shift estimation unit 10 (step S211). In this embodiment, the image shift amount is estimated at the line of the tip of the finger and the line of the base of the finger shown in FIG. 24. The image shift amount estimated at the line of the tip of the finger is Sa, and the image shift amount estimated at the line of the base of the finger is Sb. Note that it is also possible to determine whether the estimated image shift amounts Sa and Sb fall within a specified range and then repeatedly perform the acquisition of a compound eye image and the estimation of image shift amounts if the estimated shift amounts involved do not fall within the specified range.

Then, in the image correction unit 111, the magnification ratios p, q, and r used for the correction processing are calculated (step S212), and an ommatidium image used for restructuring a single image is corrected according to the formula (3) (step S213). Note that the method for determining the magnification ratio p of the top side of the trapezoid, the magnification ratio q of the bottom side thereof, and the magnification ratio r of the height thereof, which are used for restructuring the single image, are described in the above fifth embodiment. In the image restructuring unit 7, the single image is restructured from the corrected ommatidium image (step S214). The restructured single image is stored in the registration pattern storage unit 8 as a registration pattern by the registration processing unit 14 (step S215). Note that it is also possible to extract the characteristic-amount vector of the single image and store the extracted characteristic-amount vector in the registration pattern storage unit 8 as the registration pattern. When the registration pattern is registered in this manner, the control unit 101 stops distributing power to the light source 1 and the image taking unit 5 to complete a series of registration operations.

Next, the authentication operation is described. When the authentication operation is instructed by the operations selection switch 102 and starting of the authentication operation is instructed by the start switch 103, the control unit 101 distributes power to the light source 1 and the image taking unit 5 to execute the authentication operation. A compound eye image taken by the image acquisition unit is imported to the image memory 6 (step S220), and then an image shift amount between two ommatidium images of the compound eye image is estimated by the shift estimation unit 10 (step S221). In this embodiment, the image shift amount is estimated at the line of the tip of the finger and the line of the base of the finger shown in FIG. 24. The image shift amount estimated at the line of the tip of the finger is Sa', and the image shift amount estimated at the line of the base of the finger is Sb'. Note that as in the case of the registration operation, it is also possible to determine whether the estimated image shift amounts Sa' and Sb' fall within a specified range and then repeatedly perform the acquisition of a compound eye image and the estimation of image shift amounts if the estimated shift amounts involved do not fall within the specified range. Then, in the image correction unit 111, the magnification ratios p, q, and r used for the correction processing are calculated (step S222), and an ommatidium image used for restructuring a single image is corrected according to the formula (3) (step S223). Note that the method for determining the magnification ratio p of the top side of the trapezoid, the magnification ratio q of the bottom side thereof, and the magnification ratio r of the height thereof, which are used for this correction processing, are described in the above fifth embodiment. In the image restructuring unit 7, the single image is restructured from the corrected ommatidium image (step S224). In the authentication processing unit 9, the restructured single image is verified against the single image stored in the registration pattern storage unit 8 as the registration pattern (step S225). Note that when the characteristic-amount vector of the restructured single image is stored in the registration pattern storage unit 8 as the registration pattern, the authentication processing unit 9 extracts the characteristic-amount vector of the restructured single image and verifies the extracted characteristic-amount vector against the characteristic-amount vector stored in the registration pattern storage unit 8 as the registration pattern. If the restructured single image used for authentication processing is identified with the single image stored in the registration pattern storage unit 18 (YES in step S226), the authentication processing unit 9 outputs a message indicating that the person to be authenticated is authenticated as a registered person (step S227). If the restructured single image is not identified with the single image stored in the registration pattern storage unit 18, the authentication processing unit 9 outputs a message that the person to be authenticated is not authenticated as the registered person (step S228). When the authentication processing is completed in this manner, the control unit 101 stops distributing power to the light source 1 and the image taking unit 5 to complete a series of authentication operations.

In this embodiment, even if there are fluctuations in the inclination of the finger at the registration and authentication, influences due to the fluctuations are compensated by the image correction processing. Therefore, personal authentication can be performed with high accuracy.

Tenth Embodiment

Figure 39:
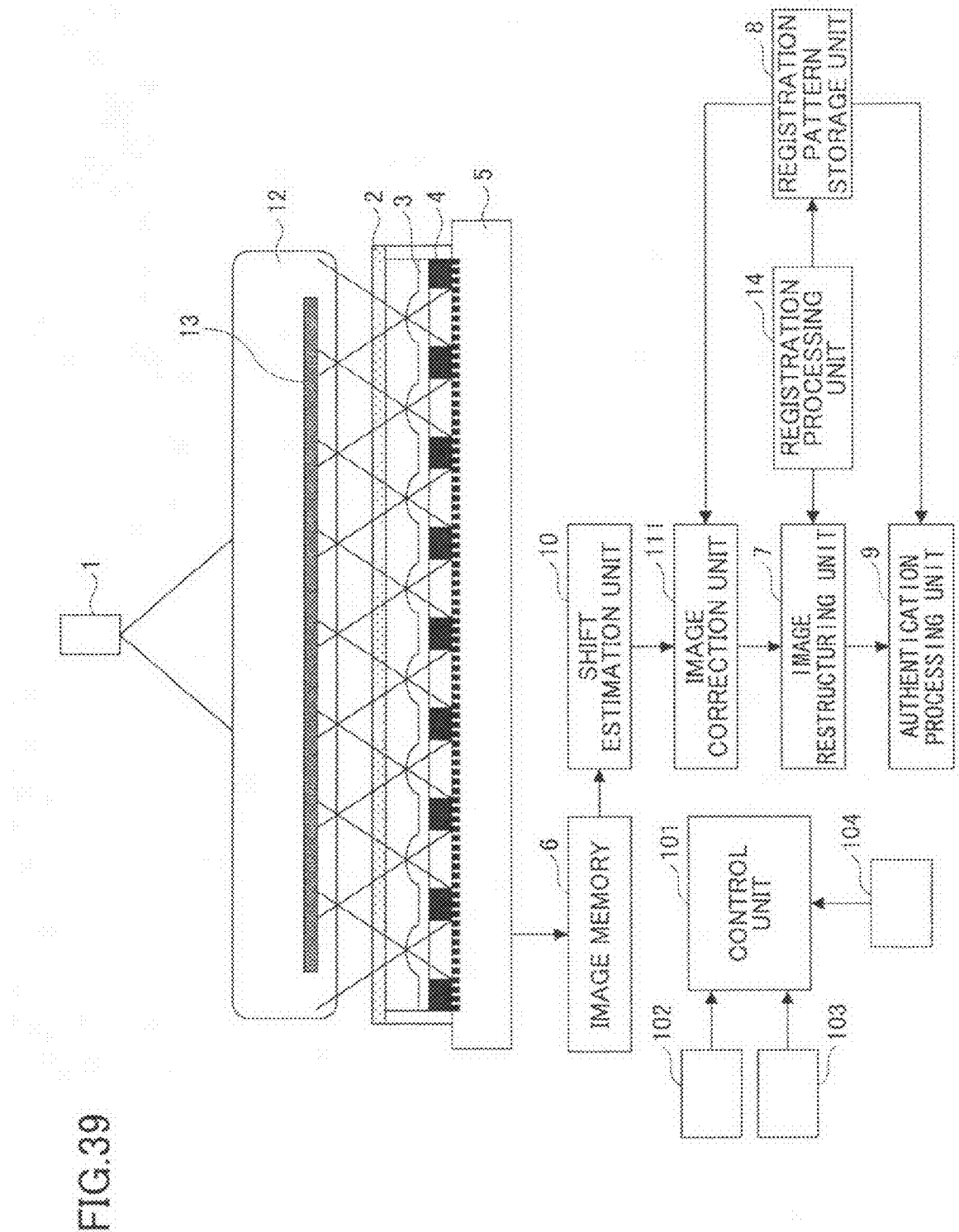
FIG. 39 is a view for explaining the configuration of the personal authentication device according to a tenth embodiment of the present invention.
Figure 40:
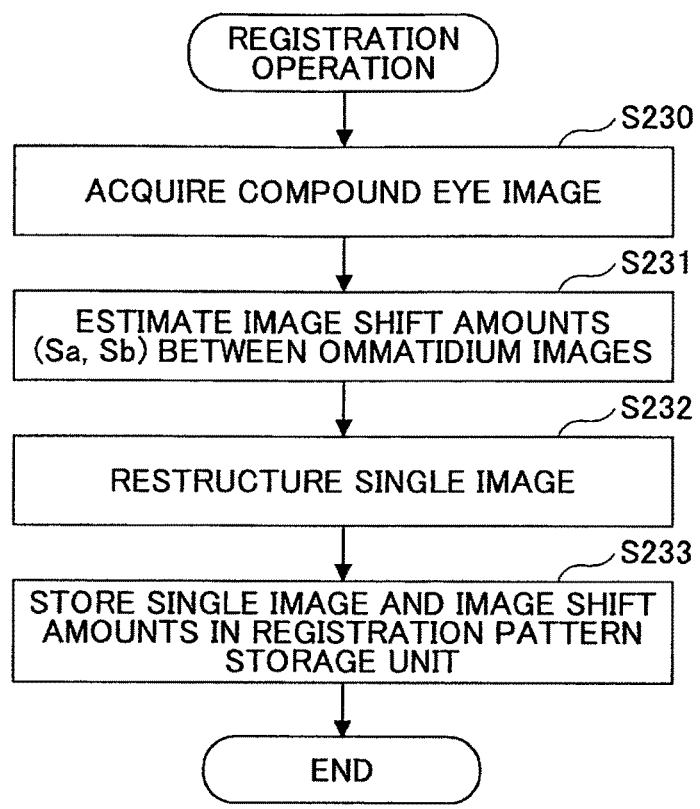
FIG. 40 is a flowchart showing a processing flow of the registration operation in the tenth embodiment.
Figure 41:
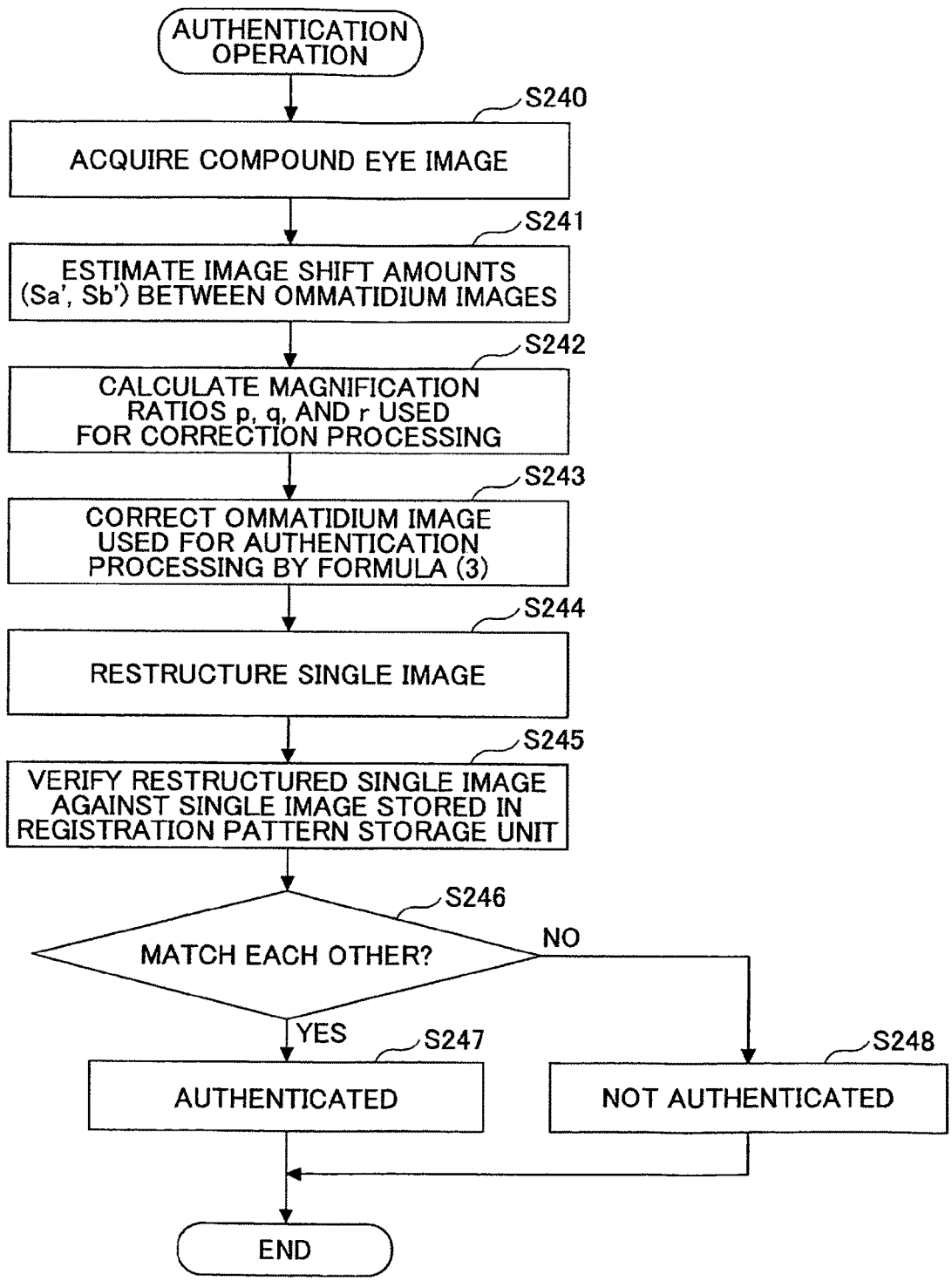
FIG. 41 is a flowchart showing a processing flow of the authentication operation in the tenth embodiment.

FIG. 39 is a diagram showing the configuration of the personal authentication device according to a tenth embodiment of the present invention. In this embodiment, in a state in which a finger is inclined at both the registration and the authentication, image correction processing for compensating influences due to fluctuations in the inclination of the finger is performed only at the authentication. The above formula (3) is used as a conversion formula for the correction processing. FIGS. 40 and 41 show a processing flow of the registration operation and a processing flow of the authentication operation, respectively.

First, the registration operation is described. When the registration operation is instructed by the operations selection switch 102 and starting of the registration operation is instructed by the start switch 103, the control unit 101 distributes power to the light source 1 and the image taking unit 5 to execute the registration operation. A compound eye image taken by the image acquisition unit is imported to the image memory 6 (step S230), and then an image shift amount between two ommatidium images of the compound eye image is estimated by the shift estimation unit 10 (step S231). In this embodiment, the image shift amount is estimated at the line of the tip of, the finger and the line of the base of the finger shown in FIG. 24. The image shift amount estimated at the line of the tip of the finger is Sa, and the image shift amount estimated at the line of the base of the finger is Sb. Note that it is also possible to determine whether the estimated image shift amounts Sa and Sb fall within a specified range and then repeatedly perform the acquisition of a compound eye image and the estimation of image shift amounts if the estimated shift amounts involved do not fall within the specified range. Then, the image restructuring unit 7 restructures a single image from the plural ommatidium images designated by the control unit 101 (step S232). Then, the registration processing unit 14 stores the restructured single image in the registration pattern storage unit 8 as a registration pattern, and it also stores the image shift amounts Sa and Sb in the registration pattern storage unit 8 so as to correspond to the registration pattern (step S233). Note that it is also possible to extract the characteristic-amount vector of the restructured single image and register the extracted characteristic-amount vector in the registration pattern storage unit 8 as the registration pattern. When the registration pattern is registered in this manner, the control unit 101 stops distributing power to the light source 1 and the image taking unit 5 to complete a series of registration operations.

Next, the authentication operation is described. When the authentication operation is instructed by the operations selection switch 102 and starting of the authentication operation is instructed by the start switch 103, the control unit 101 distributes power to the light source 1 and the image taking unit 5 to execute the authentication operation. A compound eye image taken by the image acquisition unit is imported to the image memory 6 (step S240), and then an image shift amount between two ommatidium images of the compound eye image is estimated by the shift estimation unit 10 (step S241). In this embodiment, the image shift amount is estimated at the line of the tip of the finger and the line of the base of the finger shown in FIG. 24. The image shift amount estimated at the line of the tip of the finger is Sa', and the image shift amount estimated at the line of the base of the finger is Sb'. Note that as in the case of the registration operation, it is also possible to determine whether the estimated image shift amounts Sa' and Sb' fall within a specified range and then repeatedly perform the acquisition of a compound eye image and the estimation of image shift amounts if the estimated shift amounts involved do not fall within the specified range. Then, in the image correction unit 111, the magnification ratios p, q, and r used for the correction processing are calculated based on the estimated image shift amounts Sa' and Sb' and the image shift amounts Sa and Sb stored in the registration pattern storage unit 8 (step S242). The method for calculating the magnification ratios p, q, and r is described in the above seventh embodiment. Plural ommatidium images set by the control unit 101 are corrected according to the formula (3) (step S243), and a single image is restructured from the plural corrected ommatidium images in the image restructuring unit (step S244). In the authentication processing unit 9, the restructured single image is verified against the single image stored in the registration pattern storage unit 8 as the registration pattern (step S245). Note that when the characteristic-amount vector of the restructured single image is stored in the registration pattern storage unit 8 as the registration pattern, the authentication processing unit 9 extracts the characteristic-amount vector of the restructured single image and verifies the extracted characteristic-amount vector against the characteristic-amount vector stored in the registration pattern storage unit 8 as the registration pattern. If the restructured single image used for authentication processing is identified with the single image stored in the registration pattern storage unit 18 (YES in step S246), the authentication processing unit 9 outputs a message indicating that the person to be authenticated is authenticated as a registered person (step S247). If the restructured single image is not identified with the single image stored in the registration pattern storage unit 18, the authentication processing unit 9 outputs a message that the person to be authenticated is not authenticated as the registered person (step S248). When the authentication processing is completed in this manner, the control unit 101 stops distributing power to the light source 1 and the image taking unit 5 to complete a series of authentication operations.

Eleventh Embodiment

In the personal authentication device according to the present invention, the image acquisition unit is easily made thinner and downsized and a guide unit for restricting the position of a finger and a palm is not required. Therefore, the personal authentication device is preferably installed in electronic equipment required to be downsized and made thinner such as mobile phones, notebook computers, and PDAs.

Figure 14:
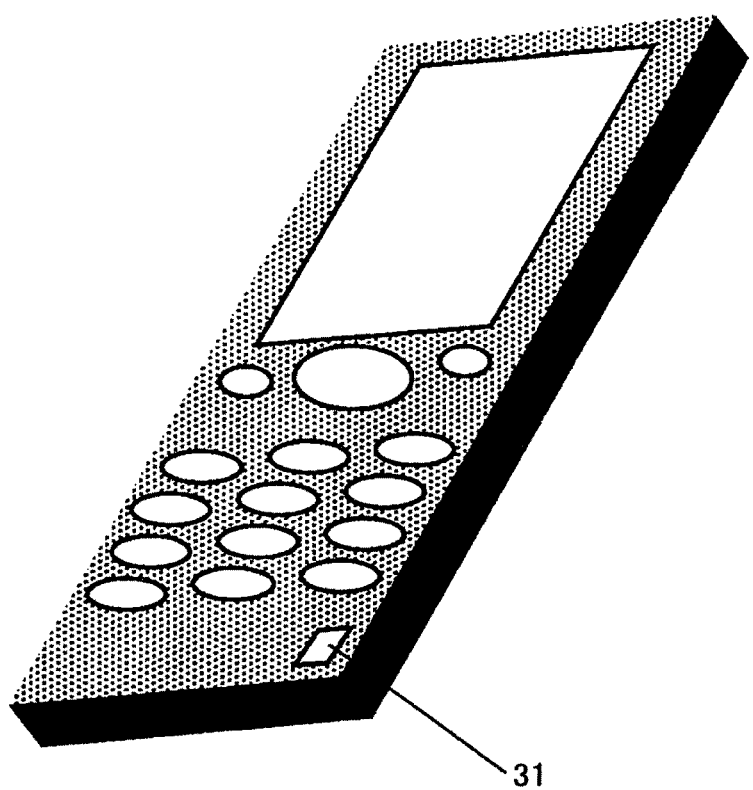
FIG. 14 is a schematic perspective view showing an example of the appearance of a mobile phone according to embodiments of the present invention.

FIG. 14 is a schematic view showing the appearance of a mobile phone as an example of electronic equipment including the personal authentication device according to the embodiments of the present invention. In FIG. 14, reference numeral 31 denotes a window at which the user holds his/her finger. Inside the window 31, the image acquisition unit of the personal authentication device is arranged. The vein pattern of the finger held at the window 31 is acquired as a compound eye image by the image acquisition unit. The configuration of the personal authentication device is the same as those of the above embodiments or the modifications. In accordance with authentication results by the personal authentication device, the permission or restriction of operating the mobile phone is controlled.

As described above, the embodiments of the present invention can provide the following advantages.

(1) It is possible to implement the personal authentication device capable of performing personal authentication with high accuracy while compensating influences due to fluctuations in the position and inclination of a living body such as a finger in the light axis direction of the lenses. Since the influences due to the fluctuations in the subject distance or the like are compensated, the guide member or the like for restricting the position of the living body is not required, thus making it possible to implement a non-contact personal authentication device. Furthermore, the provision of the guide member or the like is not required, and the image acquisition unit is configured to be easily made thinner and downsized and contribute to the reduction of costs. Moreover, particularly complicated calculation processing is not required. Therefore, it is possible to implement a thin and small personal authentication device as a whole at low cost.

(2) With the provision of the registration processing unit in the personal authentication device, it is possible to register a vein pattern or its characteristic-amount vector without using an external device. In this respect, the personal authentication device is preferably installed in electronic equipment such as a personal notebook computer and a mobile phone.

(3) With the provision of the light source that irradiates a living body with light, it is possible to assure a necessary light amount and take the image of a vein pattern with high accuracy even in an environment in which the amount of light necessary for taking the image of the vein pattern is small. Furthermore, using the light source from which near-infrared light that passes through a living body but is absorbed in a vein is irradiated, it is possible to take the image of a vein pattern more clearly. Furthermore, with the provision of the filter, it is possible to eliminate influences due to light having a wavelength such as external light not suitable for taking the image of a vein pattern and take the image of the vein pattern more clearly. Furthermore, by using the optical thin film formed on the lens array as a filter, it is made easier to implement the thinning and downsizing of the image acquisition unit compared with a case in which a separate filter member is provided.

(4) By using the lenses of the lens array having convex surfaces at least on the side of the image taking unit, it is possible to easily accurately align the lens array and the light shielding member with each other without using a high-precision assembling unit. As a result, assembling costs can be reduced.

(5) The lenses of the lens array have convex surfaces on the side of the image taking side. Therefore, the manufacturing costs of the lens array can be more reduced compared with a case the lenses having convex surfaces on both sides are used. Furthermore, compared with plane-convex lenses having convex surfaces on the side of an object, more excellent image forming performance can be obtained over wide view angles.

(6) With the provision of the image degradation compensation unit that compensates image degradation due to an optical system, it is possible to acquire a sharp vein pattern whose contrast is improved. Particularly, when the lenses of the lens array having convex surfaces on the side of the image taking side are used, the MTF curves are almost constant regardless of image views and do not become zero even at high spatial frequencies. Therefore, image degradation can be compensated at low cost by the use of a Wiener filter or the like.

(7) The number of ommatidium images used for restructuring a single image is variable. Therefore, when low authentication accuracy is requested, the number of ommatidium images to be used is reduced. As a result, a processing amount required for restructuring the single image is reduced, thus accelerating a processing speed. On the other hand, when high authentication accuracy is requested, the number of the ommatidium images to be used is increased. As a result, the resolution of the restructured single image is enhanced, thus improving the authentication accuracy.

(8) By determining whether an estimated image shift amount falls within a specified range, it is possible to restrict a subject distance and the inclination of a finger or the like to a certain range without providing the guide member for restricting the position and posture of the finger or the like. As a result, a compound eye image suitable for high-accuracy authentication can be used. Furthermore, by setting a range for specifying an image shift amount so as to include the contour of a living body in an ommatidium image, accuracy for estimating the image shift amount can be improved.

Note that the present invention can provide the following configurations in addition to those described above.

Specifically, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates an image shift amount between ommatidium images of the compound eye image acquired by the image acquisition unit; an image restructuring unit that restructures a single image from the plural ommatidium images of the compound eye image acquired by the image acquisition unit using the image shift amount of the compound eye image estimated by the shift estimation unit; a registration pattern storage unit that correspondingly stores a registration pattern and the image shift amount or a subject distance; and an authentication processing unit that corrects a size of a characteristic-amount vector extracted from the single image restructured by the image restructuring unit with a magnification ratio determined by the image shift amount or the subject distance read from the registration pattern storage unit, the image shift amount estimated by the shift estimation unit or the subject distance calculated using the image shift amount, and verifies the characteristic-amount vector of which the size is corrected against the registration pattern read from the registration pattern storage unit.

Furthermore, there is provided a personal authentication device having a lens array composed of two or more lenses and an image taking unit that takes as a compound eye image a set of images of a living body held at the lens array, the images being formed through the lenses of the lens array; a shift estimation unit that estimates an image shift amount between ommatidium images of the compound eye image acquired by the image acquisition unit; an image correction unit that performs image correction processing for compensating an influence due to a fluctuation in a position of the living body in a light-axis direction of the lenses of the lens array on the plural ommatidium images of the compound eye image acquired by the image acquisition unit based on the image shift amount estimated by the shift estimation unit; an image restructuring unit that restructures a single image from the plural ommatidium images on which the image correction unit performs the image correction processing using the image shift amount estimated by the shift estimation unit; a registration pattern storage unit that stores a registration pattern; and an authentication processing unit that verifies the single image restructured by the image restructuring unit or a characteristic-amount vector extracted from the single image against the registration pattern read from the registration pattern storage unit.

Furthermore, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates image shift amounts between ommatidium images of the compound eye images in plural image regions acquired by the image acquisition unit; an image correction unit that performs image correction processing for compensating an influence due to a fluctuation in a position and an inclination of the living body in a light-axis direction of the lenses of the lens array on the ommatidium images of the compound eye images acquired by the image acquisition unit based on the image shift amounts in the plural image regions estimated by the shift estimation unit; an image restructuring unit that restructures a single image from the ommatidium images on which the image correction unit performs the image correction processing using the image shift amounts estimated by the shift estimation unit; a registration pattern storage unit that stores a registration pattern; and an authentication processing unit that verifies the single image restructured by the image restructuring unit or a characteristic-amount vector extracted from the single image against the registration pattern read from the registration pattern storage unit.

Furthermore, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates image shift amounts between ommatidium images of the compound eye images in plural image regions acquired by the image acquisition unit; a registration pattern storage unit that correspondingly stores a registration pattern and the image shift amounts; an image correction unit that performs image correction processing for compensating an influence due to a fluctuation in a position and an inclination of the living body in a light-axis direction of the lenses of the lens array on the ommatidium images of the compound eye images acquired by the image acquisition unit based on the image shift amounts in the plural image regions estimated by the shift estimation unit and the image shift amounts read from the registration pattern storage unit; an image restructuring unit that restructures a single image from the ommatidium images on which the image correction unit performs the image correction processing using the image shift amounts estimated by the shift estimation unit; and an authentication processing unit that verifies the single image restructured by the image restructuring unit or a characteristic-amount vector extracted from the single image against the registration pattern read from the registration pattern storage unit.

Furthermore, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates an image shift amount between ommatidium images of the compound eye image acquired by the image acquisition unit; an image correction unit that performs image correction processing for compensating an influence due to a fluctuation in a position of the living body in a light-axis direction of the lenses of the lens array on one of the ommatidium images of the compound eye image acquired by the image acquisition unit based on the image shift amount estimated by the shift estimation unit; a registration pattern storage unit that stores a registration pattern; and an authentication processing unit that verifies the one ommatidium image on which the image correction unit performs the image correction processing or a characteristic-amount vector extracted from the one ommatidium image against the registration pattern read from the registration pattern storage unit.

Furthermore, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates image shift amounts between ommatidium images of the compound eye images in plural image regions acquired by the image acquisition unit; an image correction unit that performs image correction processing for compensating an influence due to a fluctuation in a position and an inclination of the living body in a light-axis direction of the lenses of the lens array on one of the ommatidium images of the compound eye images acquired by the image acquisition unit based on the image shift amounts in the image regions estimated by the shift estimation unit; a registration pattern storage unit that stores a registration pattern; and an authentication processing unit that verifies the one ommatidium image on which the image correction unit performs the image correction processing or a characteristic-amount vector extracted from the one ommatidium image against the registration pattern read from the registration pattern storage unit.

Furthermore, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates an image shift amount between ommatidium images of the compound eye image acquired by the image acquisition unit; a registration pattern storage unit that correspondingly stores a registration pattern and the image shift amount; an image correction unit that performs image correction processing for compensating an influence due to a fluctuation in a position of the living body in a light-axis direction of the lenses of the lens array on one of the ommatidium images of the compound eye image acquired by the image acquisition unit based on the image shift amount estimated by the shift estimation unit and the image shift amount read from the registration pattern storage unit; and an authentication processing unit that verifies the one ommatidium image on which the image correction unit performs the image correction processing or a characteristic-amount vector extracted from the one ommatidium image against the registration pattern read from the registration pattern storage unit.

Furthermore, there is provided a personal authentication device having an image acquisition unit including a lens array composed of two or more lenses and an image taking unit that takes as a compound eye image a set of images of a living body held at the lens array, the images being formed through the lenses of the lens array; a shift estimation unit that estimates image shift amounts between ommatidium images of the compound eye images in plural image regions acquired by the image acquisition unit; a registration pattern storage unit that correspondingly stores a registration pattern and the image shift amounts; an image correction unit that performs image correction processing for compensating an influence due to a fluctuation in a position and an inclination of the living body in a light-axis direction of the lenses of the lens array on one of the ommatidium images of the compound eye images acquired by the image acquisition unit based on the image shift amounts in the plural image regions estimated by the shift estimation unit and the image shift amounts read from the registration pattern storage unit; and an authentication processing unit that verifies the one ommatidium image on which the image correction unit performs the image correction processing or a characteristic-amount vector extracted from the one ommatidium image against the registration pattern read from the registration pattern storage unit.

Furthermore, there is provided electronic equipment having the personal authentication device described above and a window at which the living body is held, wherein the image acquisition unit is arranged inside the window.

The present application is based on Japanese Priority Applications No. 2008-053711 filed on Mar. 4, 2008, and No. 2008-321400 filed on Dec. 17, 2008 with the Japan Patent Office, the entire contents of which are hereby incorporated by reference.

The invention claimed is:

1. A personal authentication device comprising:
an image acquisition unit including a lens array composed of two or more lenses and an image taking unit that takes as a compound eye image a set of images of a living body held at the lens array, the images being formed through the lenses of the lens array;
a shift estimation unit that estimates an image shift amount between ommatidium images of the compound eye image acquired by the image acquisition unit;
an image restructuring unit that restructures a single image from the plural ommatidium images of the compound eye image acquired by the image acquisition unit using the image shift amount of the compound eye image estimated by the shift estimation unit;
a registration pattern storage unit that correspondingly stores a registration pattern and the image shift amount, the registration pattern being the single image which is restructured by the image restructuring unit, or a characteristic-amount vector which is extracted from the single image at authentication, the image shift amount being estimated by the shift estimation unit at the authentication;
a size correction unit that corrects a size of the single image, which is restructured by one of the image restructuring unit and the characteristic-amount vector, using a magnification ratio which is determined based on the image shift amount, which is read from the registration pattern storage unit, and the image shift amount which is estimated by the shift estimation unit; and
an authentication processing unit that verifies the single image of which the size is corrected by the size correction unit or a characteristic-amount vector extracted from the single image against the registration pattern read from the registration pattern storage unit.

2. A personal authentication device comprising:
an image acquisition unit including a lens array composed of two or more lenses and an image taking unit that takes as a compound eye image a set of images of a living body held at the lens array, the images being formed through the lenses of the lens array;
a shift estimation unit that estimates an image shift amount between ommatidium images of the compound eye image acquired by the image acquisition unit;
an image restructuring unit that restructures a single image from the plural ommatidium images of the compound eye image acquired by the image acquisition unit using the image shift amount of the compound eye image estimated by the shift estimation unit;
a registration pattern storage unit that correspondingly stores a registration pattern and the image shift amount, the registration pattern being the single image which is restructured by the image restructuring unit, or a characteristic-amount vector which is extracted from the single image at authentication, the image shift amount being estimated by the shift estimation unit at the authentication;
a size correction unit that corrects a size of the registration pattern read from the registration pattern storage unit using a magnification ratio which is determined based on the image shift amount, which is read from the registration pattern storage unit, and the image shift amount which is estimated by the shift estimation unit; and
an authentication processing unit that verifies the registration pattern of which the size is corrected by the size correction unit against the single image restructured by the image restructuring unit or a characteristic-amount vector extracted from the single image.

3. The personal authentication device according to claim 1, the device further comprising:
a registration processing unit that stores as the registration pattern the single image restructured by the image restructuring unit or the characteristic-amount vector extracted from the single image in the registration pattern storage unit so as to correspond to the image shift amount estimated by the shift estimation unit or the subject distance calculated using the image shift amount.

4. The personal authentication device according to claim 1, wherein
the image acquisition unit has a light source that irradiates the living body with light.

5. The personal authentication device according to claim 4, wherein
near-infrared light is radiated from the light source.

6. The personal authentication device according to claim 4, wherein
the image acquisition unit has a filter that allows only light within a specified wavelength area to pass through.

7. The personal authentication device according to claim 6, wherein
the filter is a visible light cutting filter.

8. The personal authentication device according to claim 6, wherein
the filter is made of an optical thin film formed on the lens array.

9. The personal authentication device according to claim 1, wherein
the image acquisition unit has a light shielding member that prevents crosstalk of light beams between the lenses of the lens array between the lens array and the image taking unit, the lenses of the lens array have convex surfaces at least on a side of the image taking unit, and diameters of the lenses at the convex surfaces match diameters of opening parts of the light shielding member.

10. The personal authentication device according to claim 1, wherein
the lenses of the lens array are plane-convex lenses having a convex surface on a side of the image taking unit.

11. The personal authentication device according to claim 1, further comprising:
a degradation compensation unit that compensates image degradation due to an optical system with respect to the compound eye image acquired by the image acquisition unit.

12. The personal authentication device according to claim 1, wherein
the number of the ommatidium images used for restructuring the single image by the image restructuring unit is variable.

13. The personal authentication device according to claim 1, further comprising:
a unit that determines whether the image shift amount estimated by the shift estimation unit falls within a specified range, wherein
the personal authentication device uses the compound eye image as a valid compound eye image only when the image shift amount estimated from the compound eye image acquired by the image acquisition unit is determined to fall within the specified range.

14. The personal authentication device according to claim 13, wherein
the specified range is set so that the ommatidium image of the compound eye image includes a contour of the living body when the image shift amount estimated by the compound eye image falls within the specified range.

15. The personal authentication device according to claim 2, the device further comprising:
a registration processing unit that stores as the registration pattern the single image restructured by the image restructuring unit or the characteristic-amount vector extracted from the single image in the registration pattern storage unit so as to correspond to the image shift amount estimated by the shift estimation unit or the subject distance calculated using the image shift amount.

16. The personal authentication device according to claim 5, wherein
the image acquisition unit has a filter that allows only light within a specified wavelength area to pass through.

* * * * *